United States Patent
Jamieson et al.

(10) Patent No.: US 10,433,274 B2
(45) Date of Patent: Oct. 1, 2019

(54) APPARATUS AND METHOD FOR CALIBRATING A WIRELESS ACCESS POINT COMPRISING AN ARRAY OF MULTIPLE ANTENNAS

(71) Applicant: UCL Business PLC, London (GB)

(72) Inventors: Kyle Jamieson, London (GB); Jon Gjengset, London (GB)

(73) Assignee: UCL Business PLC, London (GB)

( * ) Notice: Subject to any disclaimer, the term of this patent is extended or adjusted under 35 U.S.C. 154(b) by 113 days.

(21) Appl. No.: 15/112,258

(22) PCT Filed: Jan. 30, 2015

(86) PCT No.: PCT/GB2015/050226
§ 371 (c)(1),
(2) Date: Jul. 18, 2016

(87) PCT Pub. No.: WO2015/114355
PCT Pub. Date: Aug. 6, 2015

(65) Prior Publication Data
US 2016/0345286 A1    Nov. 24, 2016

(30) Foreign Application Priority Data

Jan. 30, 2014    (GB) .................................. 1401580.4

(51) Int. Cl.
*H04W 64/00*    (2009.01)
*H04B 17/12*    (2015.01)
(Continued)

(52) U.S. Cl.
CPC ............ *H04W 64/00* (2013.01); *G01S 3/023* (2013.01); *G01S 3/48* (2013.01); *H04B 17/12* (2015.01);
(Continued)

(58) Field of Classification Search
CPC ....... H04W 64/00; H04W 88/08; G01S 3/023; G01S 3/48; H04B 17/21
(Continued)

(56) References Cited

U.S. PATENT DOCUMENTS

| 6,489,923 B1* | 12/2002 | Bevan ..................... G01S 1/026 342/378 |
| 2003/0137454 A1* | 7/2003 | Alexander, Jr. ........... G01S 3/04 342/442 |

(Continued)

FOREIGN PATENT DOCUMENTS

| CA | 2679673 A1 | 3/2011 |
| JP | 2009212771 A | 9/2009 |

OTHER PUBLICATIONS

Notification of Transmittal of International Search Report and Written Opinion of the International Searching Authority, dated Jul. 3, 2015, Application No. PCT/GB2015/050226, Authorized Officer: Bettiol, Brigitte.
(Continued)

*Primary Examiner* — Ayodeji O Ayotunde
(74) *Attorney, Agent, or Firm* — Park, Vaughan, Fleming & Dowler LLP

(57) ABSTRACT

A method and apparatus are provided for calibrating a wireless access point comprising an array of multiple (m) antennas denoted $A_i$ (i=1 . . . m), each antenna having a respective internal phase offset φi. The method comprises receiving a signal from at least one transmitter located at a substantially known bearing from the wireless access point. The method further comprises determining an estimated value for each internal phase offset, such that an angle of arrival (AoA) spectrum calculated for the received signal on the basis of said estimated values matches the known bearing, wherein said AoA spectrum is calculated by treating said multiple antennas as a phased array. A method and an
(Continued)

apparatus are also provided for calibrating a wireless access point comprising first and second arrays of multiple antennas, each antenna array having a respective radio unit, and each antenna in an array having a respective internal phase offset$_i$. The method comprises using an antenna in the first antenna array to act as a transmitter located at a known distance from each antenna in the second antenna array, such that a signal from said transmitter is received at each antenna in the second antenna array. A phase for the received signal at each antenna in the second antenna array is measured in the radio unit, while an expected phase for the received signal is calculated, for each antenna in the second antenna array, based on the known distance of that antenna from the transmitter. The internal phase offset$_i$, for each antenna in the second antenna array can then be determined from the difference between the measured phase and the calculated phase for that antenna.

16 Claims, 20 Drawing Sheets

(51) Int. Cl.
*H04B 17/21* (2015.01)
*G01S 3/02* (2006.01)
*G01S 3/48* (2006.01)
*H04W 84/12* (2009.01)
*H04W 88/08* (2009.01)

(52) U.S. Cl.
CPC ............. *H04B 17/21* (2015.01); *H04W 84/12* (2013.01); *H04W 88/08* (2013.01)

(58) Field of Classification Search
USPC .......................................... 455/67.11, 67.16
See application file for complete search history.

(56) References Cited

U.S. PATENT DOCUMENTS

| 2004/0102157 | A1 | 5/2004 | Lewis |
| 2008/0191941 | A1 | 8/2008 | Saban et al. |
| 2012/0086605 | A1* | 4/2012 | Lecca ..................... G01S 3/023 342/441 |
| 2013/0029685 | A1 | 1/2013 | Moshfeghi |
| 2013/0099987 | A1 | 4/2013 | Desclos et al. |

OTHER PUBLICATIONS

European Search Report, Application No. GB1401580.4, dated Jun. 10, 2014.

* cited by examiner

Primary ———

One AP

Two APs

Three APs

Four APs

Five APs

Six APs

High correlation η =15.98%

Low correlation η =2.10%

APPARATUS AND METHOD FOR CALIBRATING A WIRELESS ACCESS POINT COMPRISING AN ARRAY OF MULTIPLE ANTENNAS

FIELD

The present application relates to determining the location of a mobile device, for example a smartphone, using wireless access points, such as provided for WiFi connectivity. The present application further relates to calibrating phase offsets for a wireless access point, for example for use in position determination.

BACKGROUND

Outdoors, mobile computing devices such as handheld smartphones, tablets, and laptops enjoy a robust and relatively accurate location service from Global Positioning System (GPS) satellite signals. However, such GPS signals do not reach indoors, so that providing an indoor location service is challenging. Furthermore, the demand for accurate location information is especially acute indoors. For example, while a few meters of accuracy which is typically obtained from GPS outdoors is generally sufficient for street-level navigation, small differences in locations indoors often have greater importance to people and applications—thus a few meters of error in an estimated location can place someone in a different office within a building, or sometimes even within a different building. In addition, location-aware smartphone applications which are currently available or planned for the near future, including augmented reality-based building navigation, social networking, and retail shopping, demand both a high accuracy and a low response time. A solution that offers a centimeter-accurate location service indoors would help to enable these and other exciting applications in mobile and pervasive computing.

Early indoor location service systems that propose dedicated infrastructure to provide a fine-grained indoor location service include Active Badge [33], which equips mobiles with infrared transmitters and buildings with many infrared receivers; active badges emit unique codes, which are then detected by the infrared sensor and associated with location with a six meter range. The Bat System [34] uses a matrix of RF-ultrasound receivers, each hard-coded with location, deployed on the ceiling indoors. Users wear "Bats" that transmit unique identifiers to the receivers over RF while sending simultaneous ultrasonic "chirps". Cricket [18] equips buildings with combined RF/ultrasound beacons while mobiles carry RF/ultrasound receivers. Both Bat and Cricket measure time differences between the RF and ultrasound arrival, triangulating location by combining multiple measurements to or from different beacons.

The most widely used RF information is received signal strength (RSS), usually measured in units of whole decibels. While readily available from commodity WiFi hardware at this granularity, the resulting RSS measurements are very coarse compared to direct physical-layer samples, and so incur an amount of quantization error, especially when few readings are present. There are two main lines of work using RSS; the first, pioneered by RADAR [2, 3] builds "maps" of signal strength to one or more access points, achieving an accuracy on the order of meters [22, 28]. Later systems such as Horus [41] use probabilistic techniques to improve localization accuracy to an average of 0.6 meters when an average of six access points are within range of every location in the wireless LAN coverage area, but require large amounts of calibration. While some work has attempted to reduce the calibration overhead [12], mapping generally requires significant calibration effort. Other map-based work has proposed using overheard GSM signals from nearby towers [32], or dense deployments of desktop clients [4]. Recently, Zee [20] has proposed using crowd-sourced measurements in order to perform the calibration step, resulting in an end-to-end median localization error of three meters when Zee's crowd-sourced data is fed into Horus.

The second line of work using RSS are techniques based on mathematical models. Some of these proposals use RF propagation models [21] to predict distance away from an access point based on signal strength readings. By triangulating and extrapolating using signal strength models, TIX [11] achieves an accuracy of 5.4 meters indoors. Lim et al. [13] use a singular value decomposition method combined with RF propagation models to create a signal strength map (overlapping with map-based approaches). They achieve a localization error of about three meters indoors. EZ [8] is a system that uses sporadic GPS fixes on mobiles to bootstrap the localization of many clients indoors. EZ solves these constraints using a genetic algorithm, resulting in a median localization error of between 2-7 meters indoors, without the need for calibration. Other model-based proposals augment RF propagation models with Bayesian probabilistic models to capture the relationships between different nodes in the network [15], and to develop conditions for a set of nodes to be localizable [40]. Still other model-based proposals are targeted towards ad hoc mesh networks [6, 19, 23].

Prior work using angle-of-arrival (AoA) information includes A. Wong et al. [35], who investigate the use of AoA and channel impulse response measurements for localization. While they have demonstrated positive results at a very high SNR (60 dB), typical wireless LANs operate at significantly lower SNRs, and it is unclear such ideas would integrate with a functioning wireless LAN. Niculescu et al. [16] simulate AoA-based localization in an ad hoc mesh network. AoA has also been proposed in CDMA mobile cellular systems [38], in particular as a hybrid approach between TDoA and AoA [9, 36], and also in concert with interference cancellation and ToA [31]. Much other work in AoA uses this technology to solve similar but materially different problems. For example, geo-fencing [27] utilizes directional antennas and a frame coding approach to control APs' indoor coverage boundary. Patwari et al. [17] propose a system that uses the channel impulse response and channel estimates of probe tones to detect when a device has moved, but do not address location. Faria and Cheriton [10] and others [5, 14] have proposed using AoA for location-based security and behavioural fingerprinting in wireless networks. Chen et al. [7] investigate post hoc calibration for commercial off-the-shelf antenna arrays to enable AoA determination, but do not investigate localization indoors.

In summary, some existing solutions for providing indoor locations are based on using radio frequency transmissions, but this has many challenges. First, there are often many objects indoors, which may be located near wireless access points (WAPs) or mobile clients, and these can reflect the energy of the wireless signal in a phenomenon called multipath propagation. This forces an unfortunate trade-off for most existing RF location-based systems: either model this hard-to-predict pattern of multipath fading, or leverage expensive hardware that can sample the wireless signal at a very high rate. In practice, most existing RF systems choose the former option, building maps of multipath signal strength [2, 3, 32, 41], or estimating coarse differences using RF propagation models [11, 13]. Such an approach can achieve an average localization accuracy from 60 cm [41] up to a number of meters, which is too coarse for at least some of the envisaged applications. In addition, although systems based on the combination of ultrasound and RF sensors, such as Active Badge [33], Bat [34], and Cricket [18], have achieved accuracy to the level of centimeters for indoor localization, these systems usually require dedicated infrastructure to be installed in every room in a building—an approach that is expensive, time-consuming, and imposes a considerable maintenance effort.

SUMMARY

Some embodiments of the invention provide a method and an apparatus for determining the location of a mobile device using multiple wireless access points, each wireless access point comprising multiple antennas. The apparatus and method are particularly suited to location of a mobile device in an indoor environment, such as a building. The method includes receiving a communication signal from the mobile device at each of multiple antennas of said multiple wireless access points; for each wireless access point, determining angle-of-arrival information of the received communication signal at the wireless access point, based on a difference in phase of the received signal between different antennas; collecting, from each of the multiple wireless access points, the determined angle-of-arrival information for the received communication signal from the mobile device; and estimating the location of the mobile device from the collected angle-of-arrival information.

The angle-of-arrival information may be obtained quickly just from a small portion of the communication signal. The analysis of the communication signal to generate the angle-of-arrival information may be performed locally at the wireless access point, centrally at a server, or using a combination of both. In any event, a (the) server may combine the angle-of-arrival information from the different wireless access points to estimate the location of the mobile device. The collected angle-of-arrival information at the server relates to the same mobile device. This can be confirmed, for example, based on timing of the detected communication signal, since all wireless access points should receive a given communication signal from a mobile device in effect at the same time. Various statistical techniques can be adopted to combine the information from the different wireless access points to give an overall estimated location for the mobile device.

The multiple antennas at a given wireless device can be used as a form of phased array to determine an angle of arrival of an incoming signal. In a typical indoor environment, multiple incoming signal components are received, including (but not necessarily) a direct path from the wireless device itself, plus multipath components from reflections. It has been found that the multipath components can generally be identified and removed because they are more variable with both time and space compared to the direct path components. For example, the direct path component will only change a little with slight movement of the mobile device (or a slightly different antenna location within the wireless access point), whereas the multipath components tend to change much more dramatically—and hence can be identified and removed. Furthermore, the direct path components from different wireless access points will approximately all reinforce one another at a single converged position, whereas on average there will not be any such convergence or reinforcement for the multipath components.

In comparison with existing solutions, such as map-based techniques, the approach described herein offers better accuracy with fewer access points, and does not involve prior calibration, which is a significant benefit, for example, if there are not enough people nearby to crowd-source measurements before the RF environment changes.

Overall, the indoor location system described herein uses angle-of-arrival techniques to locate wireless clients indoors to a level of accuracy that has previously been attainable only by using expensive dedicated hardware infrastructure. The indoor location system includes facilities for angle of arrival (AoA) based direction estimation and spatial smoothing with algorithms for suppressing the multipath (not line-of-sight) reflections that occur frequently indoors and for synthesizing location information from many different APs.

Also disclosed herein are a method and apparatus for calibrating a wireless access point comprising an array of multiple (m) antennas denoted $\varphi_i$ (i=1 ... m), each antenna having a respective internal phase offset $\varphi_i$. The method comprises receiving a signal from at least one transmitter located at a substantially known bearing from the wireless access point. The method further comprises determining an estimated value for each internal phase offset $\varphi_i$ such that an angle of arrival (AoA) spectrum calculated for the received signal on the basis of said estimated values matches the known bearing, wherein said AoA spectrum is calculated by treating said multiple antennas as a phased array. Determining (calibrating) the phase offsets in this manner helps to allow the wireless access point to be used in determining the location of a mobile device as described herein.

Also disclosed herein are a method and an apparatus for calibrating a wireless access point comprising first and second arrays of multiple antennas, each antenna array having a respective radio unit, and each antenna in an array having a respective internal phase offset $\varphi_i$. The method comprises using an antenna in the first antenna array to act as a transmitter located at a known distance from each antenna in the second antenna array, such that a signal from the transmitter is received at each antenna in the second antenna array. A phase for the received signal at each antenna in the second antenna array is measured in the radio unit, while an expected phase for the received signal is calculated, for each antenna in the second antenna array, based on the known distance of that antenna from the transmitter. The internal phase offset $\varphi_i$ for each antenna in the second antenna array can then be determined from the difference between the measured phase and the calculated phase for that antenna.

Also disclosed herein are a method and apparatus are provided for determining the location of a mobile device using multiple wireless access points, each wireless access point comprising multiple antennas. The method comprises receiving a communication signal from the mobile device at the multiple antennas of the multiple wireless access points. For each wireless access point, angle-of-arrival information of the received communication signal at the wireless access point is determined, based on a difference in phase of the received signal between different antennas. The determined angle-of-arrival information for the received communication signal from the mobile device is then collected from each of the multiple wireless access points, and the location of the mobile device is estimated from the collected angle-of-arrival information. The determining of the angle-of-arrival information for a wireless access point includes compensating for a non-zero elevation of the mobile device with respect to the wireless access point.

The techniques disclosed herein may be implemented in special purpose hardware or, at least in part, by software (one or more computer programs) running on general or special purpose hardware, such as a wireless AP and/or one or more computer servers. The software comprises program instructions for execution by one or more processors in the hardware to implement the desired methods. The software may be pre-installed into the hardware, for example as firmware, or may be downloaded or installed from a non-transitory, computer-readable medium, such as a hard disk drive, flash memory, an optical storage device, etc.

BRIEF DESCRIPTION OF THE DRAWINGS

Various embodiments of the invention will now be described in detail by way of example only with reference to the following drawings.

DETAILED DESCRIPTION

Figure 1:
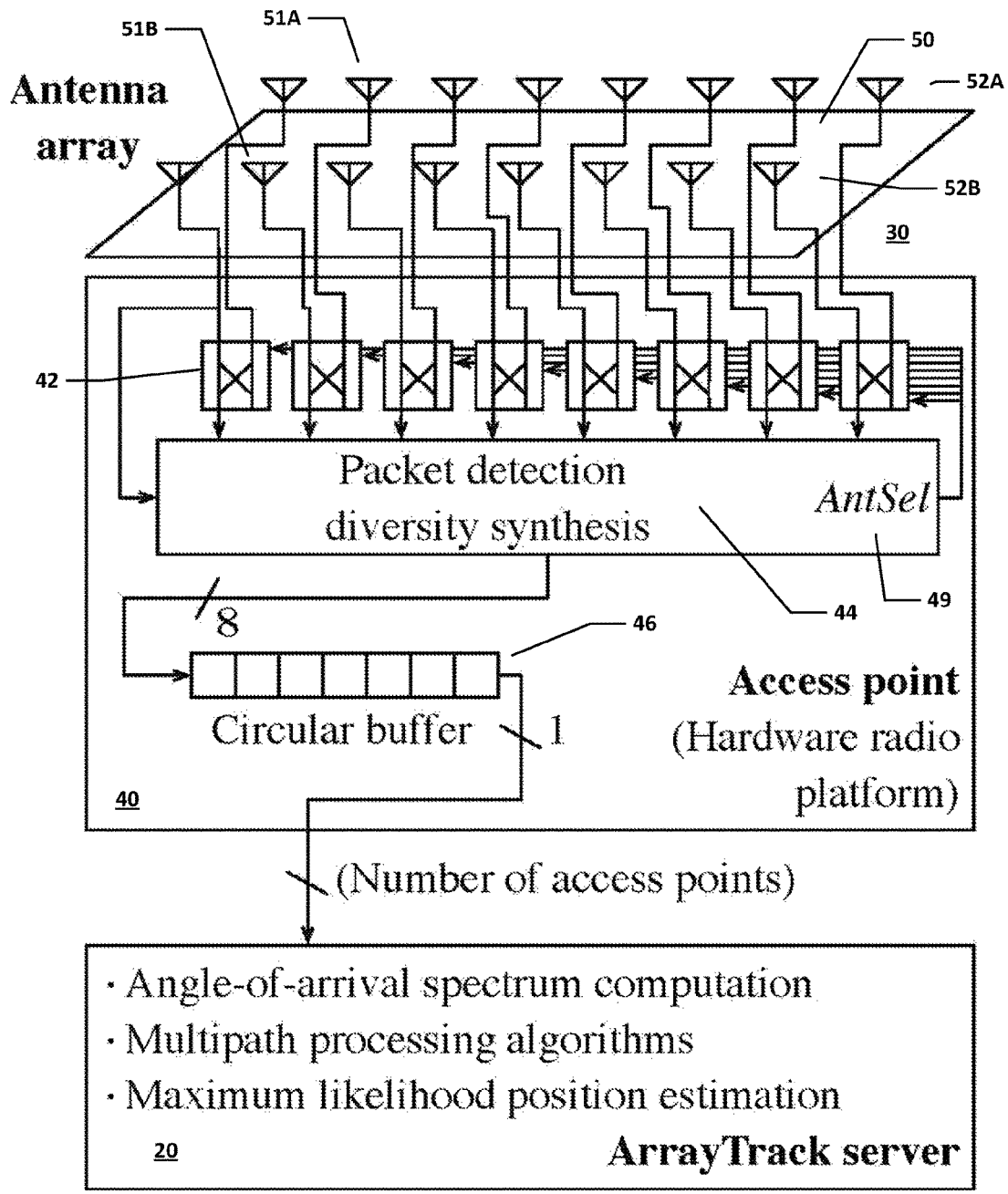
FIG. 1 is a schematic diagram of the ArrayTrack system in accordance with some embodiments of the invention.

Overview Two new opportunities have recently arisen in the design of indoor location systems. Firstly, WiFi access points (APs), are incorporating ever-increasing numbers of antennas to bolster capacity and coverage using multiple-input, multiple-output (MIMO) techniques. In fact, it is expected that in the future the number of antennas at an access point will increase several-fold to meet the demand for MIMO links and spatial multiplexing [1, 29], thereby increasing overall capacity. Indeed, the upcoming 802.11ac standard will specify eight MIMO spatial streams; in addition, 16-antenna APs have been available since 2010 [39]. Secondly, WiFi AP density is high: in one experimental test-bed in a city location (London) described below, transmissions from most locations reached seven or more production network APs (excluding transmissions from the test infrastructure itself), with all but about five percent of locations reaching at least five such APs.

The approach described herein provides an indoor localization system (named ArrayTrack) that exploits the increasing number of antennas at commodity APs to provide fine-grained location for mobile devices in an indoor setting. In particular, when a client device transmits a frame on the air, multiple ArrayTrack APs overhear the transmission, and each computes angle-of-arrival (AoA) information from the client's incoming frame. The system then aggregates the AoA data from the ArrayTrack APs at a central backend server to estimate the location of the client device.

Note that although AoA techniques are already used in radar and acoustics, it is challenging to exploit these techniques indoors, due to the presence of strong multipath RF propagation in these environments. This challenge has been addressed, inter alia, by introducing specific system designs and signal processing algorithms to eliminate reliably the effects of multipath, even in the relatively common situation that little or no energy arrives on the direct path between client device and AP.

Particular features of the approach described herein compared with other indoor localization techniques include: (i) to mitigate the effects of indoor multipath propagation, the ArrayTrack system uses an innovative multipath suppression algorithm to remove effectively the reflection paths between clients and APs; (ii) upon detecting a frame, an ArrayTrack AP quickly switches between sets of antennas, synthesizing new AoA information from each antenna—this technique is referred to herein as diversity synthesis, and it has been found to be especially useful in the case of low AP density; and (iii) the ArrayTrack system architecture centres around parallel processing in hardware, at the APs, and in software, at the database backend, for fast location estimates. Furthermore, by leveraging signal processing that can be performed at the physical layer, an AP can extract information from a single packet at a lower SNR than the SNR which is usually required to receive and fully decode the packet. This allows more ArrayTrack APs to cooperate to localize clients than if the system were to operate exclusively at higher layers.

In some embodiments, the ArrayTrack system is implemented on the Rice WARP field-programmable gate array (FPGA) platform. The operation of this implementation has been evaluated in a 41-node network deployed over one floor of a busy office space. Experimental results in this setting show that using just three APs, the ArrayTrack system is able to localize clients to a median accuracy of 57 cm (mean accuracy one meter). With six APs, the ArrayTrack system is able to localize clients to a median accuracy of 23 cm (mean accuracy 31 cm), and localizing 95% of clients to within 90 cm. At the same time, this implementation of ArrayTrack is fast, requiring just 100 milliseconds to produce a location estimate. It is important to note that these accurate and responsive location estimates have been obtained using an RF-based location system that does not require additional infrastructure (beyond a normal density of nearby WiFi APs). Furthermore, as described in more detail below, the performance of the ArrayTrack system has been found to be generally robust against different antenna heights, different antenna orientations, low SNR and collisions.

Design

FIG. 1 is a schematic diagram of the ArrayTrack system in accordance with some embodiments of the invention. The ArrayTrack system 10 comprises a central server 20 which is connected to multiple access points 30 (only one of which is shown in FIG. 1). Each access point includes a hardware radio platform 40 and an antenna array 50 compatible with the WiFi or WLAN standard (IEEE 802.11). The hardware radio platform includes a detection block 44 and a circular buffer 46. In the particular implementation shown in FIG. 1, the antenna array 50 comprises eight pairs of antennas 51A, 51B, and hence the hardware radio platform 40 comprises eight corresponding or respective radio front-ends 42. The AP can be regarded as comprising two sets of antennas, 52A, 52B, with eight antennas per set, where each set of antennas 52A, 52B can be operated as a phased array. The AP has an AntSel (antenna select) line 49 to swap between the two sets of antennas—in effect, the AntSel line determines which one of the two sets of antennas is currently switched for reception by the corresponding radio front-ends 42.

In some embodiments, the two sets of multiple antennas 52A, 52B, of a single access point are separated by approximately 0.75 m. However, other separations, such as 0.5 m or 1 m (or any other appropriate value) could be used. Likewise, a different number and/or configuration (pattern) of antennas 51 may be present at each AP, even within a given ArrayTrack system 10.

FIG. 1 further indicates the allocation of processing or functionality as divided between the ArrayTrack access points 30 and the centralized server 20. It will be appreciated that other implementations different allocation of functionality between the ArrayTrack access points 30 and the centralized server 20. Note also that for clarity, FIG. 1 omits the transmit path functionality of the access points 30.

In operation of some embodiments of the ArrayTrack system, information flows from the physical antenna array 50, through the AP hardware 40, and on to the central ArrayTrack server 20, as summarized in FIG. 1. As described in more detail below, the ArrayTrack system leverages techniques to detect packets at very low signal strength (low SNR), so that many access points 30 can overhear a single transmission. Also, at each AP 30, the ArrayTrack system uses many antennas to generate an AoA spectrum, each of which represents an estimate of likelihood versus bearing, and also to cancel out some of the effects of multipath propagation. The centralised server 20 then combines these estimates to produce a finalised estimate of location, further eliminating multipath effects.

Figure 1A:
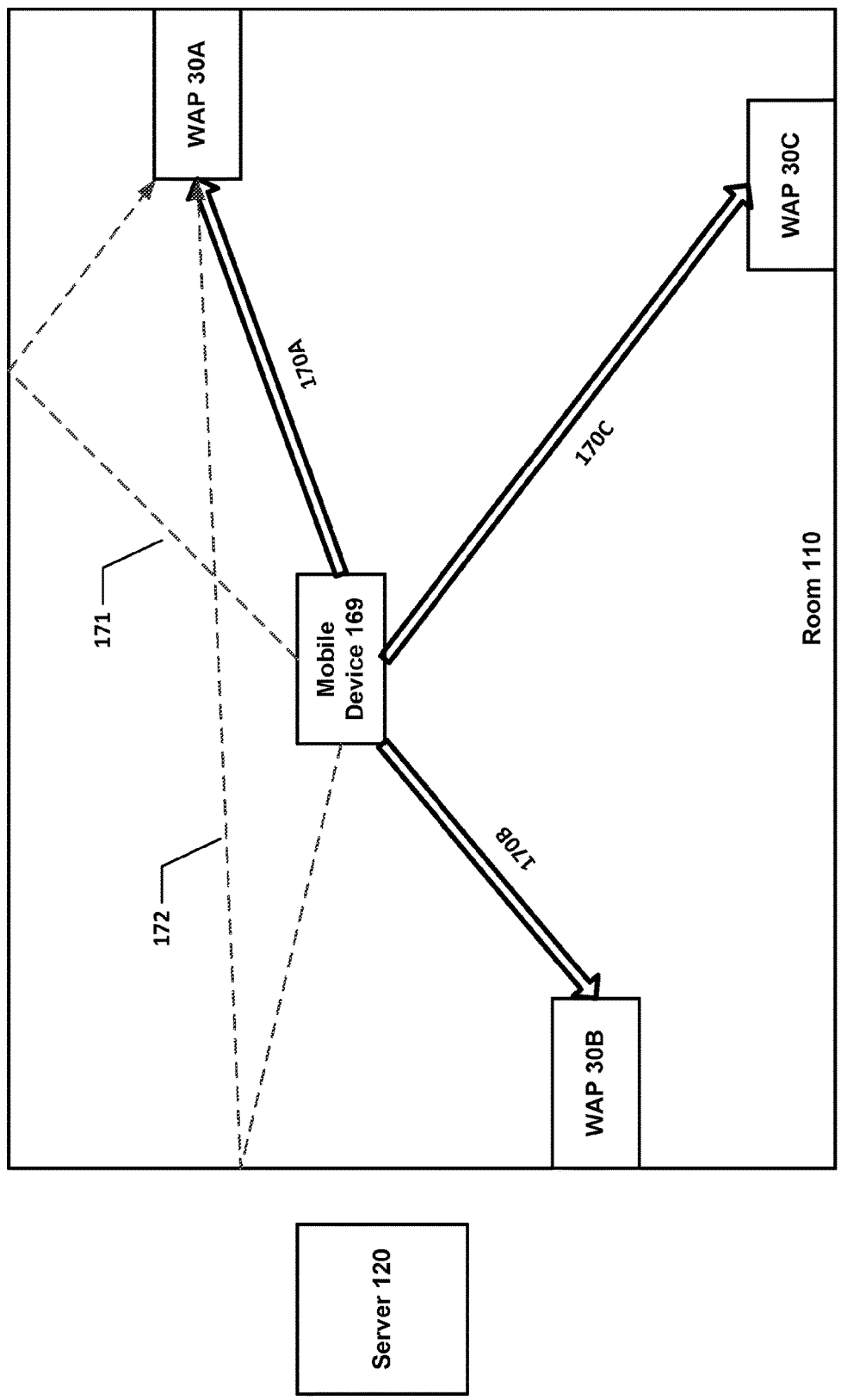
FIG. 1A is a simplified schematic diagram of a deployed ArrayTrack system in accordance with some embodiments of the invention.

FIG. 1A illustrates in simplified schematic form the deployment of the ArrayTrack system 10 into a room 110. In particular, FIG. 1A shows three access points 30A, 30B, 30C distributed around room 110. In practice, the number and distribution of access points will vary according to circumstances, with most situations having a more complex distribution, e.g. in different rooms or buildings, depending on the environment and number of likely users to be served. FIG. 1A also shows a client device 160 whose position is to be determined by the ArrayTrack system 10. In practice, there may be multiple client devices in room 110 (or emitting a signal that is otherwise accessible to at least some of the access points 30A, 30B, 30C). The access points 30A, 30B, 30C are connected to the server 20 (the details of this connection are omitted in FIG. 1A).

In general, a client device 160 emits a signal over a broad range of angles. FIG. 1A shows direct path components of this signal 170A, 170B, 170C arriving respectively at access points 30A, 30B, 30C. These direct path components allow an estimated bearing for client device 160 from each respective wireless access point to be determined, and the combination of two or more of these bearings provides a localisation estimate for the client device 160.

FIG. 1A also illustrates two multipath components 171, 172, from client device 160 to access point 30A. The multipath components are shown as resulting from physical reflections off the wall of room 110. It will be appreciated that multipath components may also arise from multiple reflections, and also such reflections may occur of many types of surface (floor, ceiling, pillars, furniture, etc). The multipath components received by access point 30A (and in general by the other access points, although these are omitted from FIG. 1A for reasons of clarity) complicate the determination of the bearing of client device 160 from the relevant access point. The processing of the ArrayTrack system accommodates the presence of such multipath signals, as described below.

Packet Detection and Buffer Management

Figure 2:
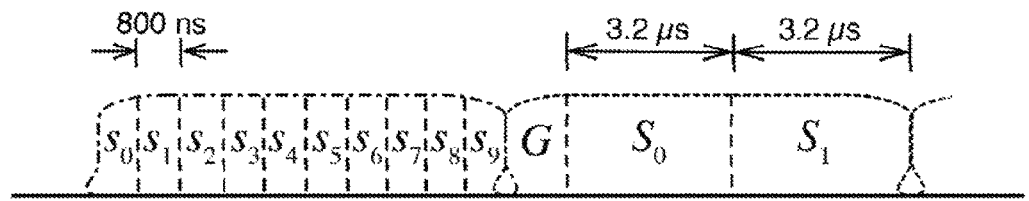
FIG. 2 is a schematic diagram of the physical-layer orthogonal frequency division multiplex (OFDM) preamble of an 802.11 frame containing known short and long training symbols.

In order to compute an AoA spectrum for a client device (where the AoA spectrum represents the variation of signal strength with bearing), an AP only has to overhear a small number of frames from the client (in the present implementation between one and three, for reasons that are explained below). For the purposes of ArrayTrack, the particular contents of the frame are immaterial, so the system can process control frames such as acknowledgments and even frames encrypted at the link layer. The physical-layer preamble of an 802.11 frame contains known short and long training symbols, as shown in FIG. 2. In particular, FIG. 2 depicts the 802.11 OFDM preamble, consisting of ten identical, repeated short training symbols (denoted s0 : : : s9), followed by a guard interval (denoted G), ending with two identical, repeated long training symbols (denoted S0 and S1). The ArrayTrack system uses a modified version of Schmidl-Cox [24] detection to detect short training symbols of an incoming frame.

Once the ArrayTrack detection block 44 senses a frame, it activates the diversity synthesis mechanism described below and stores the samples of the incoming frame into a circular buffer 46 (see FIG. 1), with one logical buffer entry for each frame detected. Since it does not require even a partial packet decode, the ArrayTrack system can process any part of the packet (which is helpful, for example, in the event of collisions in a carrier-sense multiple access network). As noted above, the ArrayTrack system detects the preamble of the packet and records a small part of it. In principle, one time domain packet sample provides enough information for the AoA spectrum computation described below. However, to reduce (average out) the effects of noise, the present implementation uses 10 samples. Since a commodity WiFi AP samples at 40 Msamples/second, this implies processing just 250 nanoseconds of a packet—i.e. less than 1.5% of the 16 µs duration of a WiFi preamble.

Diversity Synthesis

Upon detecting a packet, most commodity APs switch between pairs of antennas, selecting the antenna from each pair with the strongest signal. This technique is called diversity selection: it is a well-known and widely implemented technique to improve performance in the presence of destructive multipath fading at one of the antennas, and can be found in the most recent commercially available 802.11n MIMO access points. Such diversity selection also has the advantage of not increasing the number of radios required (which would otherwise make the AP more expensive).

The ArrayTrack system 10 seamlessly incorporates diversity selection into its design, synthesizing independent AoA data from both antennas of a diversity pair. This technique is referred to herein as diversity synthesis. Referring to FIG. 1, once the packet detection block 44 has indicated the start of a packet, the AP stores the samples corresponding to the preamble's long training symbol S0 (FIG. 2) from the first set of antennas 52A into the first half of a circular buffer entry. Next, the AP toggles the AntSel line 49 in FIG. 1, switching to the second set of antennas 52B for the duration of the second long training symbol S1. The long (rather than short) training signals are used for the diversity synthesis because in the current implementation, the hardware radio platform 40 has a 500 ns switching time during which the received signal is highly distorted and not usable. Since S0 and S1 are identical and each 3.2 µs long, they fall well within the coherence time of the indoor wireless channel. (The coherence time is the time span over which the channel can be considered stationary; coherence time is mainly a function of the RF carrier frequency and speed of motion of the transmitter, receiver, and any nearby objects). Accordingly, the information obtained from each set of antennas 52A, 52B can be treated as if the two respective sets of information where obtained simultaneously from different radios at the AP.

AoA Spectrum Generation

Figure 3:
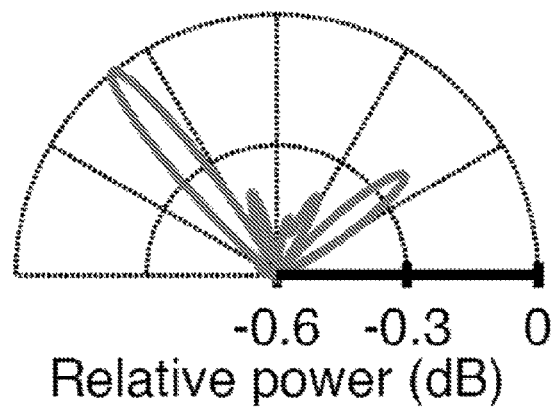
FIG. 3 illustrates an angle-of-arrival (AoA) spectrum of a signal received from a client device at a multi-antenna access point, where the AoA spectrum provides an estimate of the incoming power of the signal as a function of angle of arrival.

Especially in indoor wireless channels, RF signals reflect off objects in the environment, resulting in multiple copies of the signal arriving at the access point: this phenomenon is known as multipath propagation. An AoA spectrum of the signal received from a client at a multi-antenna AP 30 is an estimate of the incoming power of the signal as a function of angle of arrival, as shown in FIG. 3. Since strong multipath propagation is usually present indoors, the direct-path signal may be significantly weaker than reflected-path signals, or may even be undetectable. In these situations, the highest peak on the AoA spectrum corresponds to a reflected path instead of to the direct path to the client device. This makes indoor localization using AoA spectra alone highly inaccurate, hence the remaining steps in the processing by the ArrayTrack, which are described later.

Although the technology of phased arrays is generally well-established, for indoor applications there are certain complexities. For clarity of exposition, it is first described how an AP can compute angle of arrival information in free space (i.e., in the absence of multipath reflections), and then the principles are extended to handle multipath wireless propagation. The key to computing an angle of arrival of a wireless signal is to analyze the received phase at the AP, a quantity that progresses linearly from zero to $2\pi$ every RF wavelength $\lambda$ along the path from client device to the access point 30.

Figure 4:
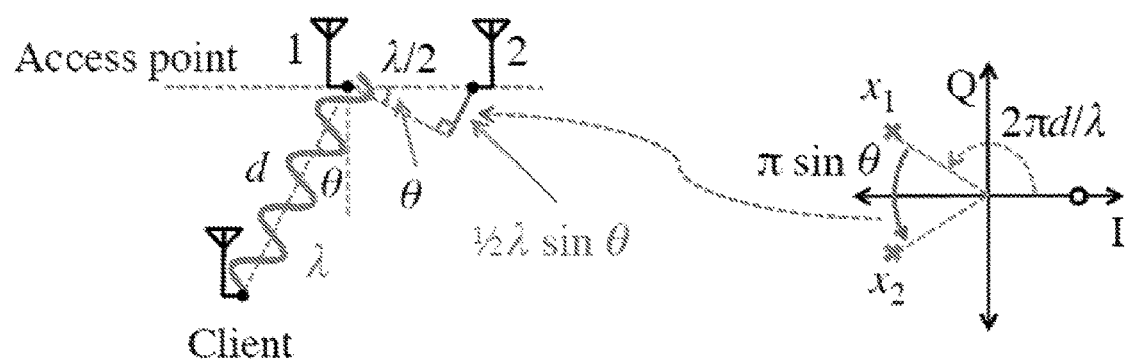
FIG. 4 illustrates the principle behind the AoA spectrum computation phase performed by the approach described herein in accordance with some embodiments of the invention.

FIG. 4 illustrates the principle behind the AoA spectrum computation phase performed by the ArrayTrack system. The left-hand portion of the diagram shows how the phase of the signal goes through a $2\pi$ cycle every radio wavelength $\lambda$, and the distance differential between the client device and successive antennas at the access point is dependent on the bearing (angle $\theta$) of the client device with respect to the access point. The right-hand portion of FIG. 4 depicts a complex representation of how the sent signal from the client (dot) and the received signals at the access point (crosses) reflect this relationship.

Accordingly, when the client device transmits a signal, the AP 30 receives it with a phase determined by the path length d from the client. Phase is particularly easy to measure at the physical layer, because software-defined and hardware radios represent the phase of the wireless signal graphically using an in-phase-quadrature (I-Q) plot, as shown in the right-hand portion of FIG. 4. Here, the angle measured from the I axis indicates the phase. Using the I-Q plot, it can be seen that a distance d adds a phase of $2\pi d/\lambda$ as shown by the angle measured from the I axis to the cross labelled $X_1$ (representing the signal received at antenna 1 in the left-hand portion of FIG. 4). Since there is a $\lambda/2$ separation between the two antennas 1 and 2 shown in the left-hand portion of FIG. 4, the distance along a path arriving at bearing $\theta$ is a fraction of a wavelength greater to antenna 2 than to antenna 1. This fraction is dependent on $\theta$, and making the assumption that $d \gg \lambda/2$ (which is very reasonable, given that the wavelength of WiFi transmission is of the order of 0.1 meters or less), the added distance is $\frac{1}{2} \lambda \sin \theta$.

In the absence of multipath, a particularly effective way to compute $\theta$ at a two-antenna access point is as follows: measure $X_1$ and $X_2$ directly, computer the phase of each, represented as $\varphi(X_1)$ and $\varphi(X_2)$, and then solve for $\theta$ as:

$$\theta = \arcsin[(\varphi(X_1) - \varphi(X_2))/\pi] \quad (1)$$

In indoor multipath environments however, Equation (1) quickly breaks down, because the signals from multiple paths sum in the I-Q plot. This problem can be mitigated by adding multiple, for example M, antennas. In these circumstances, the best known algorithms are based on an eigenstructure analysis of an M×M correlation matrix $R_{xx}$, in which the entry at the lth column and mth row is the mean correlation between the signals from the lth and mth antennas.

Suppose that D signals $s1(t), \ldots, sD(t)$ arrive from respective bearings $\theta 1, \ldots \theta D$ at M>D antennas, and that $X_j(t)$ is the signal received at the jth antenna element at time t. Recalling the relationship between measured phase differences and AP bearing discussed above, an array steering vector $a(\theta)$ can be used to characterize how much added phase (relative to the first antenna) we see at each of the other antennas, as a function of the bearing of the incoming signal.

For a linear array:

$$a(\theta) = \exp\left(\frac{-j2\pi d}{\lambda}\right) \begin{bmatrix} 1 \\ \exp(-j\pi\lambda\cos\theta) \\ \exp(-j2\pi\lambda\cos\theta) \\ \vdots \\ \exp(-j(M-1)\pi\lambda\cos\theta) \end{bmatrix} \quad (2)$$

We can therefore express what the AP receives as:

$$x(t) = \overbrace{[a(\theta_1) \; a(\theta_2) \; \ldots \; a(\theta_D)]}^{A} \begin{bmatrix} s_1(t) \\ s_2(t) \\ \vdots \\ s_D(t) \end{bmatrix} + n(k), \quad (3)$$

where n(k) is noise with zero mean and $\sigma_n^2$ variance. This means that we can express as $R_{xx}$ as:

$$\begin{aligned} R_{xx} &= \mathbb{E}[xx^*] \\ &= \mathbb{E}[(As + n)(s^*A^* + n^*)] \\ &= A\mathbb{E}[ss^*]A^* + \mathbb{E}[nn^*] \\ &= AR_{ss}A^* + \sigma_n^2 I \end{aligned} \quad (4)$$

where $R_{ss} = \mathbb{E}[ss^*]$ is the source correlation matrix.

The array correlation matrix $R_{xx}$ has M eigenvalues $\lambda 1, \ldots, \lambda M$ associated respectively with M eigenvectors $E = [e_1 \; e_2 \; \ldots \; e_M]$. If the noise is weaker than the incoming signals, then when the eigenvalues are sorted in non-decreasing order, the smallest M-D correspond to the noise while the next D correspond to the D incoming signals. Based on this separation, the corresponding eigenvectors in E can be classified as noise or signal:

$$E = \left[ \underbrace{e_1 \; \ldots \; e_{M-D}}_{E_N} \; \underbrace{e_{M-D+1} \; \ldots \; e_M}_{E_S} \right] \quad (5)$$

We refer to $E_N$ as the noise subspace and $E_S$ as the signal subspace.

The MUSIC AoA spectrum [25] inverts the distance between a point moving along the array steering vector continuum and $E_S$. This yields sharp peaks in the $P(\theta)$ at the AoAs of the signals.

$$P(\theta) = \frac{1}{a(\theta)E_N E_N^* a(\theta)} \quad (6)$$

Figure 5:
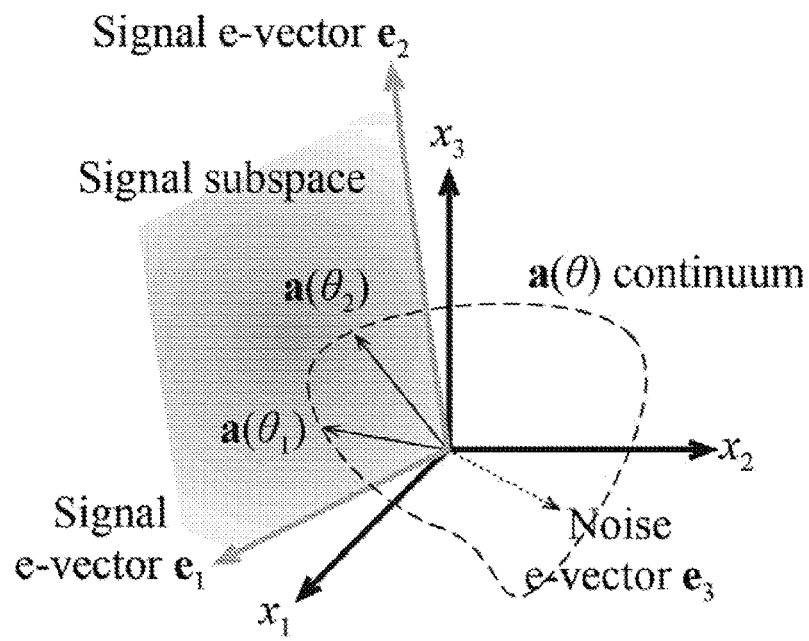
FIG. 5 illustrates the identification of a signal subspace for computing the AoA in accordance with some embodiments of the invention.

FIG. 5, which is adapted from adapted from Schmidt [25], illustrates this identification of the signal subspace for the example of a system having three antennas and receiving two incoming signals at bearings $\theta_1$ and $\theta_2$ respectively, which lie in a three-dimensional space. The eigenvector analysis identifies the two-dimensional signal subspace shown, and the MUSIC algorithm traces along the array steering vector continuum measuring the distance to the signal subspace.

Note that in most situations, the number of signals is not known. One way of assessing the number of signals (the value of D in equation (5) above) is that the noise eigenvalues tend to cluster together. Hence those eigenvalues that exceed some threshold (which excludes this clustering) can be regarded as signal, and the remaining eigenvalues below this threshold can be regarded as noise.

Figure 6:
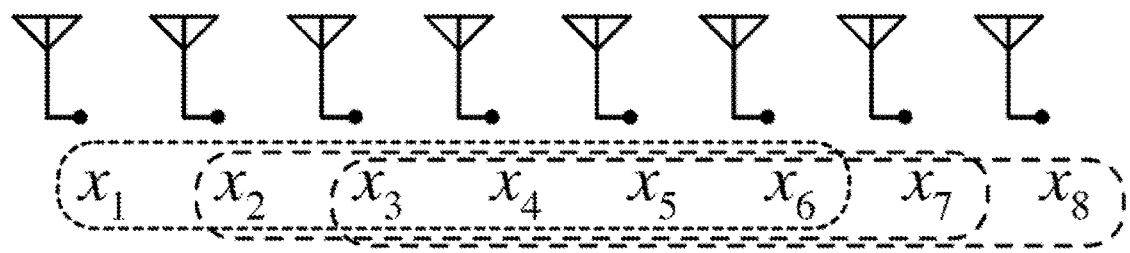
FIG. 6 depicts spatial smoothing of signals from an eight antenna array for computing the AoA in accordance with some embodiments of the invention.

A standard implementation of the MUSIC algorithm in the context of the ArrayTrack system, however, yields highly distorted AoA spectra. The reason for this is that when the incoming signals are phase-synchronized with each other (as results from multipath), the MUSIC algorithm perceives the distinct incoming signals as one superposed signal, resulting in false peaks in $P(\theta)$. Accordingly, the ArrayTrack system performs spatial smoothing [26], averaging incoming signals across $N_G$ groups of antennas, to reduce this correlation. For example, spatial smoothing over $N_G=3$ six-antenna groups on an eight-antenna array which receives signals $X_1, \ldots, X_8$, would output six signals $\dot{X}_1, \ldots, \dot{X}_6$, where $\dot{X}_i = (\dot{X}_i + \dot{X}_{i+1} + \dot{X}_{i+2})/3$ for $1 \leq i \leq 6$. This smoothing is illustrated schematically in FIG. 6, which depicts spatial smoothing of signals $X_1, \ldots, X_8$ from an eight antenna array to give a virtual six-element array with number of groups, $N_G$, equal to 3.

Figure 7:
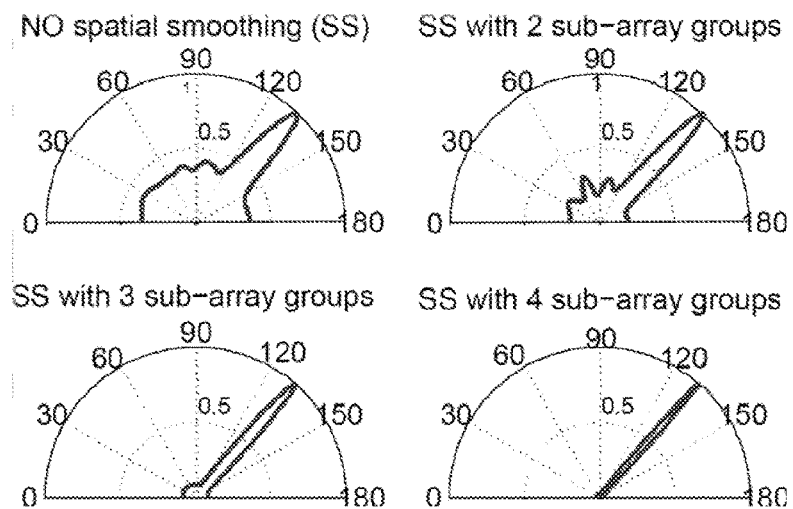
FIG. 7 is a schematic diagram showing micro-benchmark results for setting $N_G$ (number of groups) for use in the spatial smoothing of FIG. 6 in accordance with some embodiments of the invention.

FIG. 7 shows a micro-benchmark for setting $N_G$ when computing MUSIC AoA spectra for a client device near and in the line of sight of the AP (so that the direct path bearing dominates $P(\theta)$ both with and without spatial smoothing. It can be seen that as $N_G$ increases, the effective number of antennas decreases, so spatial smoothing can eliminate smaller peaks that may correspond to the direct path. On the other hand, as $N_G$ increases, the overall noise in the AoA spectrum decreases, and some peaks may be narrowed, potentially increasing accuracy. Based on this micro-benchmark, and on other experience in generating AoA spectra indoors from a number of different clients using the test system described herein, it has been found that a good compromise is to set $N_G=2$, and this is the value adopted in the current implementation as described below.

The ArrayTrack system uses a linear array of antennas 30. As a result, the AoA information from this linear array is not equally reliable as a function of $\theta$ because of the asymmetric physical geometry of the array. Consequently, after computing a spatially-smoothed MUSIC AoA spectrum, the ArrayTrack system multiplies it by a windowing function $W(\theta)$, the purpose of which is to weight information from the AoA spectrum in proportion to the confidence that we have in the data. With a linear array, we set:

$$W(\theta) = \begin{cases} 1, & \text{if } 15° < |\theta| < 165° \\ \sin\theta, & \text{otherwise} \end{cases} \quad (7)$$

The rationale behind this choice of $W(\theta)$ is given in Appendix A.

Although a linear antenna array can determine bearing, it cannot determine which side of the array the signal is arriving from. This means that the AoA spectrum is essentially a 180° spectrum mirrored to 360°. When there are many APs 30 in the ArrayTrack system 10 cooperating to determine location, this is not a problem, because the bilateral ambiguities can be resolved based on the combination of results from multiple different APs. However, if there are only few APs, then the location accuracy may suffer because of the bilateral ambiguity. To address this issue, the diversity synthesis scheme described above is employed to utilise a ninth antenna not in the same row (set) as the other eight. In other words, the analysis uses results from one set of antennas, 52A or 52B, plus one antenna (the ninth) from the other set. Based on the ninth antenna, the total power on each side can be calculated, and the half with less power removed, thereby resulting in a true 360° AoA spectrum.

Note that other embodiments may have a different configuration or pattern of antennas, rather than a linear array (or a pair of linear arrays). For example, a set of multiple antennas may be arranged in an octagon, a circle or cross, or in any other regular or irregular pattern across two or three dimensions. Provided that the relative positions of the set of antennas are known, the signals from such antennas can be processed to derive an AoA spectrum for a signal source based on arrival times (relative phase) of the signals at the respective antennas. Such processing may be relatively complex for some antenna configurations or patterns, which may slightly increase the overall system latency (see below). In practice however, a more significant factor is that linear arrays of antennas, such as shown in FIG. 1, tend to be commodity items, and hence are most readily available at favourable cost.

Multipath Suppression

Although the spatial smoothing algorithms described above reduce multipath-induced distortion of the AoA spectrum to yield a more accurate spectrum, they do not identify the direct path. This therefore leaves multipath reflections free to reduce system accuracy. Accordingly, the ArrayTrack system includes a multipath suppression algorithm for removing or reducing peaks in the AoA spectrum not associated with the direct path from client device to the AP. This multipath suppression algorithm leverages changes in the wireless channel that occur when the transmitter or objects in the vicinity move by grouping together AoA spectra from multiple frames (if available). This approach is motivated by the following observation: when there are small movements of the transmitter, the receiver, or objects between the two, the direct-path peak on the AoA spectrum is usually stable, whereas the reflection-path peaks usually change significantly.

Figure 8:
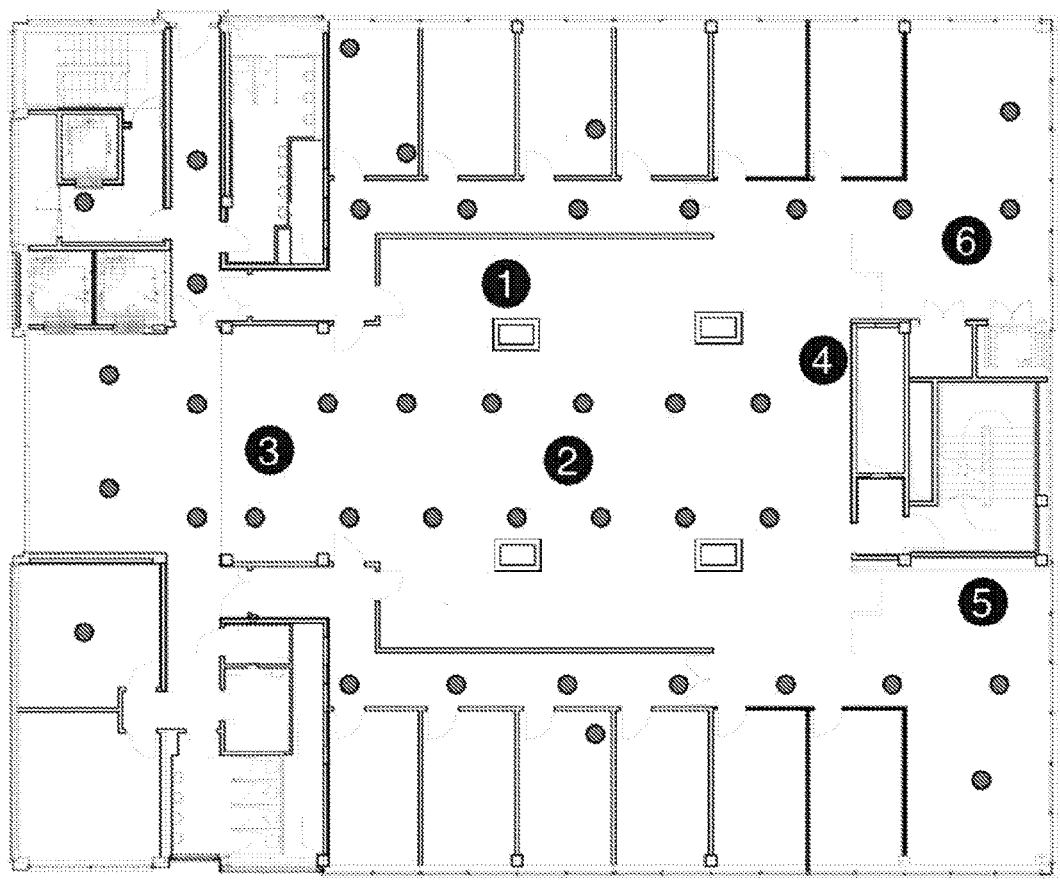
FIG. 8 is a schematic diagram of a test-bed environment for investigating the approach described herein.

As a micro-benchmark, the ArrayTrack system was tested at 100 randomly chosen locations in the test bed illustrated in FIG. 8. In this test-bed environment, the positions of Soekris clients (see www.soekrs.com), as mentioned below, are marked as small dots, while the locations of APs 30 are labelled 1-6. AoA spectra were generated at each of the arbitrarily selected positions, and plus at another position five centimeters away from each selected position. If the corresponding bearing peaks of the two spectra resulting from each selected position were within five degrees of one another, the result for that bearing was regarded as unchanged. Conversely, if the variation was more than five degrees, or if the peak vanishes, the result was mark as changed. The results for this micro-benchmark are presented in Table 1 below.

TABLE 1

Peak stability microbenchmark measuring the frequency of the direct and reflection-path peaks changing due to slight movement.

| Scenario | Frequency |
|---|---|
| Direct path same; reflection paths changed | 71% |
| Direct path same; reflection paths same | 18% |
| Direct path changed; reflection paths changed | 8% |
| Direct path changed; reflection paths same | 3% |

It can be seen from Table 1, that in the majority of cases, the direct-path peak is unchanged by the five centimeter change in position, whereas the reflection paths are changed. This finding motivates the following multipath suppression algorithm:

1) Group two to three AoA spectra from frames spaced closer than 100 ms in time; if no such grouping exists for a spectrum, then output that spectrum to the synthesis step (described below).
2) Arbitrarily choose one AoA spectrum as the primary, and remove peaks from the primary that are not paired with peaks on the other AoA spectra.
3) Output the primary to the synthesis step (described below).

Figure 9:
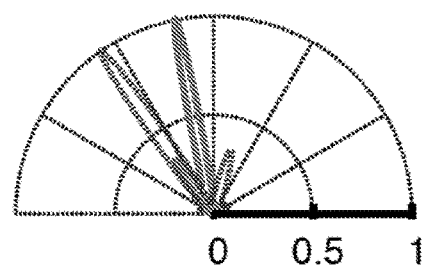
FIG. 9 illustrates results from an example of the operation of the multipath suppression algorithm in accordance with some embodiments of the invention.
Figure 9:
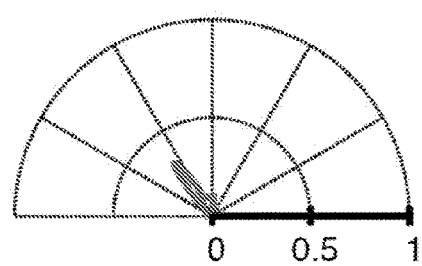

FIG. 9 presents an example of the operation of the above multipath suppression algorithm. The left-hand portion of FIG. 9 shows two example AoA spectra, one of which is denoted as the primary (in red), the other one AoA spectra being shown in blue. The right-hand portion of FIG. 9 shows the resulting output after the application of the multipath suppression algorithm. It can be seen that the larger original peak from the primary has been removed, leaving only a smaller peak from the primary which is considered to represent the direct-path peak.

Note that for those situations in which both the direct-path and reflection-path peaks are unchanged, then all of the peaks are retained, but without any deleterious consequences. Note also that the micro-benchmark summarised in Table 1 only captured two packets. Even further improvement is likely to be obtained if additional (i.e. >2) packets are captured during the course of movement of the mobile (client) device. The only scenario which induces a failure in the above multipath suppression algorithm is when the reflection-path peaks remain unchanged, while the direct-path peak is changed. However, as indicated in Table 1, the chances of this happening are small (~3% in the micro-benchmark).

A variety of other techniques could be employed to address multipath issues instead of (or in conjunction with) the above approach. One possibility exploits the fact that if two spaced antennas see the same signal, each at a respective measured direction, then the closer the source of this signal, the greater the convergence of the two measured directions (analogous to standard triangulation). Since the direct path to the source must always be shorter than any reflected path, the direct path can be discriminated based on having the greatest convergence. Adopting this approach in the context of the antenna array 50 of FIG. 1, each set 52A, 52B of antennas would correspond to one of the two spaced antennas. Another possibility is to decode the received packet(s) for each signal. If packets from two different signals are found to contain the same data content, then (at least) one signal of the two signals must represent a multipath component, and this information can be utilised to help subtract a multipath component from the received signal. This approach is sometimes referred to as successive interference cancellation. In addition, successive interference cancellation may be used to help handle multiple overlapping packets from different senders (collisions).

AoA Spectra Synthesis

Figure 10:
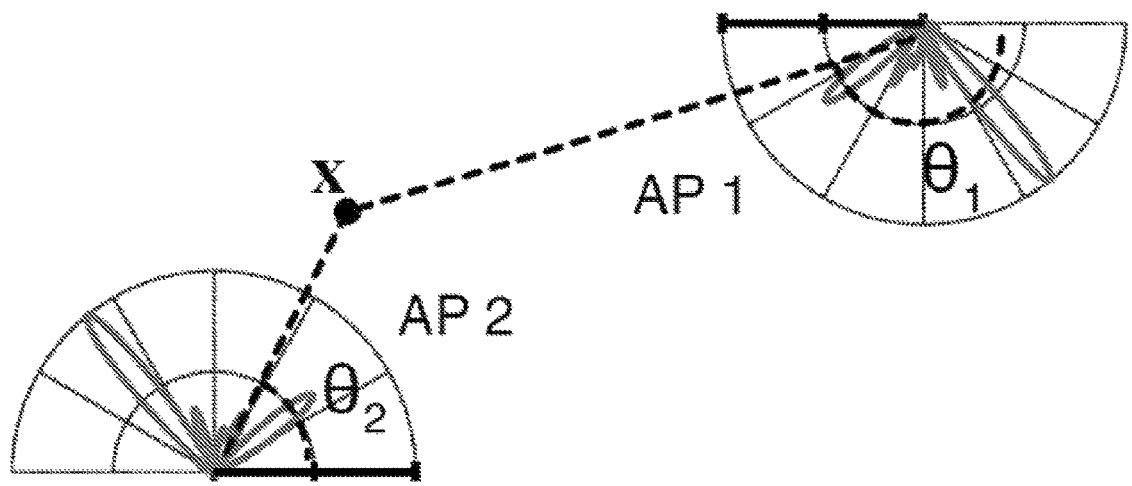
FIG. 10 illustrates how information from multiple APs is combined to produce an overall likelihood of the client being at location x in accordance with some embodiments of the invention.

In this step, the ArrayTrack system combines the AoA spectra of multiple different APs 30 into a final location estimate for the client device. Suppose that N APs generate AoA spectra $P_1(\theta), \ldots, P_N(\theta)$ as described above, and it is desired to compute the likelihood of the client device being located at position x, as illustrated in FIG. 10. More particularly, FIG. 10 shows how the ArrayTrack system works to combine information from multiple APs into a likelihood of the client being at location x by considering all AoA spectra, in particular, at their respective bearings ($\theta_1, \theta_2$) to x. Thus as depicted in FIG. 10, the ArrayTrack system computes the bearing ($\theta_i$) from x to each respective AP(i) by trigonometry. The likelihood of the client being at location x, denoted as L(x), is then given by:

$$L(x) = \prod_{i=1}^{N} P_i(\theta_i). \qquad (8)$$

Equation 8 is used to search for the most likely location of the client device by forming a 10 centimeter by 10 centimeter grid, and evaluating L(x) at each point in the grid. A hill climbing technique is then used starting from the three positions with highest L(x) in the grid, using the gradient defined by Equation 8 to refine the location estimate.

In some embodiments, the results from the different APs are processed to perform outlier rejection. Thus in most statistical estimation, it is assumed that multiple observations are obtained from a given distribution having certain parameters, and the statistical estimation attempts to determine from the measured samples the parameter value(s) of the given distribution. An outlier can then be regarded as a sample which arises from a different distribution (rather than from the given distribution of interest). Accordingly, rejecting the outlier from the analysis improves the parameter estimation for the given distribution of interest. In the context of the present application, an AoA bearing from an AP based on a direct peak would represent a sample from the true distribution of interest, whereas an AoA bearing from an AP based on a multipath peak would represent an outlier from an incorrect distribution.

If there are N APs deployed, with N≥3, then one can choose any number M (with N≥M≥3) of APs for which to process the location information, resulting in a number K of possible subsets given by:

$$\sum_{M=3}^{N} \binom{N}{M}$$

Choosing the maximum number of APs generally presents a good result, but it is not always the best result. Accordingly, it is possible to employ the Mahalanobis distance [42] to compare all the locations generated by all different AP combinations. By applying a threshold, the locations can be separated into two groups—and the group having a Mahalanobis distance greater than the threshold can be rejected as outliers. The remaining results may be averaged or otherwise combined as appropriate to obtain a final location result. Other robust estimation techniques may also be adopted to provide resilience against outliers.

Implementation

A prototype ArrayTrack AP 30 comprises two Rice University wireless open-access radio platform (WARP) (see http://warp.rice.edu/trac/wiki/about) FPGA-based wireless radios, with each WARP radio being equipped with four radio front ends and four omnidirectional antennas. The digital I/O pins on one of the WARP boards is used to output a time synchronization pulse on a wire connected between the two WARPs, so that the second WARP board can record and buffer the same time-indexed samples as the first board. The WARP boards run a custom FPGA hardware design, architected with Xilinx System Generator (see www.xilinx.com), for digital signal processing to implement all the functionality described above.

The 16 antenna attached to the two WARP radios in an AP 30 are placed in a rectangular geometry, as generally indicated in FIG. 1. The antennas are spaced at a half wavelength distance (6.13 cm) so as to yield maximum AoA spectrum resolution. This also happens to yield maximum MIMO wireless capacity, and so is the arrangement preferred in commodity APs. In general terms, the more antennas provided in any given array, the better the positional resolution of the AoA produced by that array.

Note that equipping an AP 30 with multiple antennas 51A, 51B is necessary for the ArrayTrack system, but does not, in itself, enable all the AoA determinations described above. In particular, each radio receiver incorporates a 2.4 GHz oscillator whose purpose is to convert the incoming radio frequency signal to its representation in I-Q space as shown, for example, in FIG. 4 (right-hand portion). One consequence of this down-conversion step is that it introduces an unknown phase offset to the resulting signal, rendering AoA inoperable. This is permissible for MIMO, but not for position determination, because this manifests as an unknown phase added to the constellation points in FIG. 4.

The Arraytrack system 10 overcomes this problem by phase-calibrating the array 30 with a universal software radio peripheral (USRP2) that generates a continuous wave tone, thereby measuring each phase offset directly. Subtracting the measured phase offsets from the incoming signals over the air then cancels the unknown phase difference, and so AoA as described herein becomes feasible. Note that phase-calibration is an automatic process that happens at each AP on power-up without human intervention. Phase-calibration is distinct and different from the overall location system calibration step that many existing systems require, which is time-consuming and requires extensive human intervention.

The client devices used for testing the ArrayTrack system are Soekris boxes equipped with Atheros 802.11g radios operating in the 2.4 GHz band (see www.soekris.com).

Evaluation

To demonstrate the performance of the ArrayTrack system 10 in an indoor office environment, experimental results are presented as derived from the test environment described above. Firstly, the level of accuracy achieved by the ArrayTrack system in a challenging indoor office environment will be discussed, together with the effects of the number of antennas and the number of APs on the performance of ArrayTrack system. Secondly, it is shown that the ArrayTrack system is robust against different transmitter/receiver heights and different antenna orientations between a client device and the APs. Finally, the latency introduced by the ArrayTrack system is considered—this is a very significant factor for a real-time system.

The experimental methodology for investigating the performance of the ArrayTrack system 10 included placing prototype APs (the WARP radio units) at the locations marked "1"-"6" in the test-bed floor-plan of FIG. 8. The layout depicted by FIG. 8 shows the basic structure of the office, but does not include the numerous cubicle walls which were also present. There were 41 client device (the Soekris boxes), which were distributed approximately uniformly over the floor-plan, covering areas both near to and far away from the APs. Some clients were located near metal, wood, glass and/or plastic walls to make the experiments more comprehensive. Some client devices were placed behind concrete pillars in an office, so that the direct path between the AP and client is blocked, making the location problem significantly more challenging.

To measure ground truth in these location experiments, scaled architectural drawings of the building were used, combined with measurements taken from a Fluke 416D laser distance measurement device, which has an accuracy of 1.5 mm over 60 m. Due to limitations on available equipment, one WARP AP was used for the experiment, and this was moved between different AP locations (1-6) marked in FIG. 12. The AP in each location received new packets to emulate many APs receiving a transmission simultaneously. As a consequence of this approach, the results obtained will tend to overestimate the magnitude of the location error. This is because the time interval between moving the WARP AP from location to location and taking measurements was approximately one day, which is well outside the wireless channel coherence time, and also much greater than the time it takes for a wireless channel to change because of motion of objects nearby. If we assume that the nearby object motion between the measurements at different APs is random and uncorrelated with the wireless channel, such random changes in the wireless channel can only (on average) add error (noise) to the system.

The static localization accuracy was evaluated to determine how accurately the AoA pseudospectrum computation is able to localize a client, without any array geometry weighting or reflection path removal. This generally represents the performance that ArrayTrack system would obtain in a static environment without any client movement, or other movement nearby.

Figure 11:
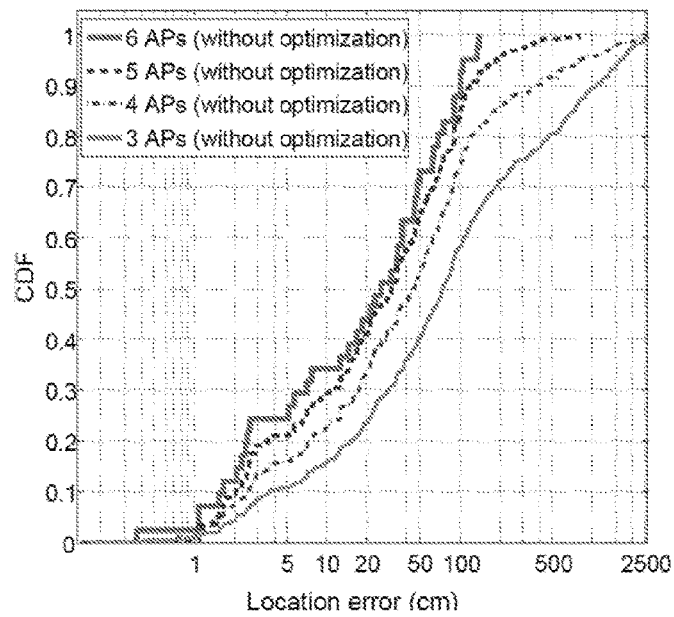
FIG. 11 is a graph illustrating some experimental results that demonstrate the static localization accuracy for some embodiments of the present invention, using different numbers of access points (APs).

FIG. 11 illustrates some of the results from this evaluation, and includes curves labelled three APs, four APs, five APs, and six APs. These curves show the cumulative distribution of raw location error computed using Equation (8) above from raw AoA spectral information from clients using measurements taken at all combinations of three, four, five and six APs, and for all 41 client devices. We can see from FIG. 11 that the general trend is for average error to decrease with an increasing number of APs. The median error varies from 75 cm for three APs to just 26 cm for six APs. The average (mean) error varies from 317 cm for three APs to 38 cm for six APs. This finding is also supported by FIG. 12, which presents a series of heat-maps representing the likelihood of the client device having a given location (the ground truth location of the client device is indicated in each heat map by a small dot, centre-right). The series of heat-maps in FIG. 12 combine results from an increasing number of APs going from left to right (starting with the use of data from just a single AP, through to a combination of information from five APs). It can be clearly seen from FIG. 12 that increasing the number of APs that provide location information allows the location of the client device to be estimated with increasing accuracy (and decreasing ambiguity).

To assess the mobile localization accuracy, the ArrayTrack system was evaluation using data that incorporates small (less than 5 cm) movements of the client device, with two such location samples per client. This is representative of human movement even when stationary, due to small inadvertent movements, and covers all cases where there is more movement up to walking speed.

Figure 12:
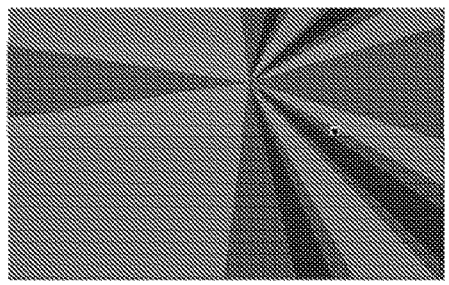
FIG. 12 comprises a series of heat-maps which combine results from an increasing number of APs going from left to right, the results being obtained in accordance with some embodiments of the invention. The heat maps reflect the likelihood of the client device being located as a given position on the map.
Figure 12:
Figure 12:
Figure 12:
Figure 12:
Figure 12:
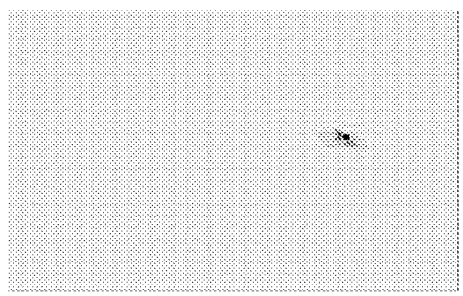
Figure 13:
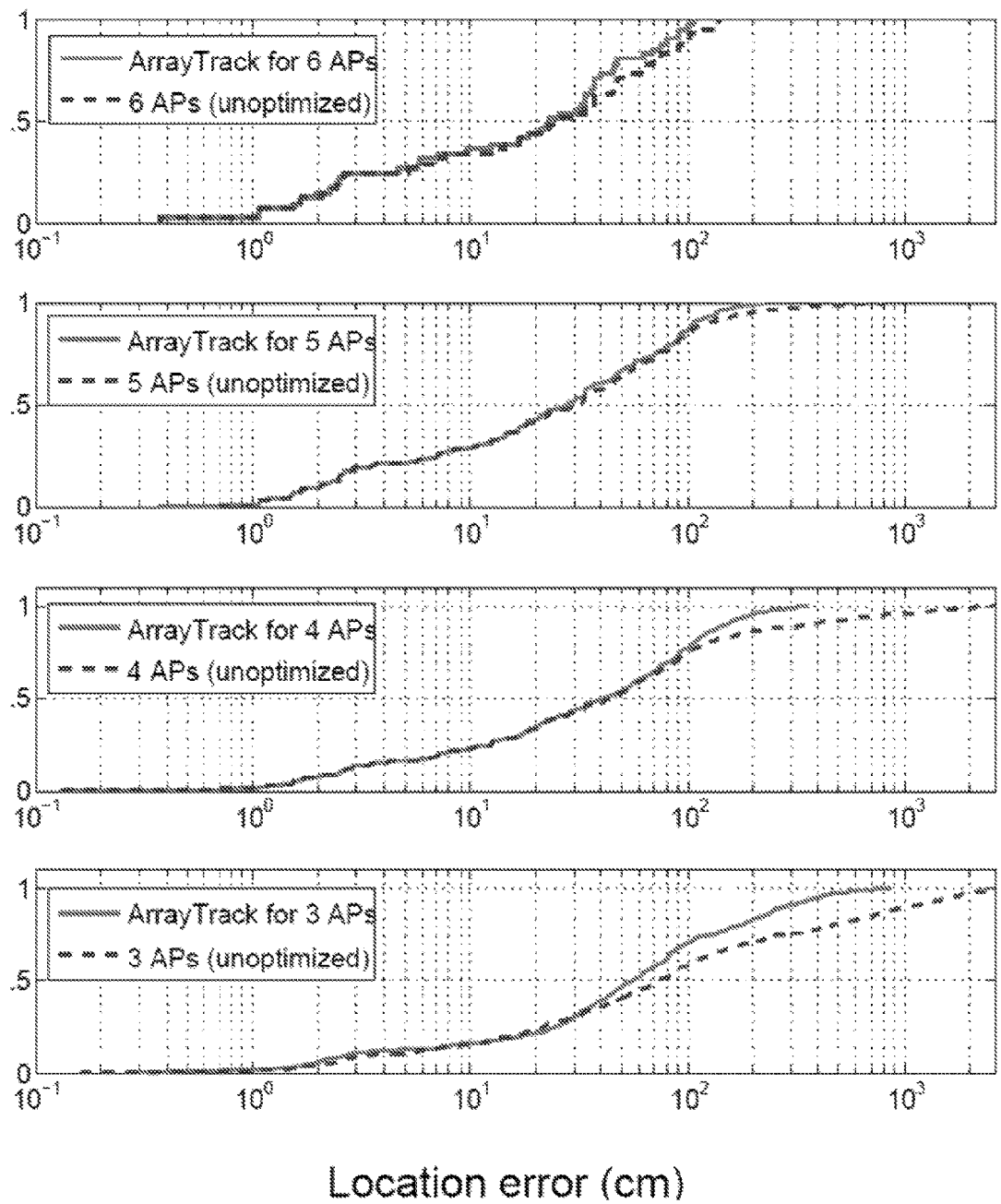
FIG. 13 is a graph showing the cumulative distribution of location errors across clients for three, four, five and six APs, comparing unoptimized processing (as per FIG. 11) with optimized (or enhanced) processing in accordance with some embodiments of the invention.

FIG. 13 is a graph showing the cumulative distribution of location errors across clients for three, four, five and six APs. In particular, FIG. 13 compares the unoptimized results from the static localization (as shown in FIGS. 11 and 12) with the optimized results from the mobile localization. It can be seen from FIG. 13 that the additional processing for the mobile localization, in particular the inclusion of the array geometry weighting and the reflection path removal, clearly improves the accuracy level, especially when the number of APs is small. In this experiment, the optimization improves the mean accuracy level from 38 cm to 31 cm for six APs (a 20% improvement), and 90%, 95% and 98% of clients were measured to be within 80 cm, 90 cm and 102 cm respectively of their actual positions.

The improvement shown in FIG. 13 is mainly due to the array geometry weighting, which removes the relatively inaccurate parts of the spectrum approaching 0 degrees or 180 degrees (close to the line of the antenna array). When there are only three APs, this processing improves the mean accuracy level from 317 cm to 107 cm, which is around a 200% improvement. The intuition behind this large performance improvement is the effective removal of the false positive locations caused by multipath reflections and redundant symmetrical bearings. When a larger number of APs is utilised, such as five or six APs, the heat-map combination shown in FIG. 12 inherently reinforces the true location and removes false positive locations. However, when the number of APs is relatively small, this reinforcement is not always so effective; sometimes the array symmetry may cause false positive locations, which greatly degrades the localization performance. In these cases, the array symmetry removal scheme described above is enabled (based on the use of a ninth antenna in an AP). This has been found to enhance accuracy by a significant amount. For example, by using this technique, the ArrayTrack system has achieved accuracy levels with a median of 57 cm using only three APs, which is precise enough for many indoor applications.

Figure 14:
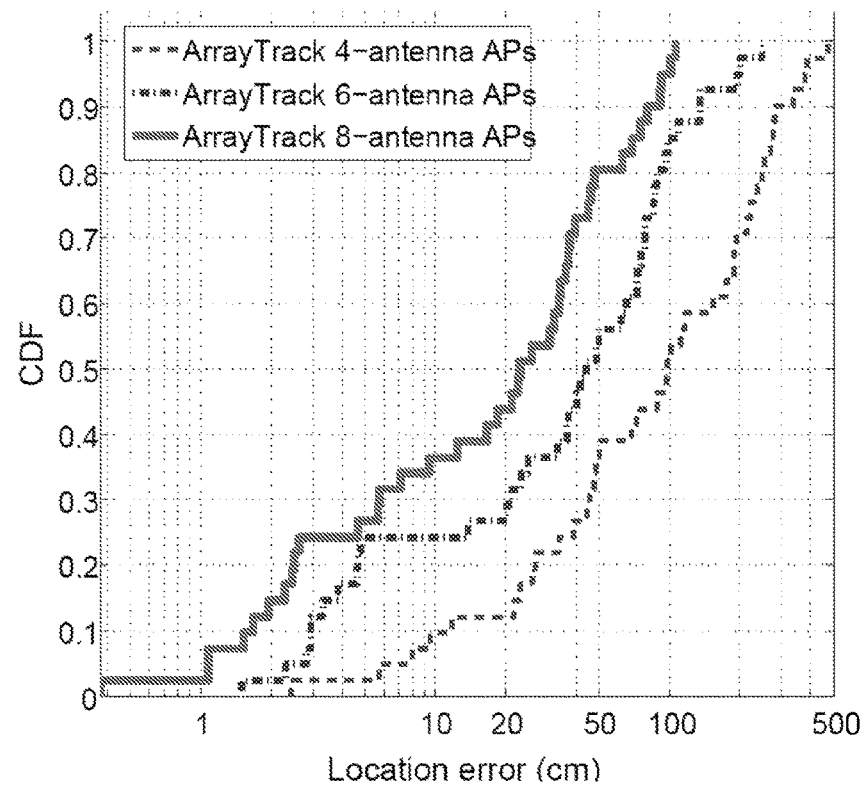
FIG. 14 presents experimental results showing the change in cumulative density function for location error for four, six and eight antennas in accordance with some embodiments of the invention.

The performance of the ArrayTrack system 10 with a different number of antennas 51 at each AP 30 will now be discussed. In general, having more antennas at each AP allows a more accurate AoA spectrum to be obtained, including the capture of a higher number of reflection-path bearings. This in turn increases the resulting localization accuracy. FIG. 14 presents experimental results showing the change in cumulative density function for location error for four, six and eight antennas. Because the spatial smoothing is applied on top of the MUSIC algorithm, the effective number of antennas is actually reduced somewhat, and this prevents capture all the arriving signals when the number of antennas is small. The mean accuracy level is 138 cm for four antennas, 60 cm for six antennas and 31 cm for eight antennas. Note that the improvement gap between four and six antennas is considerably bigger than the improvement between six and eight antennas.

Figure 15:
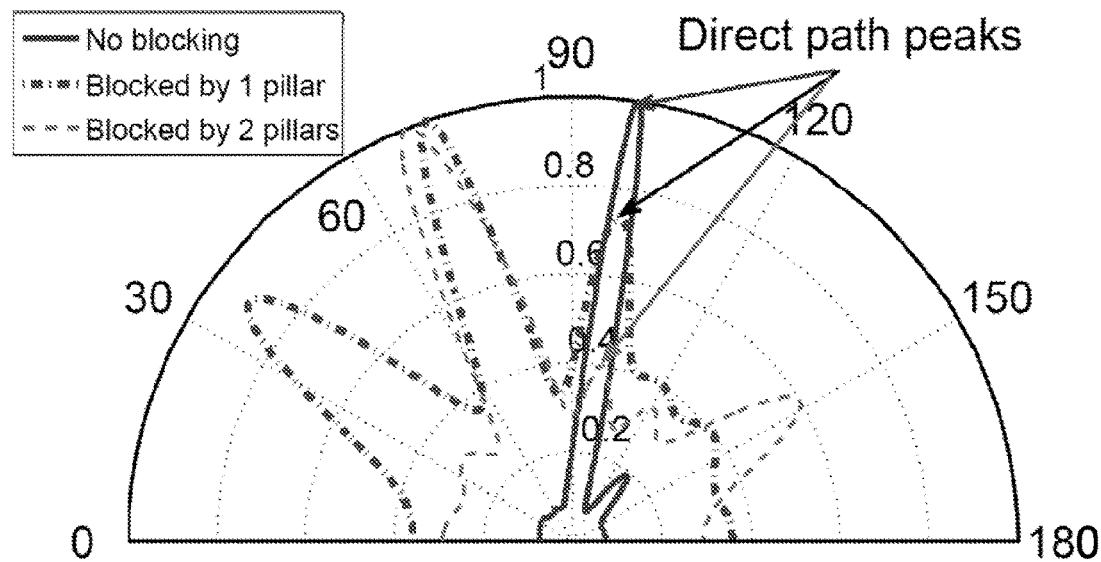
FIG. 15 provides experimental results in the form of AoA spectra illustrating how the amount of blocking impacts the direct path peak in accordance with some embodiments of the invention.

In a strong multipath indoor environment like the office space shown in FIG. 8, the direct path signal is not always the strongest, but it is nevertheless usually one of the three biggest signals. FIG. 15 presents experimental AoA spectrum with different lines corresponding to different amounts of blocking (by one or two pillars) on the direct path. In particular, FIG. 15 illustrates how the amount of blocking impacts the direct path peak, by keeping the client device on the same line with respect to the AP, while blocking the client device with more pillars. Even when the client device is blocked by two pillars, the direct path signal is still one of the three strongest signals (although not the strongest). Having five virtual antennas, after spatial smoothing, has been found to avoid the loss of direct path signals (as sometimes happens when using only four antennas).

The accuracy improvement from six to eight antennas is due to the more accurate AoA spectrum obtained. However, with an increasing number of antennas, there will be some point when a further increase in the number of antennas does not improve accuracy any more, as the dominant factor will be the calibration, antenna imperfection, noise and correct alignment of antennas (plus human measurement errors introduced with laser meters in the experiments themselves). In general, it is has been found that an antenna array with six antennas (30.5 cm long) or eight antennas (43 cm long) gives very reasonable performance.

Robustness

Robustness to varying client height, orientation, low SNR, and collisions is an important characteristic for the ArrayTrack system. This section therefore investigates the accuracy of the ArrayTrack system under these adverse conditions. Note that the ArrayTrack system is able to work with any part of the packet, but the current implementation utilises the preamble of the packet to work with, since this is transmitted at the base rate and forming a complex conjugate with the known training symbols generates peaks which are very easy to detect even at low SNR.

In terms of the height of the mobile (client) device, these typically rest on a table or are held in the hand, so that the client device is most often located around 1-1.5 meters off the ground. In contrast, APs 30 are usually located on the wall near the ceiling, typically 2.5 to 3 meters high. It has been investigated whether this height difference between clients and APs is likely cause significant errors the accuracy of the ArrayTrack system. In particular, the mathematical analysis given above is generally based on the assumption that clients and APs are at the same height (coplanar). In Appendix B below, it is shown that a 1.5 meter height difference introduces just 1%-4% error when the distance between the client and AP varies between five and 10 meters.

In the experiments performed on the ArrayTrack system, the AP is placed on top of a cart for easy movement with the antennas positioned 1.5 meters above the floor. To emulate a 1.5-meter height difference between AP and clients, the client devices were put on the ground, and the localization errors of the results were compared with the results obtained when the client devices were more or less on the same height as the AP (both heights used the same horizontal locations for the client devices, as illustrated in FIG. 8). Note that the relatively low height for the ArrayTrack system does not favour the experimental results, since lower AP positions are generally more susceptible to clutter from objects than an AP mounted higher on the wall near the ceiling.

Figure 16:
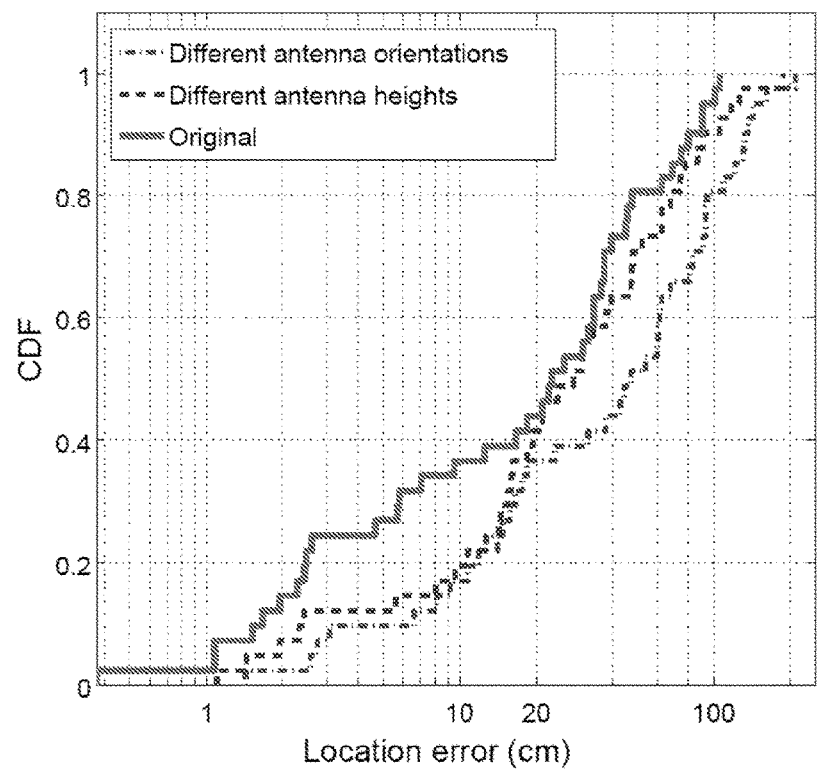
FIG. 16 presents experimental results showing the variation in cumulative density function for location error caused by changes in the antenna height or orientation (relative to the client device) in accordance with some embodiments of the invention.

FIG. 16 presents experimental results showing the change in cumulative density function for location error for eight antennas for an original signal (this is the same as the eight antenna result shown in FIG. 14), and then how the cumulative density function is impacted by changes in the antenna height or orientation (relative to the client device). These experimental results show that introducing the 1.5 height difference between the AP and the client device causes the median location error to increase slightly from 23 cm to 26 cm when the AP uses eight antennas. One relevant factor is that it is unlikely for a client to be close to all APs, as the APs are generally separated in space rather than being placed close to each other. It will be appreciated that difference in height is less significant for APs that are further from the client (because there is less angular deviation from the horizontal of the bearing from the AP to the client device). One advantage of the ArrayTrack system is the independence of each AP from the others, i.e., even if one of the multiple APs is generating inaccurate results, the rest will not be affected and will mitigate the negative effects of the inaccurate AP by reinforcing the correct location.

As an extension of the current ArrayTrack system, one or more vertically oriented antenna arrays may be used in conjunction with the existing horizontally-oriented arrays. This will allow the system to estimate elevation directly and hence provide full three-dimensional localization, thereby largely avoiding this source of error entirely.

Figure 16A:
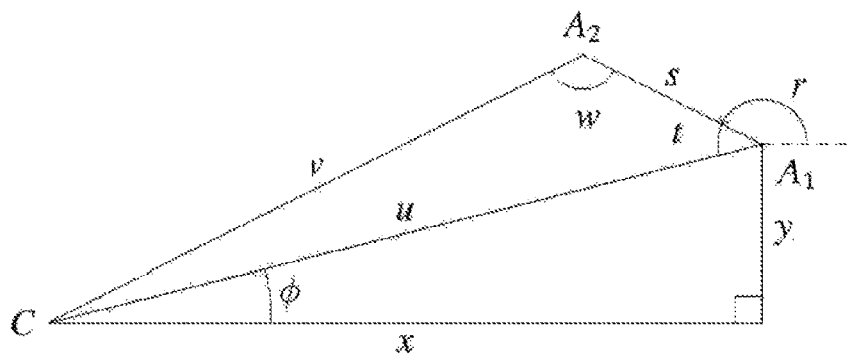
FIG. 16A is a schematic diagram illustrating the geometry of a client in relation to two antennas.

Considering the question of elevation in more detail, we assume that the position of a client device 169 in relation to a multi-antenna wireless access point 30 is such that the client has a different vertical position from the wireless AP 30 (i.e. a non-zero elevation). For ease of explanation, FIG. 16A shows a schematic diagram of such a single transmitting client (C) and a two antenna (A1, A2) receiver or access point (AP). The phase received at antenna A1 is delayed from the transmitting phase by $2\pi u/\lambda$, where $\lambda$ is the wavelength of the signal. Likewise, the phase received at antenna A2 is delayed from the transmitting phase by $2\pi v/\lambda$. This means that the additional distance traveled by the signal to reach A2 compared with A1 introduces a phase offset in the received signal which varies as $2\pi(v-u)/\lambda$. If we assume that the separation of A1 and A2, denoted as s in FIG. 16A, is small compared with the distance of the client C from the two antennas, i.e. s<<u and s<<v, then the line from C to A1 can be considered as approximately parallel to the line from C to A2. In this case, the phase shift becomes dependent only on the bearing of C from A1 and A2 (but not the distance). This bearing is denoted as $\omega$ in FIG. 16A and we have: $(v-u)=s \cos \omega$. This then allows us to express the shift in received phase between A2 and A1 as $2\pi(s \cos \omega)/\lambda$. Accordingly, given a measured phase shift and known wavelength $\lambda$ and antenna separation s, we can determine the bearing of the client w from the line from A2 to A1. Note that this bearing in effect defines the surface of a cone which is coaxial to the line from A2 to A1; the bearing contains no azimuthal information—i.e. the angle around a circle perpendicular to the line from A2 to A1 (and perpendicular to the main axis of the cone) is unknown.

The processing described above see e.g. the heat mappings, accommodates this azimuthal uncertainty by assuming that the client is in the same horizontal plane as the wireless AP, i.e. antennas A1 and A2. Although most practical situations the antennas A1 and A2 will lie in the same horizontal plane; however, in practice the client device may often be slightly out of this plane. For present purposes, it does not make a difference as to whether the elevation is positive or negative, i.e. whether the client device is located above or below the wireless AP. In practice, most indoor wireless APs are located relatively high up (near the ceiling), so that a client device is most likely to be located below the wireless AP.

We can investigate the impact of this departure from a purely horizontal configuration by defining the following three angles:
i) $\omega T$ which is the angle between (a) the line between A1 and A2, and (b) the line from C to A1/A2 (assuming as before that s<<u and s<<v). Note that $\omega T$ determines the phase shift as measured by the phased array;
ii) $\theta$, which is the elevation of the A1/A2 from C, i.e. the angle between the line from C to A1/A2 and a horizontal plane; and
iii) $\omega H$, which is the horizontal bearing, i.e. the angle between (a) the line between A1 and A2, and (b) the line from C' to A1/A2, where C' is a vertical projection of the true location of C into the horizontal plane containing A1 and A2.

The following geometric relationship holds: $\cos \omega T = \cos \theta \cdot \cos \omega H$. It can be seen that if we assume that the client device is in the same horizontal plane as the antenna array, then $\theta=0$, hence $\cos \theta=1$, so that $\omega H=\omega T$ (where $\omega T$ is determined from the measured phase shift). However, if the client device is not, in fact, in the same horizontal plane as the antenna array, then not only does this lead to an incorrect measurement of location in the vertical location, but it also impacts the measured bearing in the horizontal plane. In particular, although $\omega H$ will be determined to equal $\omega T$ (by making the assumption that the elevation is zero), in practice $\omega H$ is not equal $\omega T$ for any non-zero elevation (as can be seen from $\cos \omega T = \cos \theta \cdot \cos \omega H$). In other words, the phase shift added by the additional vertical difference traveled by the signal for a non-zero elevation introduces an error term when calculating the AoA in a horizontal plane; the measured phase difference is no longer determined only by the horizontal bearing of the client.

Figure 16D:
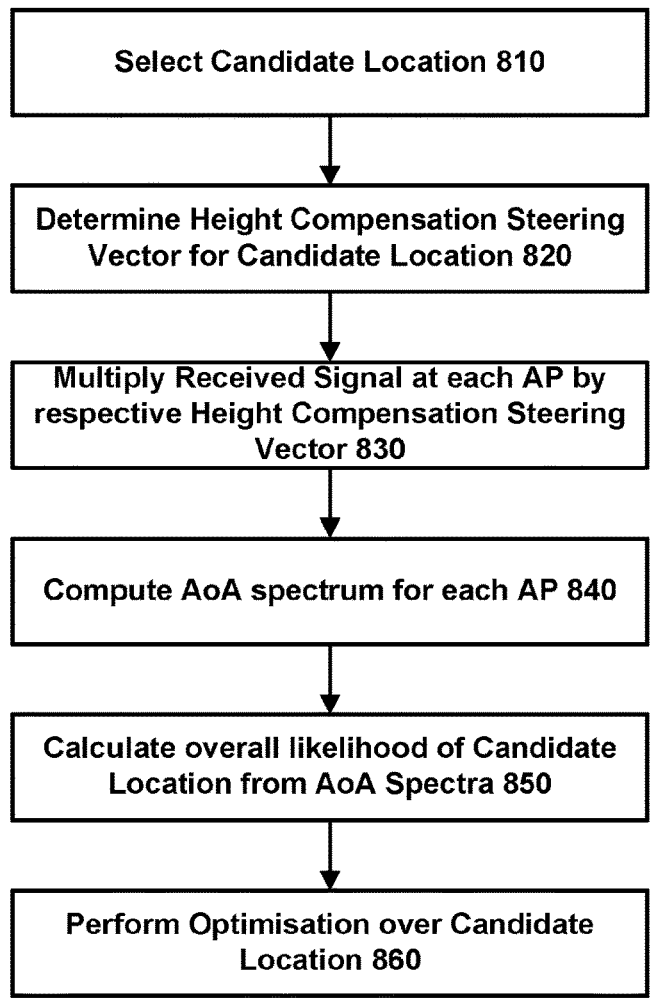
FIG. 16D is a flowchart representing a method for accommodating variation in height or elevation of a client (mobile) device in accordance with some embodiments of the invention.
Figure 16B:
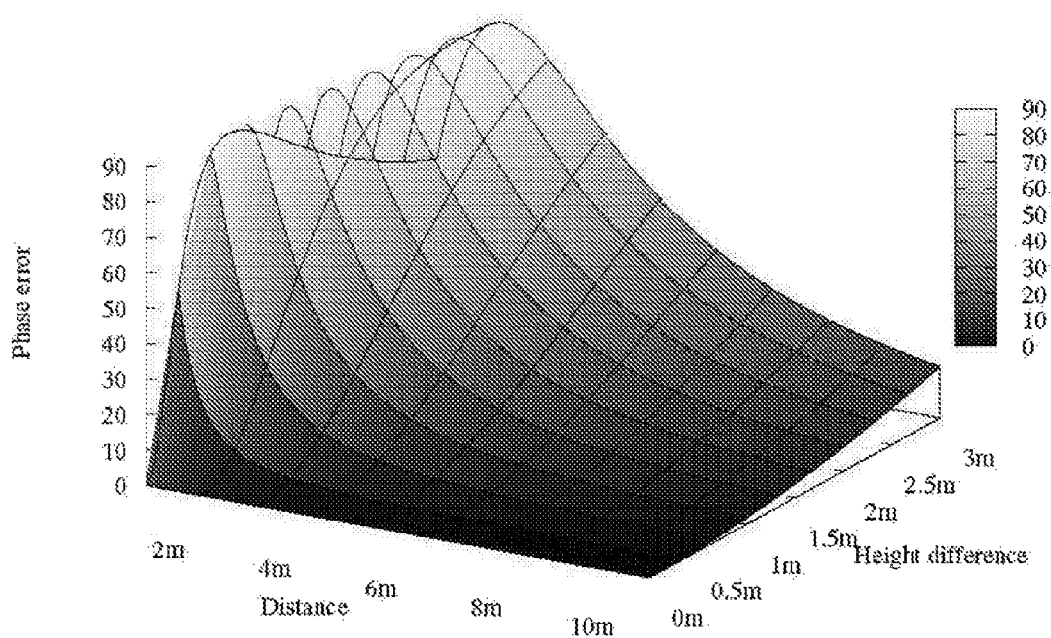
FIGS. 16B and 16C are plots illustrating the variation in phase difference of a signal from a client device, as received at two antennas, as the client device is moved out of the horizontal plane of the two antennas, for various positionings of the client device relative to the two antennas.
Figure 16C:
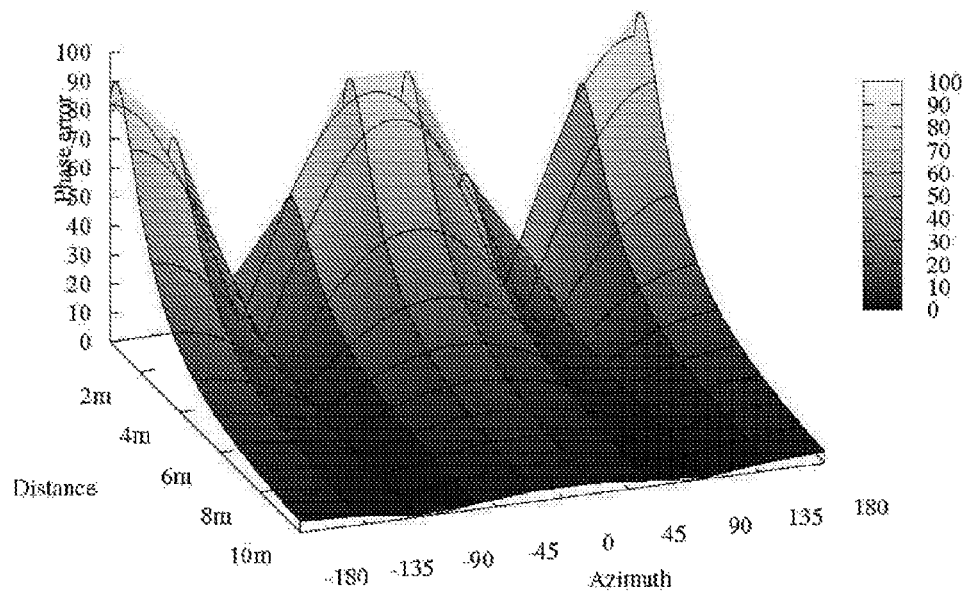

FIGS. 16B and 16C are plots illustrating the phase error introduced by a non-zero elevation in different circumstances—i.e. for different elevations, azimuths and ranges. In particular, FIG. 16B illustrates a phase shift introduced by varying radial and height distances for an endfire signal. The error shown is between the first and last antenna of a three-antenna $\lambda/2$ spaced linear array. FIG. 16C illustrates a phase shift introduced by varying distance and azimuth with a height difference of 1.5 m where 0 azimuth represent an endfire signal. The error shown is between the first and last antenna of a three-antenna $\lambda/2$ spaced linear array.

If we now consider the three-dimensional situation in more detail, we assume that A1 and A2 (as shown in FIG. 16A) are elevated, hence the lines C→A1 and C→A2 have a vertical component h, which represents the height difference between C and AP (the horizontal plane containing A1 and A2). The distances u and v then become projections of C→A1 and C→A2 onto the horizontal plane.

From FIG. 16A it is immediately apparent that C→A1=(x, y, h), where x and y are as indicated in FIG. 16A, and h is the vertical component defined above. We can also express C→A1 in spherical coordinates $(\rho, \theta, \varphi)$ where $\varphi$ is distance, $\theta$ is elevation angle, and $\varphi$ is azimuth (as shown in FIG. 16A), as follows:

$$\vec{CA_1} = \left( \sqrt{x^2 + y^2 + h^2}, \arccos\left( \frac{h}{\sqrt{x^2 + y^2 + h^2}} \right), \arctan\left(\frac{y}{x}\right) \right)$$

We now need to construct a new vector C→A2' which has the magnitude of |C→A2|, but is has the same azimuth and elevation as C→A1—i.e. C→A2' is parallel to C→A1, based on the assumption, as before, that the client is distant from the antenna. Using the geometry shown in FIG. 16A we have:

$$s \ll u \Longrightarrow u \approx v + s\cos t$$
$$v \approx u - s\cos t = \sqrt{x^2 + y^2 + h^2} - s\cos t$$
$$\therefore \vec{CA_2'} = \left( \sqrt{v^2 + h^2}, \theta, \phi \right)$$
$$\vec{CA_2'} = \left( \sqrt{(u - s\cos t)^2 + h^2}, \theta, \phi \right)$$

Since C→A1 and C→A2' share the same elevation and azimuth (they are parallel), the phase difference at the antennas is determined solely by their difference in magnitude ($\rho$). In particular, we can express the difference in distance from C to A1 compared with C to A2 as follows:

$$|\vec{d}| = \sqrt{(u - s\cos t)^2 + h^2} - \sqrt{x^2 + y^2 + h^2}$$
$$= \sqrt{(u - s\cos(\pi + \phi - r))^2 + h^2} - \sqrt{x^2 + y^2 + h^2}$$
$$= \sqrt{(u + s\cos(r - \phi))^2 + h^2} \ldots \sqrt{x^2 + y^2 + h^2}$$
$$= \sqrt{(u + s(\cos(-\phi)\cos r - \sin(-\phi)\sin r))^2 + h^2} - \sqrt{x^2 + y^2 + h^2}$$
$$= \sqrt{(u + s(\cos\phi\cos r + \sin\phi\sin r))^2 + h^2} - \sqrt{x^2 + y^2 + h^2}$$

We now substitute in the value of $\varphi$ (as derived from FIG. 16a):

$$|\vec{d}| = \sqrt{\left(u + s\left(\cos\left(\arctan\frac{y}{x}\right)\cos r + \sin\left(\arctan\frac{y}{x}\right)\sin r\right)\right)^2 + h^2} -$$

-continued $$= \sqrt{\left(u + s\left(\frac{1}{\sqrt{1+\left(\frac{y}{x}\right)^2}}\cos r + \frac{\frac{y}{x}}{\sqrt{1+\left(\frac{y}{x}\right)^2}}\sin r\right)\right)^2 + h^2} - \sqrt{x^2+y^2+h^2}$$

$$= \sqrt{\left(u + s\left(\frac{x}{\sqrt{x^2+y^2}}\cos r + \frac{y}{\sqrt{x^2+y^2}}\sin r\right)\right)^2 + h^2} - \sqrt{x^2+y^2+h^2}$$

$$= \sqrt{\left(u + \frac{s}{u}(x\cos r + y\sin r)\right)^2 + h^2} - \sqrt{x^2+y^2+h^2}$$

$$\therefore \vec{d} = \left(\sqrt{\left(u + \frac{s}{u}(x\cos r + y\sin r)\right)^2 + h^2} - \sqrt{x^2+y^2+h^2},\right.$$

$$\left.\arccos\left(\frac{h}{\sqrt{x^2+y^2+h^2}}\right), \arctan\left(\frac{y}{x}\right)\right)$$

Note that this final line expresses the difference in signal travel distance as a vector in polar coordinates, where the elevation and azimuth are the same as for C→A1 and C→A2' (as given above). We can regard this vector of the signal travel distance as the sum of two vectors, a and e, where a represents the added vector distance for the signal due to azimuth, and thus does not have a z-component, while e is the added vector distance due to the elevation, and therefore only has a z-component.

We now define ψ as the difference in travel distance of C→A1 compared C→A2' which is due just to the difference in elevation (component e), which can be expressed as:

$$\psi = |\vec{d}| - |\vec{a}|$$

$$= |\vec{d}| - \sqrt{\vec{d}_x^2 + \vec{d}_y^2}$$

$$= |\vec{d}| - \sqrt{(|\vec{d}|\sin\theta\cos\phi)^2 + (|\vec{d}|\sin\theta\sin\phi)^2}$$

$$= |\vec{d}|\left(1 - \sqrt{(\sin\theta\cos\phi)^2 + (\sin\theta\sin\phi)^2}\right)$$

$$= |\vec{d}|\left(1 - \sin\theta\sqrt{\cos^2\phi + \sin^2\phi}\right)$$

$$= |\vec{d}|(1 - \sin\theta)$$

We can now substitute in the true value of θ, the elevation, to obtain the following:

$$\psi = |\vec{d}|\left(1 - \sin\arccos\left(\frac{h}{\sqrt{u^2+h^2}}\right)\right)$$

$$= |\vec{d}|\left(1 - \sqrt{1 - \left(\frac{h}{\sqrt{u^2+h^2}}\right)^2}\right)$$

$$= |\vec{d}|\left(1 - \sqrt{1 - \frac{h^2}{u^2+h^2}}\right)$$

$$= |\vec{d}|\left(1 - \sqrt{\frac{u^2}{u^2+h^2}}\right)$$

$$= |\vec{d}|\left(1 - \frac{u}{\sqrt{u^2+h^2}}\right)$$

$$= \left(\sqrt{\left(u + \frac{s}{u}(x\cos r + y\sin r)\right)^2 + h^2} - \sqrt{u^2+h^2}\right)\left(1 - \frac{u}{\sqrt{u^2+h^2}}\right)$$

We can use ψ as a correction term to compensate for the non-zero elevation of the client. In particular, the signal at A2 can be derotated by a phase of p=2πψ/λ to cancel out the effect of the elevation. More particularly, a height compensation steering vector, e(x), for a candidate position x of a client (with respect to a given AP) is defined as:

$$e(x) = \begin{pmatrix} 1 \\ \exp-jp \\ \exp-j2p \end{pmatrix}$$

The signal received at the AP, y, is multiplied by this height compensation steering vector to produce a new compensated signal y'. The direction-finding methods described above, see for example, FIG. 10 and equation (8), are then applied to the compensated signal y' to yield an AoA spectrum Probability(θ), which is then evaluated at θ=arctan (y/x) to obtain a likelihood estimate for the candidate location c. Assuming that results are available from multiple APs, these can then be combined using equation (8) above to determine the likelihood of the client being at a given candidate location x, (which corresponds to location x in Equation (8), except that the candidate location is now a three-dimensional position). The output is therefore a three-dimensional heat map (analogous to the two-dimensional heat maps of FIG. 12), which can be using any appropriate optimisation algorithm, such as hill-climbing etc.

We note that different candidate locations induce different height compensation steering vectors to a given wireless AP, and likewise that difference wireless APs will likewise have different height compensation steering vectors arising from a given candidate location. Accordingly, the probability (θ) is re-evaluated for each candidate location, for each wireless AP. On the other hand, the AoA spectrum only needs to be determined for the bearing from the relevant wireless AP to the candidate location (rather than for the full 360 degrees), thereby reducing the computational requirements.

Note that there is no requirement that the multiple wireless APs are themselves within a (single) horizontal plane. In particular, for a given candidate location for a client device, a probability is determined for each individual wireless AP that receives a signal from the client device. These probabilities can then be combined to determine an overall likelihood for the client being at the candidate location, irrespective of whether the multiple wireless APs are themselves at different heights.

It will be appreciated that this modified approach to client location allows the original approach, as described above with reference, inter alia, to FIG. 10 and equation (8), to accommodate a vertical offset in the location of the client device without having to change the physical structure of the wireless access points—i.e. without involving any additional antennas having a vertical separation from one another. Accordingly, this approach enables an estimate of height (i.e. vertical positioning or elevation) to be obtained for a client using existing access points with relatively few (horizontally-spaced) antennas. This is important, in that the approach is therefore supported by the already installed infrastructure of wireless APs. In addition, if the client is out of the horizontal plane containing the AP (i.e. has a non-zero elevation angle), this approach also improves the accuracy of the estimated position (horizontal bearing) for the client device as vertically projected into the horizontal plane.

FIG. 16D is a schematic flowchart of the processing to utilize this height compensation steering vector $e_i(x)$ in accordance with some embodiments of the invention. This processing can be regarded as corresponding to operation 740 in FIG. 24 (as described below) and utilized by the apparatus described herein, for example, as shown in FIGS. 1 and 2, etc. The processing of FIG. 16D may be performed all at server 10, or alternatively some or all of the processing prior to the combination of the AoA spectra (operation 850 onwards) may be performed at an individual AP.

The processing of FIG. 16D commences with selecting a candidate location 810 ($x$) for the client device. Based on the selected candidate location, for each wireless access point (i), a corresponding height compensation steering vector, $e_i(x)$, is determined (operation 820). The signals received at wireless access point (i) are then multiplied by this height compensation steering vector (operation 830). In effect, this multiplication compensates for the additional delay introduced by the non-zero elevation, and therefore allows the AoA spectrum to be calculated just with respect to the horizontal plane—therefore matching the AoA spectrum to be represented as shown, for example, in FIG. 15 above.

The method of FIG. 16D then proceeds to calculate, for each wireless AP(i), a likelihood $P_i(\theta_i)$ that this AoA spectrum, as received by wireless AP(i) and as determined in operation 830, represents a client device at the bearing $\theta_i$, according to the (x,y) components of the candidate location x (as described above with reference to FIG. 10, see also equation (6)), (operation 840). The likelihoods $P_i(\theta_i)$ are now multiplied together, as per equation (8), across all the wireless APs(i) (operation 850) to give an overall likelihood for this candidate location x. The system now performs an optimization (operation 860) to try to find the candidate location that maximizes this overall likelihood. This optimization generally involves an iterative approach, i.e. cycling through the processing of FIG. 16D for multiple candidate locations (x). In some cases, a three-dimensional heat map showing the likelihood as a function of position may be generated (analogous to FIG. 12, but also including the z or vertical dimension). A suitable hill-climbing algorithm may then be adopted in order to locate the best peak (most likely location) for the client device.

One option is to perform initially a two-dimensional location of the client device, i.e. assuming zero elevation, as described above. This two-dimensional location can then be used to inform the selection of the candidate locations x, since the most probable three-dimensional location is likely to be in the approximate vicinity of this two-dimensional location, albeit potentially offset by a non-zero elevation. (There is also likely to be some modest degree of x-y offset from the initial two-dimensional location as the assumption of zero elevation is removed).

Note that although the above processing describes certain ways of determining a three-dimensional position for the client device, such as modifying the phase of the incoming signal to compensate for a non-zero elevation of an assumed candidate position, the skilled person will be aware of other possible approaches. For example, these techniques might directly assess the likelihood of a given three-dimensional candidate location against the phase difference of the received communication signal (based on the known relationship between the three-dimensional bearing and the expected phase difference), and perform a search for the most likely client location in this manner.

Figure 18:
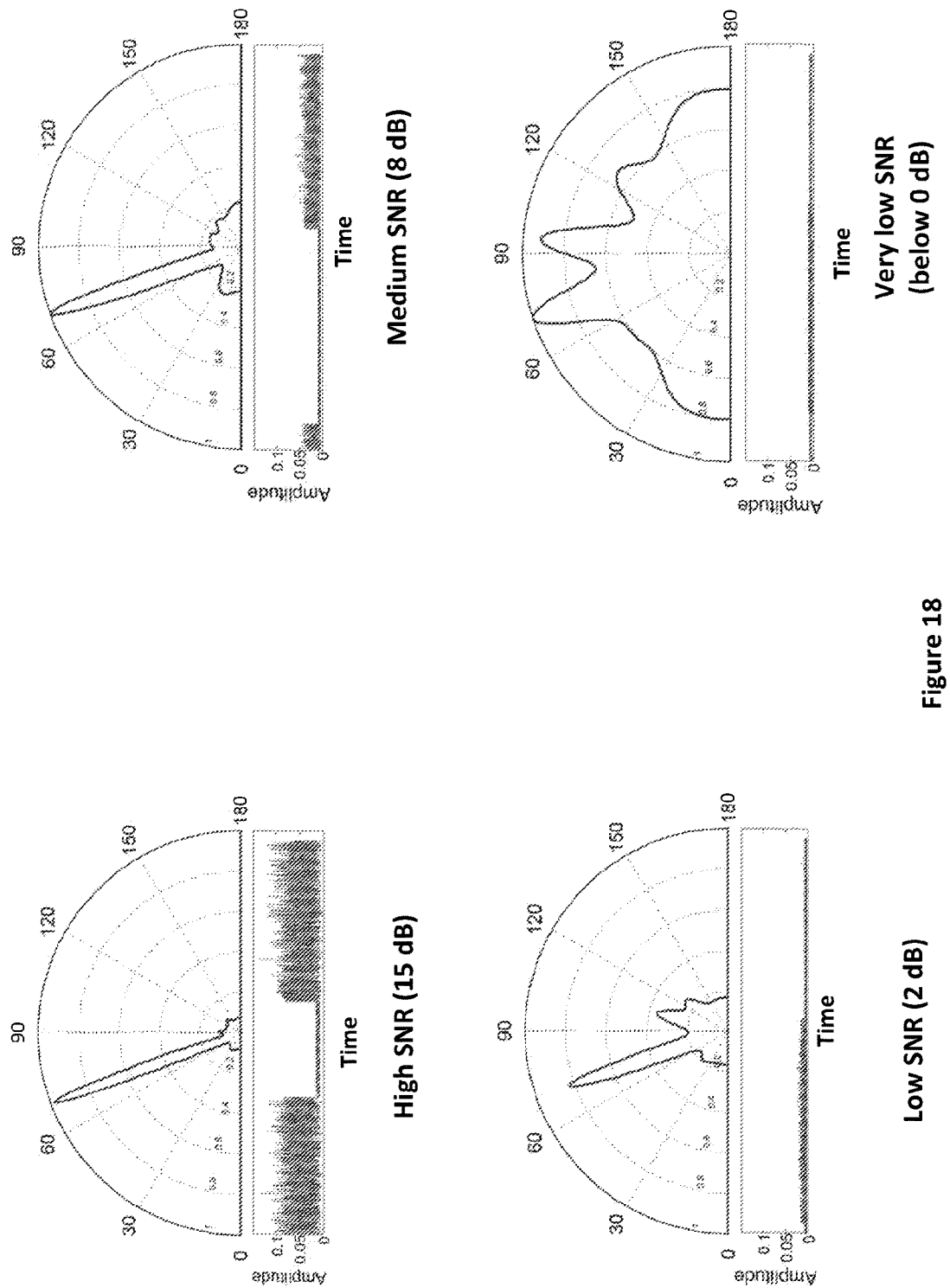
FIG. 18 presents test-bed results showing the effect of the signal-to-noise ratio (SNR) on the AoA spectrum obtained in accordance with some embodiments of the invention.

A further source of potential error in the estimated position of the client device, which is also illustrated in FIG. 16, arises from the orientation of the mobile or client device. Thus users typically carry mobile phones in their hands at constantly changing orientations, and it was investigated how these different antenna orientations may impact the ArrayTrack system. Thus keeping the transmission power the same on the client side, the orientation of the antenna on the client device was rotated about an axis perpendicular to the antennas of the APs (i.e. about a substantially vertical axis). The results in FIG. 18 show that the accuracy achieved does suffer slightly from such rotation compared with the original results, with the median location error increasing from 23 cm to 50 cm. By way of explanation, it has been found that the received power at the APs is smaller with the changed antenna orientation, because of the different polarization. By using circularly polarized antennas at the AP, it is expected that this issue can be easily addressed.

Figure 17:
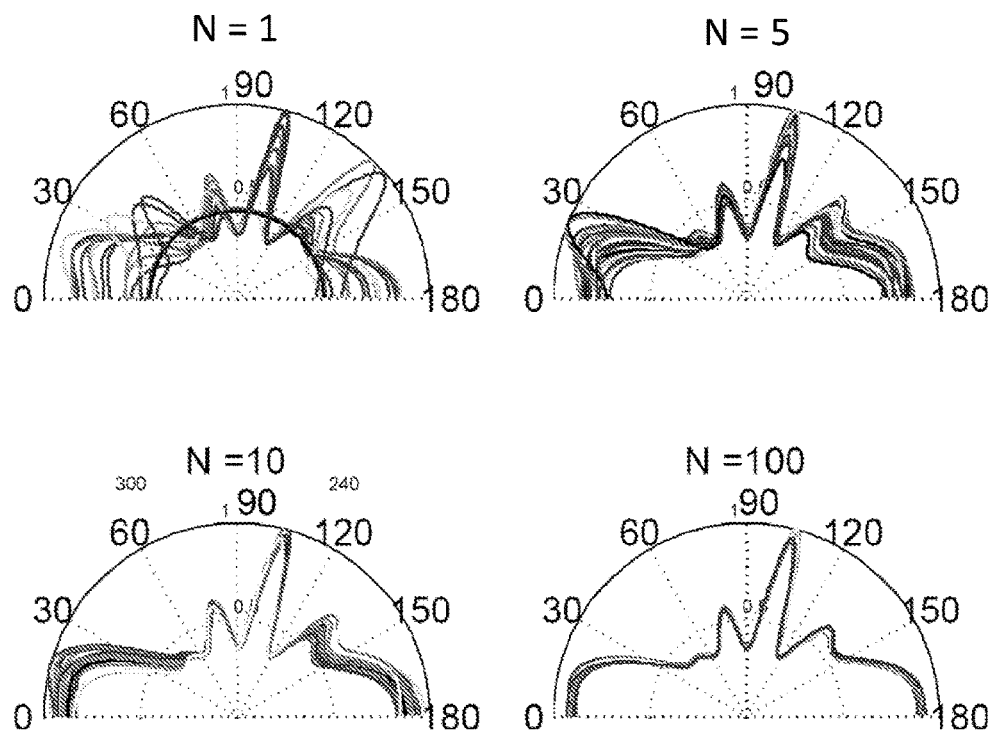
FIG. 17 presents test-bed results showing the effect of the number of samples on the AoA spectrum obtained in accordance with some embodiments of the invention.

FIG. 17 presents test-bed results showing the effect of the number of samples on the AoA spectrum, and illustrating how the ArrayTrack system is able to operate well with just a small number of preamble samples. Each subplot in FIG. 17 is composed of 30 AoA spectra from 30 different packets recorded from the same client in a short period of time. A different number of samples is used in each subplot (as indicated by the value of N) to generate the AoA spectrum. As the WARP system samples at 40 MHz per second, one sample takes only 0.025 μs. It can be seen from FIG. 17 that as the number of samples is increased to 5, the AoA spectrum is already quite stable. This demonstrates that the ArrayTrack system has the potential to provide an extremely fast response.

Another factor that may impact the performance of the ArrayTrack system is the signal-to-noise ratio (SNR). Because the ArrayTrack system does not need to decode any packet content, all the short and long training symbols can be used for packet detection, which performs very well compared with the original Schmidl-Cox packet detection algorithm. With all the 10 short training symbols used, the system was able to detect packets at SNR as low as −10 dB. This clearly shows that low SNR does not affect the packet detection ability of the ArrayTrack system.

It was also investigated to see whether (and how) this low SNR might affect the AoA performance of the ArrayTrack system. In order to perform this investigation, the client was maintained at the same position untouched, and the transmission power of the client device was steadily decreased to see how this impacted the AoA spectra. The results of this investigation are shown in FIG. 18, which illustrates the AoA spectra obtained for various levels of SNR. It can be seen from FIG. 18 that when the SNR becomes very low, below about 0 dB, the resulting AoA spectrum is no longer sharp, and large side lobes appear on the resulting spectrum generated. This degradation of the AoA spectrum will clearly have an adverse effect on the localization performance. However, at better SNR values, the ArrayTrack system is found to be reasonably robust to noise (bearing in mind also that when results from different APs are combined, the noise will cancelled out to some extent).

Another source of potential difficulty for the ArrayTrack system is the occurrence of two simultaneous transmissions from different clients, which causes a collision. Although a carrier sense multiple access (CSMA) system should in theory avoid collisions, they sometimes do occur, for example because of the spatial separation of transmitters in the network. It has been found that the ArrayTrack system still works well in the presence of such collisions, as long as the preambles of the two packets are not overlapping. For a collision between two packets of 1000 bytes each, the chance of the preambles colliding is just 0.6% (based on the overall length of the packets). Furthermore, the ArrayTrack system is designed to obtain AoA information for both packets in a collision, as long as the training symbols are not overlapping, by performing a form of successive interference cancellation. This technique involves detecting a first colliding packet and generating an AoA spectrum. Then the system detects the second colliding packet and generates the AoA spectrum for this second packet. However, the second AoA spectrum is the sum of the AoA spectra of both packets. Accordingly, the AoA spectrum of the first colliding packet is subtracted from the second AoA spectrum, thereby obtaining the AoA spectrum for just the second packet.

Figure 19:
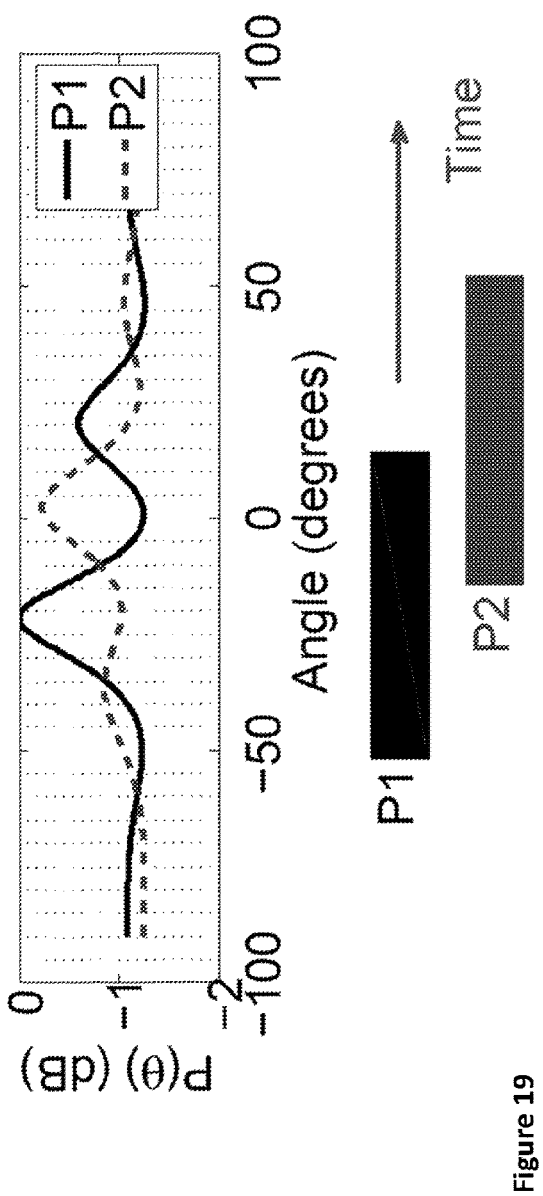
FIG. 19 presents test-bed results showing the result of using a successive interference cancellation scheme to generate AoA spectra for two colliding packets in accordance with some embodiments of the invention.

In order to generate a collision more easily in the test-bed, the CSMA facility on two Sokeris clients was turned off, thereby allowing them to transmit simultaneously. By applying the successive interference cancellation scheme described above, AoA information was obtained for both packets in a collision, as illustrated in FIG. 19.

System Latency

Figure 20:
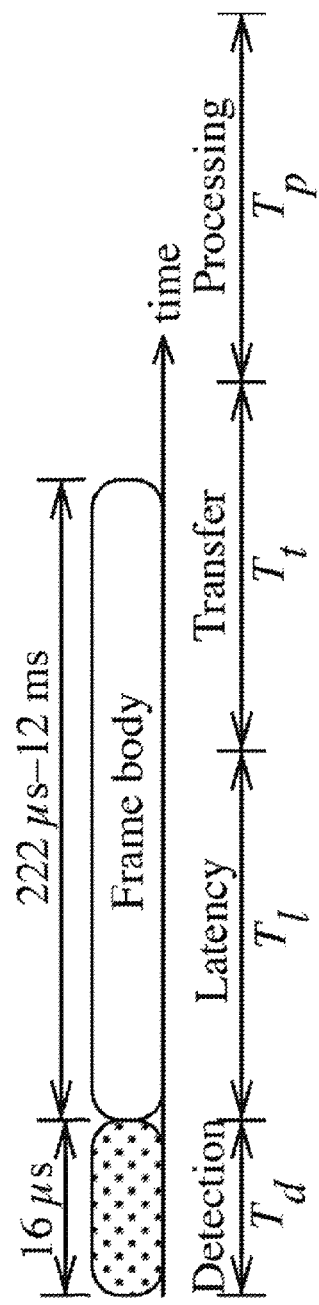
FIG. 20 provides a summary of the end-to-end latency that the ArrayTrack system incurs when determining latency in accordance with some embodiments of the invention.

System latency is important parameter for many real-time applications that might deploy the ArrayTrack system, such as augmented reality. FIG. 20 provides a summary of the end-to-end latency that the ArrayTrack system incurs when determining latency. The time-scale of FIG. 20 starts from the beginning of a frame preamble as it is received by the ArrayTrack APs. As discussed above, the ArrayTrack only uses 10 samples from the preamble in order to function. This therefore allows the system to begin transferring and processing the AoA information while the remainder of the preamble and the body of the packet are still on the air, as shown in FIG. 20. The overall system latency is generally formed from the following components:

1. T: the air time of a frame. This varies between approximately 222 μs for a 1500 byte frame at 54 Mbit/s to 12 ms for the same size frame at 1 Mbit/s.
2. $T_d$: the preamble detection time. For the 10 short and two long training symbols in the preamble, this is 16 μs.
3. $T_1$: the latency for transferring samples from the WARP AP to the ArrayTrack server. We estimate this to be approximately 30 milliseconds, noting that this can be significantly reduced with better bus connectivity such as PCI Express on platforms such as the Sora [30].
4. $T_t$: the serialization time for transferring samples from the WARP AP to the ArrayTrack server.
5. $T_p$, the time to process all recorded samples.

$T_t$ is determined by the number of samples transferred from the WARP APs to the server computer and the transmission speed of the Ethernet connection used for this transfer. In the current implementation, the Ethernet link speed between the WARP APs 30 and server 20 is 100 Mbit/s. However, due to the relatively simple IP stack currently implemented in the WARP AP, there are added overheads such that the maximum throughput in practice is limit to about 1 Mbit/s. This yields $T_t$=[ (10 samples)(32 bits/sample)(8 channels)]/1 Mbit/s=2.56 ms.

$T_p$ depends, inter alia, on how the MUSIC algorithm is implemented and on the computational capability of the ArrayTrack server 20. For an eight-antenna array, the MUSIC algorithm involves eigenvalue decomposition and matrix multiplications of linear dimension eight. Because of the small size of these matrices, this process is generally not the limiting factor in the server-side computations. In the synthesis processing of combining results from the multiple Aps, as described above, a hill climbing algorithm is employed to find the maximum in the heat-map computed from all the available AoA spectra. For the current Matlab implementation with an Intel Xeon 2.80 GHz CPU and 4 GB of RAM, the average processing time is 100 ms with a variance of 3 ms for the synthesis step. Therefore, the total latency that the ArrayTrack system adds, starting from the end of the packet (and excluding bus latency), is: $T_l = T_d + T_t + T_p - T \approx 100$ ms.

In some embodiments, the ArrayTrack system is implemented on a commodity IEEE 802.11 WiFi access point, such as one using the Intel Wireless Link 5300 chipset. Such a commodity AP is typically commercially available off-the-shelf for deployment in real-life environments, and hence it is beneficial in practical terms for the ArrayTrack system to be operational on such a platform. In such an implementation, the localization is generally performed without hardware modifications to the AP; in addition, much of the processing that might be performed on the AP is instead transferred to the server, thereby reducing the additional processing requirements for the AP.

A typical commodity IEEE 802.11 WiFi access point generates Channel State Information (CSI) readings with every received link-layer frame as specified in the IEEE Standard for Information technology—Telecommunications and information exchange between systems Local and metropolitan area networks—Specific requirements Part 11: Wireless LAN Medium Access Control (MAC) and Physical Layer (PHY) Specifications 802.11-2012.

Figure 21:
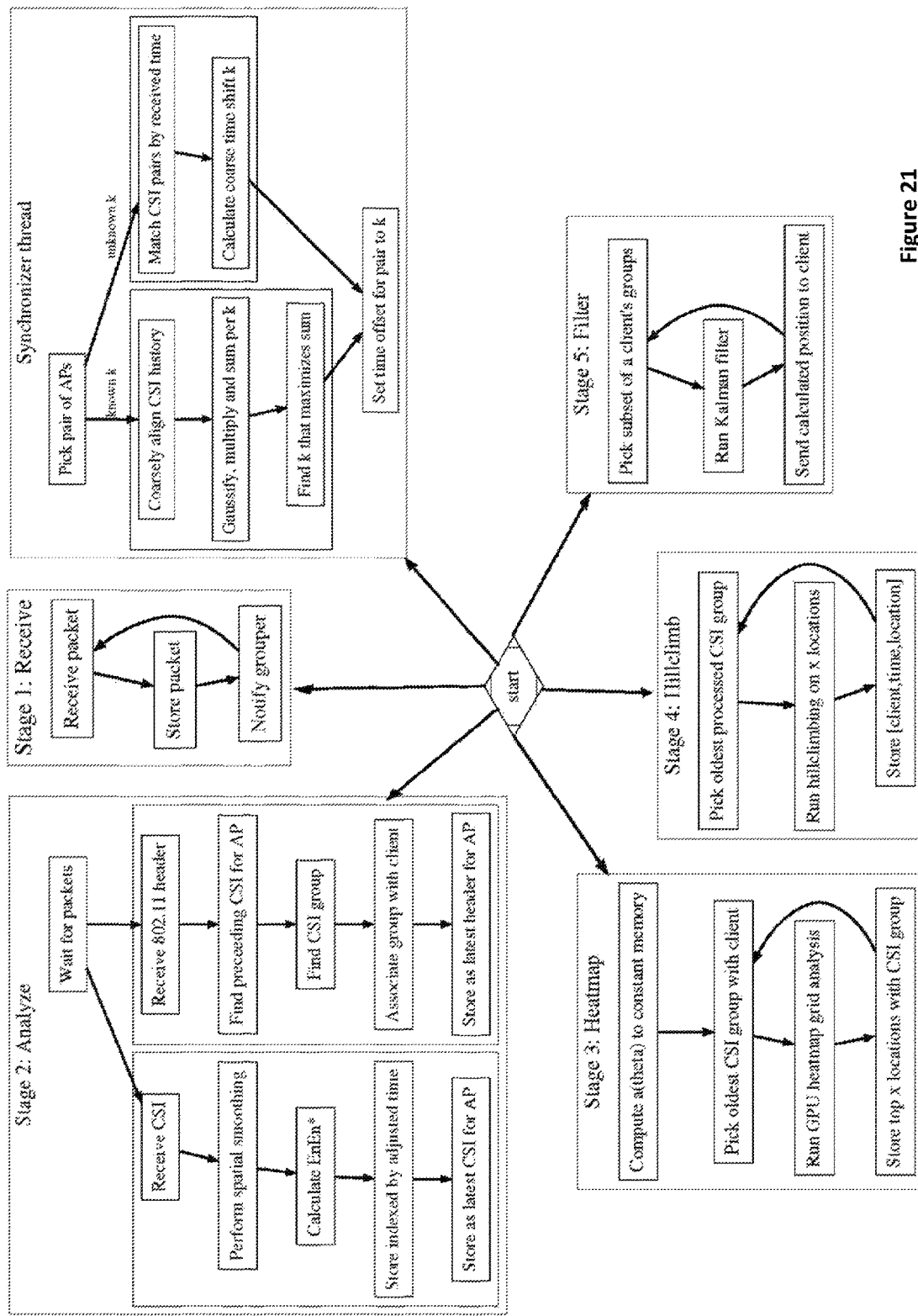
FIG. 21 is a schematic diagram of the processing stages at a server of the ArrayTrack system in accordance with some embodiments of the invention.

In one implementation based on such a commodity AP, as shown in schematic form in FIG. 21, the central processing server 20 comprises five stages (components), each stage acting both as a consumer of the output of the previous stage, and also as a producer for the next stage. There is also a component shown in FIG. 21 that performs synchronization, which runs in tandem with these five stages. The various stages and components will now be described (see also the flowchart of FIG. 22, which shows in schematic form the processing of stages 2-5):

Stage 1: Packet Reception

The first stage thread accepts incoming wireless packets from a client device, and stores them in a list (a queue of packets) to be consumed by stage 2. Upon receipt of a packet, stage 1 notifies a stage 2 thread that data is available for processing.

Stage 2: Packet Analysis

Figure 22:
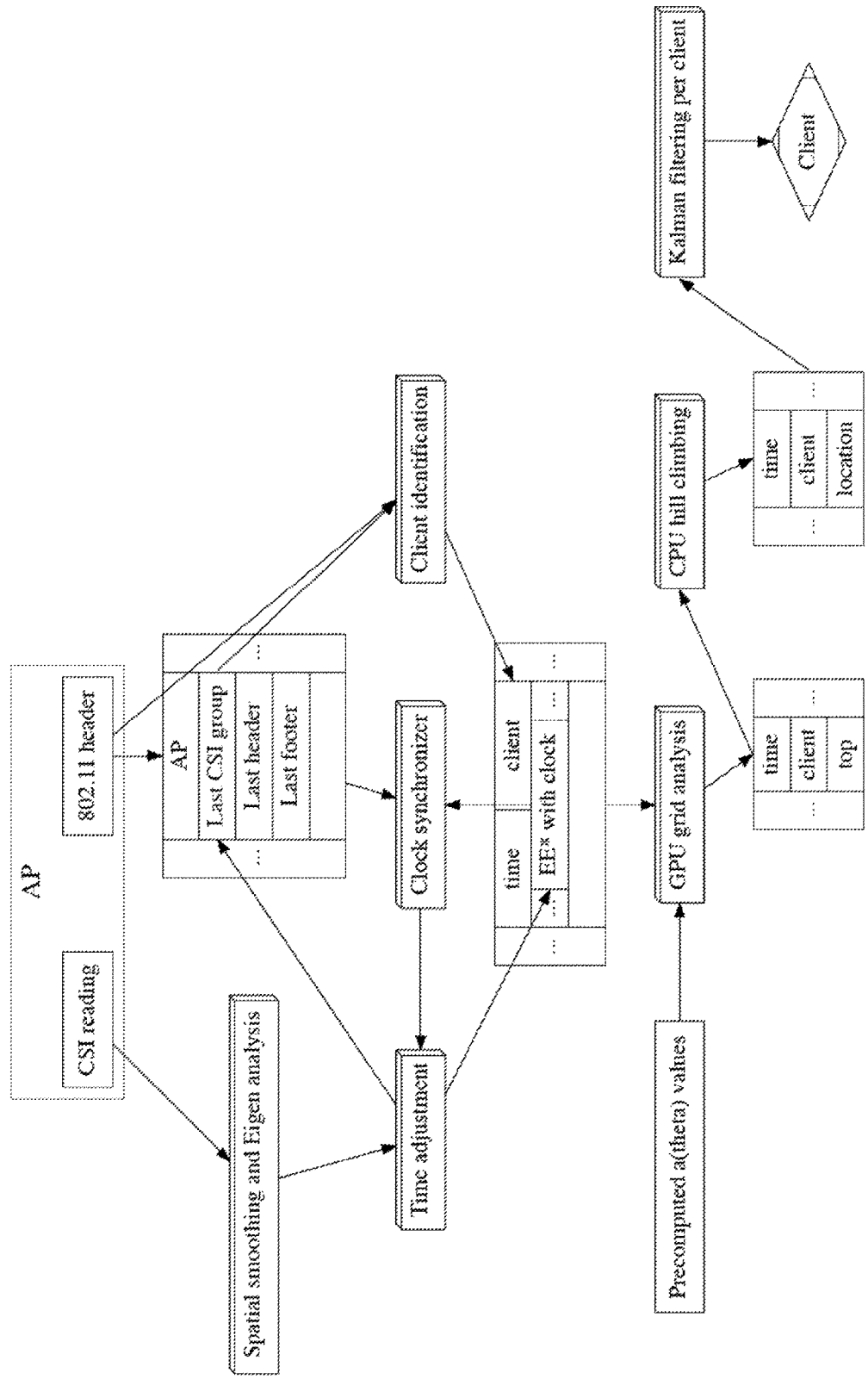
FIG. 22 is a simplified flowchart corresponding to processing stages 2-5 of FIG. 21 in accordance with some embodiments of the invention.

The second stage contains the bulk of the system logic. The second stage fetches a batch of packets from the packet queue produced by stage one, and runs through the packets one by one. There are two types of packets that may be encountered in the queue: namely channel state information packets and packets with 802.11 headers. Stage two threads perform different tasks depending on the type of packet encountered, as illustrated in the flowchart of FIG. 22. The overall goals of stage 2 are as follows:

Process each channel state information reading as much as possible (spatial smoothing and Eigenanalysis)
Group channel state information belonging to the same transmission
Identify which client each such group belongs to The first goal involves performing as much processing on each individual CSI reading as can be done in a physical angle-independent manner. This is done in stage 2 to avoid requiring stage 3 to perform unnecessary calculations when constructing the AoA spectra (the eigenvectors do not change based on angle for example). Since the channel state information is encoded in a very dense format, the second stage threads also need to extract and manipulate this data into a correlation matrix as described above (this is performed in the box labeled "Spatial smoothing and Eigen analysis" in FIG. 22).

The second goal involves grouping CSI readings that were taken at the same time. Thus each CSI reading contains a timestamp of the internal clock of the wireless card (AP) at the time of capture, and this, combined with a calculated clock offset, is used to determine which packets are related. (The calculation of the clock offset is discussed in the clock synchronization section below). The time adjustment is applied by the similarly named step in the flow diagram of FIG. 22. The box that contains the calculated eigenvectors represents the CSI groups mentioned above. There is a single time and client field for each group, and then multiple eigenvector (EE*)+clock entries as shown.

Threads in the second stage also detect CSI readings that are made at the same time, but cannot have come from the same client (this can happen in large deployments where clients can successfully transmit concurrently). The system detects this by discarding CSI readings coming from APs where the time offset to the AP that sent the first reading in the current group is unknown. The rationale for this approach is that an offset will only be unknown if no one packet has ever been received by both of those APs, and thus if a CSI reading comes from both of them at the same time, they must be from different clients. This scheme is not perfect, but helps to reduce the number of erroneously grouped readings in large deployments.

A natural extension of this approach is to not discard these packets, but rather to create a new group for them, thereby allowing the system to locate concurrently transmitting clients in different areas of the deployment. Building on previous issues relating to concurrent transmissions, the second stage also tries to detect if it is about to associate a client with a group that has already been associated with a different client, as this clearly indicates that an incorrect grouping has occurred.

Stage 3: Heat-Mapping

The role of third stage threads is to take grouped CSI readings from stage two and calculate rough estimates of the client's position. This information is then fed into the hill-climbing performed in stage 4 to reduce the amount of hill-climbing necessary to reach an optimal solution.

Since the array steering vector is only dependent on the given angle, the third stage threads can pre-compute the array steering vector for a limited set of angles before starting, and upload them to constant memory inside their respective GPUs. This reduces the amount of (real-time) calculations to be performed in order to calculate angular probabilities using the MUSIC algorithm, since the steering matrix will not change for a given angle from one computation to another. Before accepting CSI groups, the third stage threads also compile their respective OpenCL kernels, allocate scratch memory and upload the kernels to avoid overhead when running jobs. This is the box feeding into the "GPU grid analysis" box in the flow diagram of FIG. 22.

For each iteration, each third stage thread picks one CSI group from stage 2, and uploads the CSI readings to the relevant processing device. The third stage then runs a heat-mapping kernel, which traces out a coarse grid across the deployment map, and calculates the probability at each intersection in the grid. This is the "GPU grid analysis" referenced above. Since the probability computations for each location are fully independent, they are well-suited for the parallelized computation available on GPUs.

Once the heat-mapping has completed, the most probable locations are extracted from the GPU and passed back to the second stage thread. These most probably locations are then stored with the CSI group to await processing by a stage four thread.

Stage 4: Hill-Climbing

The threads implementing stage four process CSI groups that have been heat-mapped to calculate a final estimate of the client's position as indicated by "CPU hill climbing" in the flow diagram of FIG. 22. A hill-climbing thread is started for each of the positions suggested by the heat-mapping (usually chosen so that there is one thread per available core), and is allowed to run for a limited number of steps. After this time, the location with the highest probability is chosen as the most likely position for the client. This location is then written out with a timestamp, as well as the client's identifier, to a separate data structure as shown in the flow diagram. The CSI group can then be fully removed from the system.

Note that stage three could be bypassed entirely, with the processing instead jumping straight to stage four to use randomized starting positions and longer climbs. However, each hill climber would then have to be allowed to run for longer, and the chances of ending up in a local maximum would be higher than if heat-mapping is performed first.

Stage 5: Kalman Filtering

The final stage threads use estimates of the client's position over time to produce a more reliable estimate of the client's true current position. In some implementations, the system employs Kalman filtering with a linear predictor to try to counter the noise in the location estimates. Once a refined estimate has been calculated, the updated position can be pushed to the client. The location data can also be stored into more persistent storage for long-term tracking and/or analysis.

Clock Synchronization

In order to determine the offsets between the internal clocks in the wireless card of each access point (the internal clock applies the timestamp to each CSI reading), a two-step process is applied:
1. Use received wall clock time to calculate a rough offset estimate
2. Compute a correlation across several CSI readings with offsets around the previous offset. Find the offset that maximizes the correlation.

Step 1 involves looking at the clock time inside the CSI readings received at approximately the same time from different access points. The difference between these two times will not be the exact offset, but will provide an approximation to the real offset. This is helpful, since it avoids the need to rotate through the entire 32-bit space for the correlation in step 2, which would be very expensive in computational terms.

Step 2 involves creating a normal distribution centered on the clock timestamp of each received CSI reading from each of two APs, and then cross-multiplying and summing (correlating) the two resulting signals. This is performed for several values on either side of the previous offset estimate, and the offset that yields the highest correlation metric is taken as the new offset estimate.

Access Point (AP) Operation

The software running on the AP is designed to be thin—its jobs are generally limited to forwarding channel state information and 802.11 headers to the server, as well as notifying the server of its antenna layout and offsets (see below) upon boot.

Calibration

Due to the physical layout and operation of wireless cards, the signal from each antenna experiences a random phase shift or offset. Without compensating for this offset, the location algorithm utilised by the ArrayTrack system will not work, as the phase differences between different antennas is no longer an indication of the differences in arrival times for when the signal is received on one antenna compared to another.

The phase offset is randomized whenever the card is restarted or its operational mode is changed, and the system determines this offset after each reboot, before sending any data to the central server. Since the general approach is to perform relatively little work on the access points, these per-antenna offsets are communicated to the ArrayTrack system so that the signals can be de-rotated when they are processed in stage two above. This communication occurs when the software first starts up on the access point and notifies the server of its existence.

There are several ways of determining the phase offsets of a card's antennas—two examples are outlined below:

1—Using Another Wireless Client

Figure 23:
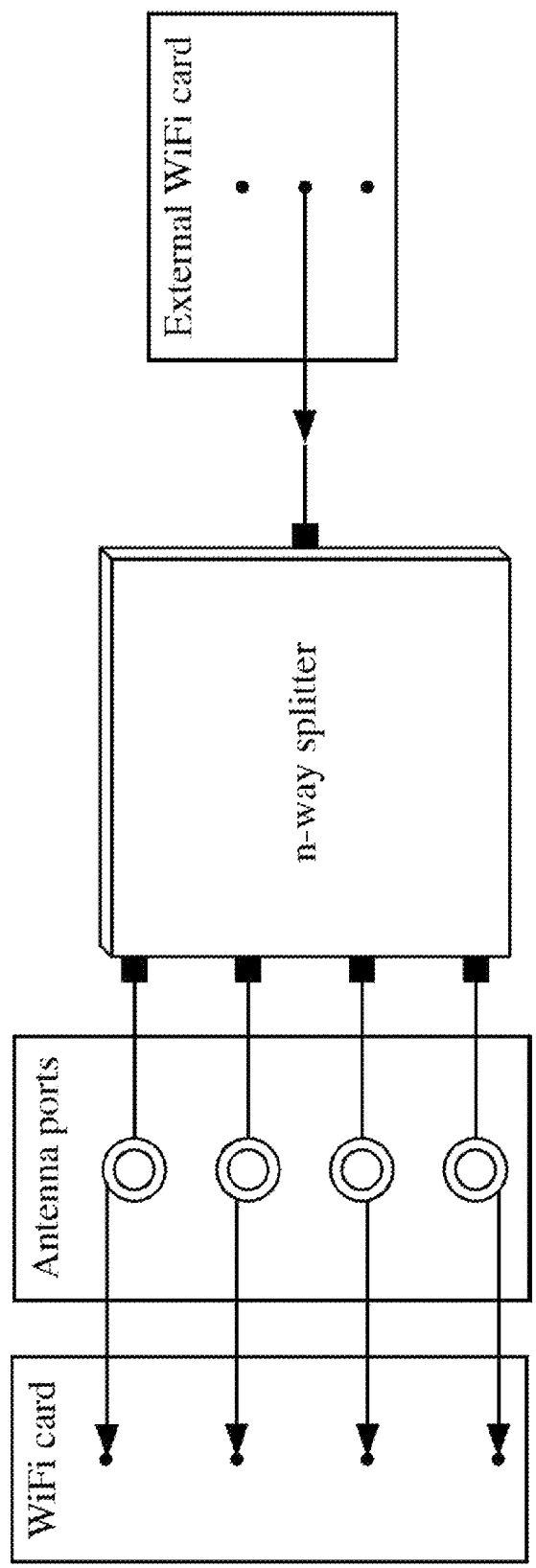
FIG. 23 is a schematic diagram showing the use of an N-way splitter to perform phase calibration of the APs in accordance with some embodiments of the invention.

In this approach, a second WiFi card is used, with only a single transmit antenna. This antenna is positioned at a known distance from each of the receive antennas at the access point. A packet is then transmitted by this second client, and the channel state matrix is extracted from the card. The received phase at each of the antennas is then calculated. Since only the phase difference between the antennas is important for the ArrayTrack system (not the absolute phase values), the system is able to utilise the difference between the expected and actual phase differences between antenna 1 and all other antennas for phase calibration purposes. This can be done as follows—given:

a1=the measured phase at antenna 1
an=the measured phase at antenna n
d1=the distance between antenna 1 and the transmitting antenna
dn=the distance between antenna n and the transmitting antenna
$\lambda$=signal wavelength (~5.4 cm for 5 GHz, ~12.2 cm for 2.4 GHz) the phase offset between antenna 1 and antenna n is:
a1+2*$\pi$*(dn−d1)/$\lambda$−an 2—Using a Signal Splitter This approach utilises a 0-degree signal splitter as shown in FIG. 23. The phase offset introduced on each antenna port (including cables) is determined prior to the phase calibration—this is a one-time measurement (rather than at each reboot). Next, a single antenna port on a second WiFi AP is connected to the input of the splitter. The antennas of the AP being calibrated are then all disconnected, and the output ports of the splitter are connected in their place (note that the splitter should not be connected directly to the pigtails, as the aim is to find the phase offset including the offset introduced by the cables inside the AP connecting the pigtails to the antennas, if any).

A packet is again transmitted by this second AP, and the channel state matrix is extracted by the AP being calibrated. The resulting received phase at each of the antennas is then computed. By subtracting the phase offset known to be introduced at each output port of the splitter, the resulting phases of each of the signals should be identical. The phase offset for each antenna can therefore be computed by subtracting the measured phase from the phase at antenna one.

Automated Calibration

The above techniques for calibration generally involve some additional equipment (over and above a wireless AP itself), plus human intervention. In another approach, a mechanism for determining the unknown phase offsets between M frequency-locked oscillators at a wireless device with M antennas is provided which utilizes wireless signals from clients with known or estimated positions relative to the device to be calibrated, thereby allowing the system to calibrate automatically using transmissions it receives from other devices.

(i) Definitions and assumptions. We denote the device to be calibrated as C, and refer to the phase offset between a reference antenna (antenna 0) and antenna i as $\varphi_i$. We also define the set N={$n_1$, $n_2$, . . . , $n_N$} to represent all other antennas in the system that are within transmission range of all M antennas of C. We assume that the approximate bearing of each n∈N is known or can be estimated, and denote the angle of arrival (bearing) at C of a given signal as $\theta$. Finally, we define s as the number of steps in [0, 2$\pi$) we want our system to try for each value of $\varphi$. The autocalibration mechanism also makes the following assumptions about the system in which it is deployed, namely: (a) the location of C is known; (b) C receives (hears) transmissions from at least one antenna (transmitter) in N; and (c) the array steering vectors are computed such that $\theta$=0 corresponds to the x-axis in the coordinate system used for representing the locations of C and the nodes in N (but realization in an arbitrary coordinate system will be clear to those skilled in the art).

(ii) Background.

Autocalibration occurs incrementally, and each new packet improves the precision of the phase offset estimates. The accuracy of the estimates of $\varphi_i$ will also increase with the number of nodes from N from which C observes packets.

As described above, an AoA spectrum (also referred to as a pseudospectrum) can be computed from phase information obtained from each antenna in an antenna array. The AoA spectrum gives the estimated power of the arriving signal P($\theta$) for different angles of arrival $\theta$ at C. For any packet that C receives from a node n∈N, we also know the true bearing of n to C by virtue of knowing the true locations (or estimates thereof) for C and n.

In the absence of multipath reflections and with a direct, line-of-sight, wireless channel between C and n, a calibrated receiver C will see a peak in P($\theta$) in the direction of n. Depending upon the array steering vectors used for the antenna array, this peak may or may not be for $\theta$ equal to the bearing of n at C. However, in the presence of multipath, multiple peaks may appear in the AoA spectrum, any one of which may correspond to the true bearing of n to C. The AoA spectrum is also likely to have a high noise floor due to the many weaker incoming multipath signals. It might also be the case that there is no direct line-of-sight signal, and thus no peak would be observed at the true bearing, for example if an obstruction is located between n and C.

If C is not calibrated, the shape of the computed incoming AoA spectrum is unpredictable. However, as the estimated (trial) values of $\varphi_1$, $\varphi_2$ etc. approach the true oscillator phase offsets, $\varphi_1$, $\varphi_2$, the AoA spectrum will morph and rotate such that the peaks appear as expected. The approach described herein therefore seeks, as part of the automated calibration, to find estimated values for each $\varphi_i$ such that the AoA spectrum for a packet has a peak corresponding to the true AoA for that packet (based on the known position of the signal transmitter).

Due to multipath effects, multiple combinations of estimated values for each $\varphi_i$ may yield such peaks. However, across multiple packets, and also with packets from multiple transmitters n∈N (if available), only a correct set of estimated values for each $\varphi_i$ will yield peaks for every packet—any other set of estimated values will yield correct peaks only for some packets.

Unfortunately, changing the estimated value of any individual $\varphi_i$ significantly changes (affects) the computed AoA spectrum, and so the values of $\varphi_i$ cannot be searched independently of each other. Accordingly, this is a multi-dimensional search problem, which can be computationally very expensive.

(iii) Determining Candidate Values for $\varphi_i$.

To reduce the exponential search space, we observe that the spectral analysis described above works with a variable (reduced) number of antennas, although accuracy will degrade as the number of antennas is decreased. Accordingly, rather than compute an AoA spectrum for every possible value (s steps) of every combination of $\varphi_i$ for i=1 to M−1, in order to run spectral analysis across the entire antenna array, the spectral analysis is initially limited to run across only the first two antennas—which only involves finding $\varphi_1$. The resulting AoA spectrum is likely to be very noisy, but this operation will usually narrow down the possible values of $\varphi_1$ substantially, eliminating, for example, r out of the s possibilities.

We now compute the AoA spectrum across the first three antennas using s different values for $\varphi_2$, but only for the s−r set of possible values for $\varphi_1$ as determined in the previous step—thereby reducing the search space from $s^2$ to s+s(s−r)=s(1+s−r) (i.e. the sum of the s possible values considered for the first two antennas, plus the s(s−r) possible values considered for the three antennas). The same approach can then be applied to the first four antennas, i.e. searching the s steps of possible values for $\varphi_3$ in combination with the restricted set of possible values that have already been determined for ($\varphi_1$, $\varphi_2$). It will be appreciated that this approach can be extended by incrementing the number of antennas being considered until all the M antennas have been included.

Note that this approach can also be employed with any starting subset of antennas. For example, with an eight antenna array, it might be desirable to begin by computing the AoA spectrum across three antennas rather than two. With three antennas, the peaks in the AoA spectra are likely to be sharper, thereby reducing the number of candidate values for $\varphi_1$ and $\varphi_2$ to use when searching for $\varphi_3 \ldots \varphi_{M-1}$ (albeit at the initial cost of trying more combinations of ($\varphi_3$, $\varphi_2$)).

In the above approach, it is also possible to add (increment) more than one antenna per step. For example, after determining a set of candidate values for $\varphi_1$ and $\varphi_2$, it is possible to then search in combination for the set of ($\varphi_3 \ldots \varphi_n$) (where n≤M−1), rather than searching first for $\varphi_3$ on an individual basis (having regard to the candidate values for $\varphi_1$ and $\varphi_2$), then searching for $\varphi_1$ for the already found value of $\varphi_3$, etc. It will be appreciated that searching for multiple phase offsets at the same time increases the search space, as such a search will need to try $\varphi_4$ values even for clearly incorrect values of $\varphi_3$. On the other hand, searching for multiple phase offsets at the same time can help to reduce the chance of not finding potentially correct values for ($\varphi_3$, $\varphi_4$), which might perhaps be missed if such a value for $\varphi_3$ has already been incorrectly discarded due to multipath or other inaccuracies introduced by using relatively few antennas for these initial AoA spectra.

Instead of the incremental approach described above, an alternative is to perform a full search of all possible combinations of values for $\varphi_i$ (for i=1 to M−1). This is computationally more expensive, although it may be easier to implement, and it is tractable, especially for relatively few antennas and relatively few search steps (i.e. relatively low values of s and M). However, as the number of antennas increases, the search space quickly becomes large, and therefore the incremental search described above is more attractive.

The incremental approach described above utilizes a single received packet. If this packet has experienced severe multipath, or does not produce a peak corresponding to the true AoA, the resulting values for $\varphi_i$ are likely to be incorrect. To counter this, it is described below how information from multiple packets may be used—plus information (if available) from different transmitters, since these will generally have different multipath channels.

(iv) Identifying Good AoA Spectra.

In determining candidate values for co, as described above (whether incrementally or via a full search), the automatic calibration needs to determine the extent to which a given AoA spectrum corresponds to (is compatible with) a specific (known) AoA for a source signal. To aid in this determination, we introduce a function $\eta(P, \alpha)$, which takes $P(\theta)$ as given by the spectral analysis algorithm for the current antenna layout, and an angle $\alpha$, and produces a value called the $\theta$-score. Informally, this value represents the degree to which the AoA spectrum points in the direction of $\alpha$.

Before providing an exact definition for $\eta$, we first give a high-level overview of the properties that we would like $\eta$ to have. Ideally, we want the $\eta$-score to be calculated such that:

It is high if there is a peak in the direction of $\alpha$

It is lower if there are peaks in other directions

It is lower if the peak is low compared to the noise floor

Since the true AoA for the antenna array may be slightly incorrect (e.g. due to inaccurate knowledge of the bearing of a given transmitter n), we would also like $\eta$ to be continuous with regard to $\alpha$, such that the peak does not have to be exactly in the direction of $\alpha$. Given these goals, we define $\eta(p, \alpha)$ as follows:

1. Find a normalizing constant k such that $\int kP(\theta) \, d\theta$ is 1. Set $P'(\theta)=kP(\theta)$.
2. Construct a Gaussian or other smooth function $g_\alpha(\theta)$ with an expected value a and a variance according to the desired level of error tolerance as described above. Set $g'_\alpha(\theta)=1-g_\alpha(\theta)$.
3. Calculate $\eta(P, \alpha)=(\int g_\alpha(\theta)P'(\theta)d\theta)/(\int g'_\alpha(\theta)P'(\theta)d\theta)$ By comparing the area under P' in the rough direction of the candidate physical AoA $\alpha$ with the area under Pin all other directions, $\eta(P, \alpha)$ measures how much (the proportion) of the energy of the AoA spectrum which is directed specifically towards a, versus towards directions other than $\alpha$. Any peaks in other directions, or a high noise floor, will increase the integral of the rest of the AoA spectrum, thus decreasing the $\eta$-score as desired. The introduction of the Gaussian also ensures that AoA spectra with peaks close to $\alpha$ get high $\eta$-scores, masking inaccuracies in the location estimates of C or $\eta_i$, or in the physical layout of the antenna array.

Figure 23A:
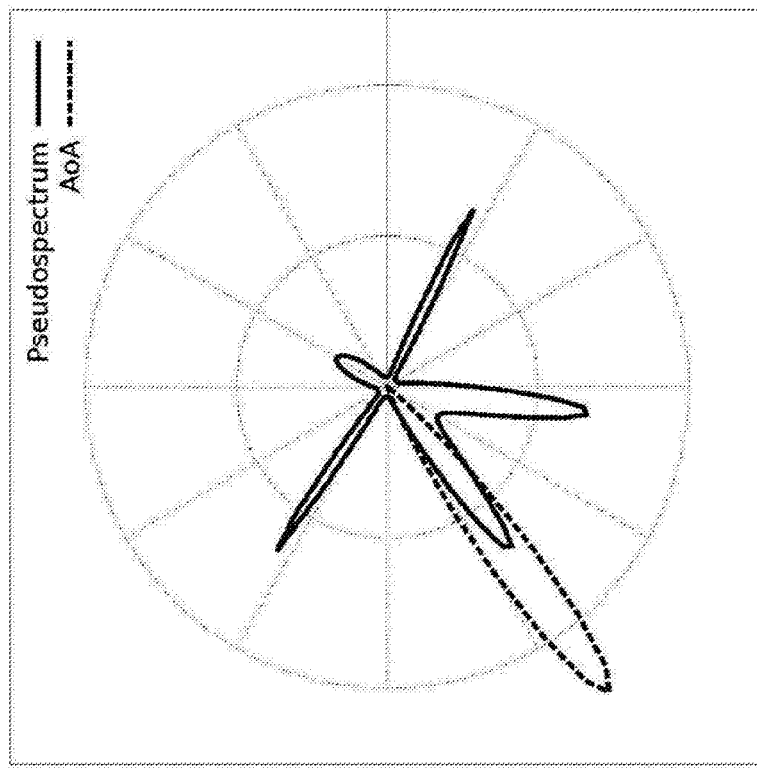
FIG. 23A shows left and right plots, each depicting an AoA spectrum computed from a received signal in comparison with a known bearing for the signal source in accordance with some embodiments of the invention. The left-hand plot shows a higher correlation than the right-hand plot, indicating that the AoA spectrum has been computed with better values for the estimated phase offsets of different antennas.
Figure 23A:
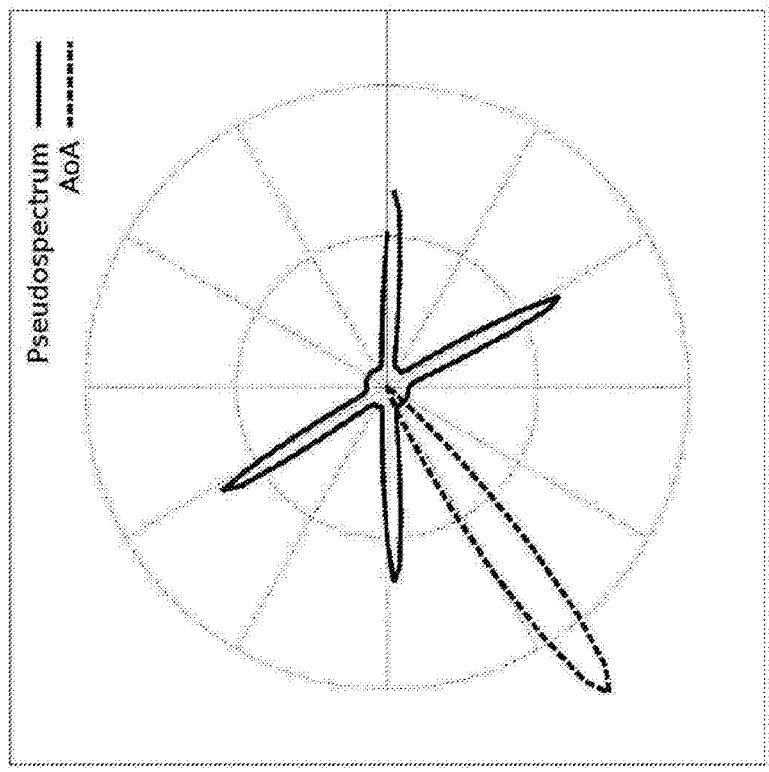

FIG. 23A shows the correlation between the AoA spectrum and a given (true) AoA for two different combinations of $\varphi_1$ and $\varphi_2$ for a linear array. The $\eta$-score is high (left plot) when a peak is present in the direction of the true AoA as indicated, and low (right plot) when there are peaks elsewhere. (Note that this plot of FIG. 23A was produced using a linear array with a spacing equal to the signal wavelength—hence the four peaks; in addition, the linear array causes the AoA spectrum to be symmetric around the axis of the array, and each side has two peaks because of the antenna spacing).

(v) Taking Advantage of Multiple Packets.

As discussed above, in order to get a better estimate of the values for $\varphi_i$, we look across packets, and preferably across transmitters, for estimated values of co, that, in combination, consistently give (match) the observed AoA spectra. The normalized η-score, as defined in the previous section, provides a way of accumulating how well different values of $\varphi_i$ work for different packets.

In performing this analysis, we first construct a matrix Y with as many dimensions as we have antennas (except for the reference antenna), i.e. =M−1 dimensions, and where each dimension is of width s. Intuitively, the index i within each of the M−1 dimensions represents a single respective choice of $\varphi_i$ (out of s possibilities). We then say that each cell of this matrix represents the cumulative η-scores for the corresponding combination of co, values. For example, given two antennas, $Y_{ij}=\Sigma\partial$, for all the η-scores that have been calculated with $\varphi_1=i.2\pi/s$ and $\varphi_2=j.2\pi/s$.

Across many packets, the cumulative η-score of the correct combination of φ values will tend to be higher than that of incorrect combinations of φ values. This is because only the AoA spectra computed with the correct phase offsets are expected to have consistent peaks in the direction of the true AoA, and since that yields a high η-score based on the construction of η, we would also expect the sum to be higher. Thus, determining the real phase offsets between the oscillators can be achieved by finding the element in the matrix Y with the highest value and looking at its indices.

Figure 23B:
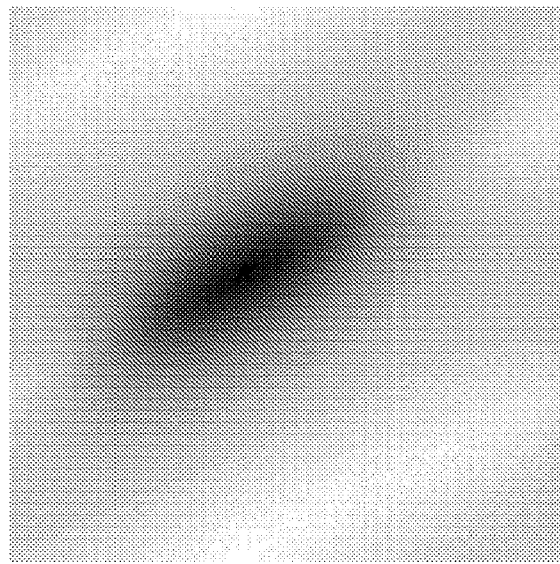
FIG. 23B is a plot showing the variation in value of a correlation function, where the two axes represent estimated phase offsets for two different (respective) antennas, in accordance with some embodiments of the invention.

FIG. 23B shows one such η-score matrix for a three antenna array with a single transmitter across 20 packets with the brightness of each cell indicating the cumulative η-score for the combination of particular values of $\varphi_1$ and $\varphi_2$, as represented by the row and column for that cell—i.e. the x and y axes of FIG. 23B correspond to the values of $\varphi_1$ and $\varphi_2$, so that each location on the plot corresponds to a particular combination (pairing) of phase offsets. Darker spots have a higher score, and the rows and columns (i.e. each axis) run from 0 to $2\pi$ in steps of $2\pi/180$ rads. It can be seen that there is a clear central dark region which is assumed to correspond to the true values of $\varphi_1$ and $\varphi_2$.

The above approach to autocalibration provides a method of calibrating a wireless access point comprising an array of multiple (m) antennas denoted $A_i$ (i=1 . . . m), each antenna having a respective internal phase offset $\varphi_i$. The method comprises receiving a signal from at least one transmitter located at a substantially known bearing from the wireless access point; and determining an estimated value for each internal phase offset go, such that an angle of arrival (AoA) spectrum calculated for the received signal on the basis of said estimated values matches the known bearing, wherein said AoA spectrum is calculated by treating said multiple antennas as a phased array. Once the internal phase offsets $\varphi_i$ of the different antennas in the wireless AP are known (i.e. have been calibrated), this then facilitates the use of the wireless AP as a phased array for determining the position of a mobile device, as described above.

Since the position determination generally requires only the relative phase offsets between different antennas in the wireless access point (rather than any absolute phase offset), one of the multiple antennas can be selected as a reference antenna and assigned an arbitrary known phase (say zero). The internal phase offsets $\varphi_i$ can then be determined for the remaining m−1 antennas as m−1 respective relative offsets from the known (reference) phase of the reference antenna.

One approach for determining the phase offsets that give the best match is to try an exhaustive search of all possible phase offsets for each antenna (subject to a search step size). However, this may be computationally expensive, especially for a large number of antennas and/or a small search step size. Accordingly, an iterative search may be used for determining a set of estimated values for the internal phase offsets $\varphi_i$ to match the known bearing.

Figure 23C:
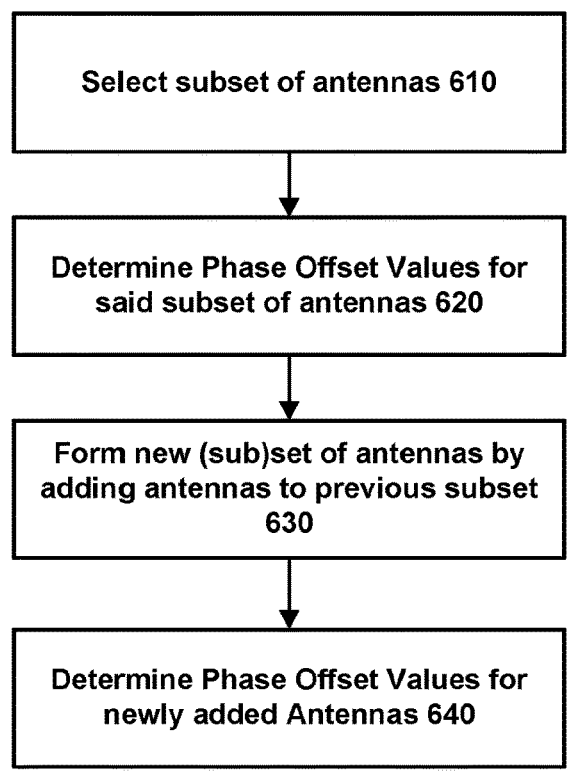
FIG. 23C is a schematic flowchart illustrating a calibration of the phase offsets in a wireless access point in accordance with some embodiments of the invention.

One such iterative approach is illustrated in FIG. 23C and comprises initially selecting a subset of k antennas (2≤k<M) (operation 610). The phase offset values are determined for just this subset of antennas—i.e. by computing the AoA spectrum using just this subset of antennas (operation 620). It will be appreciated that the search space of potential phase offsets for this subset of antennas is reduced compared with the search space of potential phase offsets for the entire set of antennas and hence is computationally more tractable. One the other hand, the results are likely to be less reliable than would have been obtained from the full set of antennas. Hence rather than determining just a single estimated phase offset per antenna, a set of multiple potential phase offsets may be determined per antenna—e.g. all values that produce a match which exceeds a given threshold.

We now form a new (sub)set of antennas by adding in one or more additional antennas (operation 630) and proceed to determine, for each of the newly added antennas, one or more estimated values for the internal phase offset go, for that newly added antenna (operation 640). This determination utilises the estimated values already available for the subset of antennas at operation (620)—which again helps to reduce the overall computational requirements. Operations (630) and (640) are then repeated (iterated) as many times as necessary until estimated phase offsets have been determined for all of the antennas in the wireless access point. Note that if multiple estimated values have been determined for a given antenna, these can be filtered (e.g. the better or best values selected) at any iteration as appropriate, until only one estimated offset remains for each respective antenna at the end.

The quality of the match for a given set of values of phase offsets can be assessed by computing a correlation function (such as the value of η described above) for the calculated AoA spectrum against the known bearing (α). In general terms, the correlation function measures how much of the AoA spectrum is directed in the direction of the known bearing compared with how much of the AoA spectrum is directed away from the known bearing. The correlation function may smooth the AoA spectrum and/or the known bearing, for example to help accommodate positioning errors.

Another strategy for reducing computational requirements when performing the autocalibration is to have a variable setting for s (the number of possible phase values per antenna to be searched). Thus having a low initial value for s provides a relatively coarse search grid (low granularity), and hence is quicker to compute. After an initial coarse phase offset value has been determined for a relatively small value of s, the value of s can be increased to perform a relatively fine search grid (high granularity)—but generally limited to the vicinity of the coarse phase offset value found in the initial (coarse) search. For example, an initial (coarse) value of s might be 8, and if the phase offset found for this coarse value is $3\pi/2$, then a second (fine) value of s might be 32, but limited to search values between (say) $\pi/2$ and u. In other words, the value of s is iteratively increased (through two or more cycles) to provide increasing refinement of the search area and search spacing for the phase offset.

It will be appreciated that this strategy for iteratively refining the search granularity for phase offsets may comprise two or more stages of refinement and may also be combined with the approach described above of iteratively increasing the number of antennas being used for determining the phase offsets. For example, operation 620 and/or operation 640 in FIG. 23B may comprise an iterative search of increasing angular refinement to estimate the phase offset based on that number of antennas. Alternatively, the processing of FIG. 23B (i.e. operations 610-640) may be performed initially with a relatively low level granularity, and then repeated with increasing granularity, etc. In other words, there could be an inner loop of increasing granularity and an outer loop of increasing number of antennas, or vice versa, since both help to reduce the overall computational burden.

Although an AoA spectrum is calculated for an individual packet of the received signal, and hence a calibration can be performed on this basis, as noted above a better calibration can generally be obtained by aggregating results from multiple packets (which may be received all from the same transmitter, or potentially from two more transmitters). Such aggregation can be performed by any suitable statistical technique, such as utilising the matrix approach as described above.

The transmitter(s) used for an autocalibration procedure described herein can be any suitable device(s). For example, in some cases, there may be client device(s) having a position that is already known, at least approximately—for example, it may have had its position determined by another (already calibration) wireless access point (or wireless access points). In other cases, a transmitter may be another wireless AP. For example, assume that multiple APs, each having a known position, have overlapping ranges in a given indoor environment. One (or potentially two or more) of these wireless APs can be selected in a first stage to act as transmitters of known position, thereby allowing an auto-calibration of phase offset for the remaining APs which act as receivers. In a second stage, one (or more) of the wireless APs that acted as receivers in the first stage can now be used as a transmitter, with the remaining wireless APs (including those that acted as transmitters in the first stage) being used as receivers. This then allows each wireless AP that acted as a transmitter in the first stage to have its phase offset determined, and thereby provides in effect a bootstrap mechanism for autocalibration across all of the wireless APs. In practice, the first and second stages may be performed at the same time, or at least in overlap with one another, as any given wireless AP performs both transmission (for calibration of others) and reception (for calibration of itself0.

In some situations, certain wireless APs might already have calibrated phase offsets. For example, these wireless APs may have two or more wireless radios, and hence may have been able to perform their own "line-of-sight" determination of phase offset, as discussed below in section (vi) (Device separation). Another possibility is that there may be wireless APs which are already installed and have phase offsets that are known from some previous calibration procedure (auto-calibration or otherwise). In such situations, the wireless APs that have already been calibrated may act just as transmitters, thereby allowing the calibration of other wireless APs (that have not already been calibrated) to complete in a single stage.

(vi) Device Separation.

Spectral analysis techniques often operate under the assumption that a transmitter is sufficiently distant to make the AoA approximately equal at each of the receiving antennas of the array. While this assumption is usually sound when discussing separate wireless devices in real deployments, such as WiFi access points, there are certain situations in which devices are necessarily in closer proximity to one another. A particularly interesting example is a wireless device having more than one wireless radio, each wireless radio being connected to a different antenna array or to a different part of a larger array. Some commercially available wireless access points, especially those towards the higher end, have (at least) two such wireless radios, for example, to provide a greater capacity for communications.

A naive approach for calibration would be to use the technique described above across the entire resulting array, and across all cards (wireless radios) for all incoming packets. However, this is undesirable for two reasons. Firstly, such a scheme fails to take advantage of the fact that the second card can act as a new signal source in N, thereby potentially improving the estimates for values of $\varphi_j$. Secondly, because the oscillators in different cards are not phase-locked, the go, estimates will become incorrect for the antenna ports belonging to the second card as the oscillators drift apart. Because of the assumption that the transmitter is distant relative to the spacing between the antennas in the array, in such a situation we also cannot use the autocalibration mechanism proposed above, with an antenna attached to one card as the sender and the other card's antennas as the receiving array. In this situation, we therefore have to employ different measures to determine appropriate estimates for $\varphi_i$. However, the fact that the transmitter and receiver are close together allows another method for calculating the set of values for $\varphi_i$ to be used. In particular, as the distance decreases, multipath signals become increasingly weak and delayed relative to the direct line-of-sight signal. Therefore, if we know that the line-of-sight signal is dominant, and we know the location of the transmitter and the receiver, plus the geometry of the array, we can use the known wavelength of the incoming signal to calculate the expected phase difference of the signal at each antenna of the receiver. We can then measure the actual phase difference reported by each oscillator for its respective antenna, and from this we can directly calculate the phase offset introduced by each oscillator.

Figure 23D:
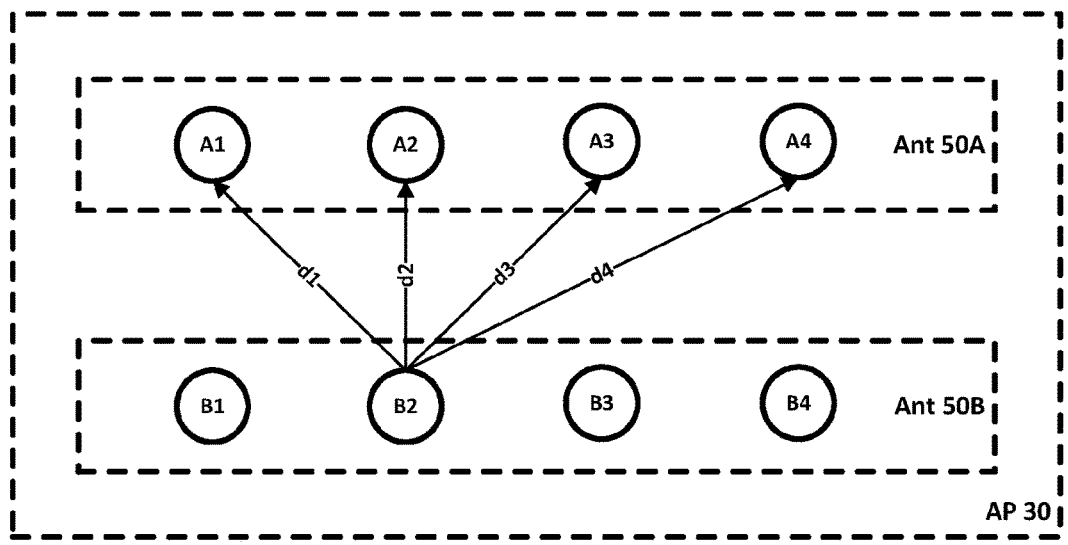
FIG. 23D is a schematic flowchart illustrating a calibration of a wireless access point having two antenna arrays in accordance with some embodiments of the invention.

FIG. 23D is a schematic flowchart illustrating such a calibration of phase offsets within a wireless access point 30 having two antenna arrays 50A, 50B in accordance with some embodiments of the invention. Each antenna array has its own respective radio unit (not shown) for transmitting and/or receiving as appropriate. Note also that FIG. 23A depicts a particular number (four) and geometry (linear array) of individual antennas in each array, but the number and/or geometry may vary as appropriate (and may be different between the two antenna arrays 50A and 50B).

We assume, by way of illustration, that the (relative) phase offsets of antenna array 50A are to calibrated, and for this purpose use an antenna from the second antenna array 50B as a transmitter—e.g. antenna B2 as shown in FIG. 23D. It will be appreciated that this configuration could subsequently be reversed to perform a calibration of the phase offsets of antenna array 50B. It is also assumed that the distance is known from antenna B2 to each antenna A1, A2, A3 and A4 in antenna array 50A—as denoted in FIG. 23 by distances d1, d2, d3 and d4 respectively (thus this technique is based on knowledge distance, rather than knowledge of bearing as per the processing of FIG. 23C.

Using these known distances, the relative phase of the signal from B2 can be determined as received at the different antennas A1, A2, A3 and A4 (assuming also that the signal frequency is known). The phase difference between (i) the received frequency at a given antenna and (ii) the phase measured by the radio unit for the signal from that antenna (e.g. as determined using the channel state matrix) therefore represents the phase offset for that antenna, thereby allowing the calibration of relative phase offsets for antenna array 50A.

It will be appreciated that the calibration approach illustrated in FIG. 23D is computationally straightforward and requires no additional equipment. Although it is intended for access points having two (or more) antenna arrays and respective wireless radio units, these are becoming increasingly widespread to provide better support for mobile devices—e.g. in terms of supporting a greater number of of devices, plus more effective bandwidth per device.

Figure 24:
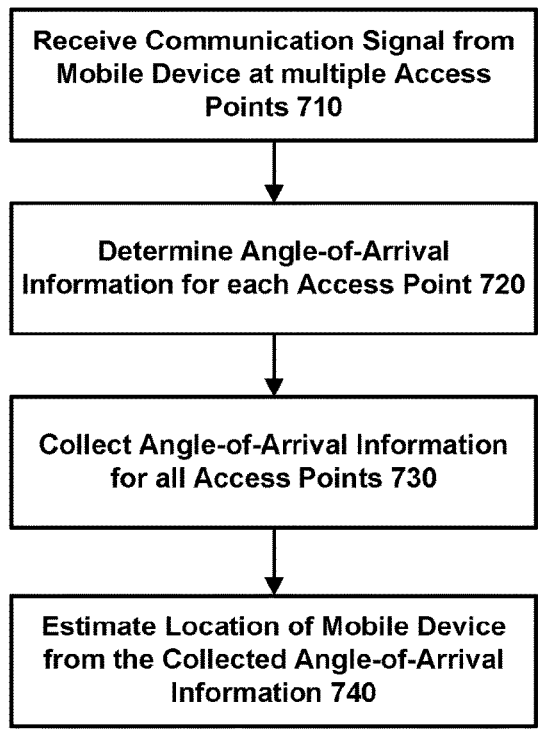
FIG. 24 is a simplified flowchart illustrating the localisation processing in accordance with some embodiments of the invention.

FIG. 24 is a schematic flowchart illustrating a method of determining the location of a mobile device using multiple wireless access points in accordance with some embodiments of the invention. Each of the wireless access points comprises multiple antennas. The method includes receiving a communication signal from the mobile device at the multiple antennas of multiple wireless access points (operation 710). It will be appreciated that a wireless access point may receive a communication signal at any given time from one or more devices. In addition, the communication signal may comprise multiple components from any given device (direct path and/or one or more multipath components). For each wireless access point, angle-of-arrival information of the received communication signal at the wireless access point is determined, based on a difference in phase of the received signal between different antennas (operation 720). The angle-of-arrival information may be presented in a variety of formats. For example, the angle-of-arrival information may comprise a spectrum showing the variation of signal strength across all direction. Another possibility is that the angle-of-arrival information comprises one or more specific bearings corresponding to respective received signal components. The determination of the angle-of-arrival information may be performed at the wireless access point itself, or in part or in whole at some other processing facility. The method further comprises collecting, from each of the multiple wireless access points, the determined angle-of-arrival information for the received communication signal from the mobile device (operation 730). Note that such collection of the information may be performed implicitly by first collecting (centralising) the raw signal data from each wireless access point, and then performing the determination of the angle-of-arrival information for each wireless access point at this central location, as discussed above. The method further comprises estimating the location of the mobile device from the collected angle-of-arrival information (operation 740). Such estimation can involve various processing, for example, multipath rejection, etc as described above.

APPENDIX A

AoA Spectrum Windowing

Here we sketch a proof that the windowing function proposed in Equation 7 weights information from the AoA spectrum in inverse proportion to its uncertainty, on a simplified two-element array.

Suppose a signal with wavelength $\lambda$ arrives at a two-element array where the elements are separated by $\tfrac{1}{2}\lambda$. The array steering vector is then given by:

$$a(\theta) = \begin{bmatrix} 1 \\ \exp(j\pi\cos\theta) \end{bmatrix}. \tag{9}$$

Since we measure $\Omega = \pi \cos\theta$ and solve for $\theta$, the error in the calculation of $\theta$ due to noise in the measurement of $\Omega$ is proportional to:

$$\begin{aligned}\frac{d\theta}{d\Omega} &= \frac{d}{d\Omega}\arccos(\Omega/\pi) \\ &= \frac{1}{\pi\sqrt{1-(\Omega/\pi)^2}} \\ &= (\pi\sin\theta)^{-1}\end{aligned} \tag{10}$$

Therefore, to weight information from the AoA spectrum in proportion to the reciprocal of its uncertainty, one should multiply by a factor proportional to $\sin\theta$.

APPENDIX B

AP-Client Height Difference

Suppose the AP is distance h above the client; we compute the resulting percentage error. The AoA calculation depends on the difference in distance (d1–d2) between the client device and each of the two AP antennas in a pair. Given an added height difference (h), this difference in distance of the client from each of the two AP antennas now becomes:

$$d'_1 - d'_2 = \frac{d_1}{\cos\phi} - \frac{d_2}{\cos\phi} \tag{11}$$

where $\cos\varphi = h/d$. The percentage error is then $[(d'_1 - d'_2)/(d_1 - d_2)] - 1 = (\cos\varphi)^{-1} - 1$. For h=1.5 meters and d=5 meters, this corresponds to an error of approximately 4%; for h=1.5 meters and d=10 meters, this corresponds to an error of approximately 1%.

In the above embodiments, the data (signal) processing may be performed by specialised hardware, by general purpose hardware running appropriate computer code, or by some combination of the two. For example, the general purpose hardware may comprise a personal computer, a computer workstation, etc. The computer code may comprise computer program instructions that are executed by one or more processors to perform the desired operations. The one or more processors may be located in or integrated into special purpose apparatus, such as a dedicated passive sensing system. The one or more processors may comprise digital signal processors, graphics processing units, central processing units, or any other suitable device. The computer program code is generally stored in a non-transitory medium such as an optical disk, flash memory (ROM), or hard drive, and then loaded into random access memory (RAM) prior to access by the one or more processors for execution.

In conclusion, the skilled person will be aware of various modifications that can be made to the above embodiments to reflect the particular circumstances of any given implementation. Moreover, the skilled person will be aware that features from different embodiments can be combined as appropriate in any particular implementation. Accordingly, the scope of the present invention is defined by the appended claims and their equivalents.

The work described herein has received funding from the European Union Seventh Framework Programme (FP7/2007-2013) under grant agreement No. 324639.

REFERENCES

[1] E. Aryafar, N. Anand, T. Salonidis, and E. Knightly. Design and experimental evaluation of multiuser beamforming in wireless LANs. In Proc. Of ACM MobiCom, 2010.
[2] P. Bahl and V. Padmanabhan. RADAR: An inbuilding RF-based user location and tracking system. In Proc. of IEEE Infocom, pages 775-784, 2000.
[3] P. Bahl, V. Padmanabhan, and A. Balachandran. Enhancements to the RADAR location tracking system. Technical Report MSR-TR-2000-12, Microsoft Research, February 2000.
[4] P. Bahl, J. Padhye, L. Ravindranath, M. Singh, A. Wolman, and B. Zill. DAIR: A framework for managing enterprise wireless networks using desktop infrastructure. In Proc. of ACM HotNets, 2005.
[5] S. Bratus, C. Cornelius, D. Kotz, and D. Peebles. Active behavioral fingerprinting of wireless devices. In Proc. of ACM WiSec, pages 56-61, March 2008.
[6] S. Capkun, M. Hamdi, and J. Hubaux. GPS-free positioning in mobile ad-hoc networks. In Proc. of Hawaii Intl Conference on System Sciences, 2001.
[7] H. Chen, T. Lin, H. Kung, and Y. Gwon. Determining RF angle of arrival using COTS antenna arrays: a field evaluation. In Proc. of the MILCOM Conf., 2012.
[8] K. Chintalapudi, A. Iyer, and V. Padmanabhan. Indoor localization without the pain. In Proc. of ACM MobiCom, 2010.
[9] L. Cong and W. Zhuang. Hybrid TDoA/AoA mobile user location for wideband CDMA cellular systems. IEEE Trans. on Wireless Communications, 1(3):439-447, 2002.
[10] D. Faria and D. Cheriton. No long-term secrets: Location based security in overprovisioned wireless lans. In Proc. of the ACM HotNets Workshop, 2004.
[11] Y. Gwon and R. Jain. Error characteristics and calibration-free techniques for wireless LAN-based location estimation. In ACM MobiWac, 2004.
[12] A. Haeberlen, E. Flannery, A. Ladd, A. Rudys, D. Wallach, and L. Kavraki. Practical robust localization over large-scale 802.11 wireless networks. In Proc. of ACM MobiCom, 2004.
[13] H. Lim, C. Kung, J. Hou, and H. Luo. Zero configuration robust indoor localization: Theory and experimentation. In Proc. of IEEE Infocom, 2006.
[14] D. C. Loh, C. Y. Cho, C. P. Tan, and R. S. Lee. Identifying unique devices through wireless fingerprinting. In Proc. of the ACM WiSec Conf., pages 46-55, March 2008.
[15] D. Madigan, E. Einahrawy, R. Martin, W. Ju, P. Krishnan, and A. Krishnakumar. Bayesian indoor positioning systems. In Proc. of IEEE Infocom, 2005.
[16] D. Niculescu and B. Nath. Ad-hoc positioning system (APS) using AoA. In Proc. of IEEE Infocom, 2003.
[17] N. Patwari and S. Kasera. Robust location distinction using temporal link signatures. In Proc. of the ACM MobiCom Conf., pages 111-122, September 2007.
[18] N. Priyantha, A. Chakraborty, and H. Balakrishnan.The Cricket location-support system. In Proc. of the ACM MobiCom Conf., pages 32-43, August 2000.
[19] N. Priyantha, H. Balakrishnan, E. Demaine, and S. Teller. Mobile-assisted localization in wireless sensor networks. In Proc. of IEEE Infocom, 2005.
[20] A. Rai, K. Chintalapudi, V. Padmanabhan, and R. Sen. Zee: Zero-effort crowdsourcing for indoor localization. In Proc. of ACM MobiCom, 2012.
[21] T. S. Rappaport. Wireless Communications: Principles and Practice. Prentice-Hall, 2nd edition, 2002.
[22] T. Roos, P. Myllymaki, and H. Tirri. A probabilistic approach to WLAN user location estimation. International J. of Wireless Information Networks, 9(3), 2002.
[23] A. Savvides, C. Han, and M. Srivastava. Finegrained localization in ad-hoc networks of sensors. In Proc. of ACM MobiCom, 2001.
[24] T. Schmidl and D. Cox. Robust Frequency and Timing Synchroniation for OFDM. IEEE Trans. on Communications, 45(12):1613-1621, December 1997.
[25] R. Schmidt. Multiple emitter location and signal parameter estimation. IEEE Trans. on Antennas and Propagation, AP-34(3):276-280, March 1986.
[26] T.-J. Shan, M. Wax, and T. Kailath. On spatial smoothing for direction-of-arrival estimation of coherent signals. IEEE Trans. on Acoustics, Speech, and Sig. Proc., ASSP-33(4):806-811, August 1985.
[27] A. Sheth, S. Seshan, and D. Wetherall. Geofencing: Confining Wi-Fi Coverage to Physical Boundaries. In Proceedings of the 7th International Conference on Pervasive Computing, 2009.
[28] A. Smailagic, D. Siewiorek, J. Anhalt, D. Kogan, and Y. Wang. Location sensing and privacy in a context aware computing environment. In Pervasive Computing, 2001.
[29] K. Tan, H. Liu, J. Fang, W. Wang, J. Zhang, M. Chen, and G. Voelker. SAM: Enabling practical spatial multiple access in wireless LAN. In Proc. of ACM MobiCom, 2009.
[30] K. Tan, J. Zhang, J. Fang, H. Liu, Y. Ye, S. Wang, Y. Zhang, H. Wu, W. Wang, and G. Voelker. Sora: High performance software radio using general purpose multi-core processors. In Proc. of the NSDI Conf., April 2009.
[31] A. Tarighat, N. Khajehnouri, and A. Sayed. Improved wireless location accuracy using antenna arrays and interference cancellation. 4, 2003.
[32] A. Varshaysky, E. Lara, J. Hightower, A. LaMarca, and V. Otsason. GSM indoor localization. In Pervasive and Mobile Computing, 2007.
[33] R. Want, A. Hopper, V. Falcao, and J. Gibbons. The active badge location system. ACM Trans. on Information Systems, 10(1):91-102, January 1992.
[34] A. Ward, A. Jones, and A. Hopper. A new location technique for the active office. IEEE Personal Communications, 4(5):42-47, October 1997.
[35] C. Wong, R. Klukas, and G. Messier. Using WLAN infrastructure for angle-of-arrival indoor user location. In Proc. of the IEEE VTC Conf., pages 1-5, September 2008.
[36] Y. Xie, Y. Wang, P. Zhu, and X. You. Gridsearch-based hybrd ToA/AoA location techniques for NLOS environments. IEEE Comms. Letters, 13 (4):254-256, 2009.
[37] J. Xiong and K. Jamieson. Towards fine-grained radio-based indoor location. In Proc. of ACM Hot-Mobile, 2012.
[38] L. Xiong. A selective model to suppress nlos signals in angle-of-arrival (AoA) location esimation. In Proc. of the IEEE PIMRC, 1998.
[39] xirrus. Xirrus Corp. (http://www.xirrus.com).

[40] Z. Yang, Y. Liu, and X. Li. Beyond trilateration: On the localizability of wireless ad-hoc networks. In Proc. of IEEE Infocom, 2009.

[41] M. Youssef and A. Agrawala. The Horus WLAN location determination system. In Proc. of ACM MobiSys, 2005.

[42] R. D. Maesschalck, D. Jouan-Rimbaud, and D. Massart. The Mahalanobis Distance. 2000

Various embodiments of the invention are described in the following numbered clauses. It will be readily apparent to the skilled person that the features of the following clauses can be generally combined or integrated with other aspects of the system described and/or claimed herein. As an example (and without limitation), the techniques described above for auto-calibration and/or for compensating for a non-zero elevation of a mobile (client) device can be utilised with wireless APs and antennas having the features of clauses 2-11, and may adopt the signal processing techniques described in subsequent clauses, etc. Further such combinations will be readily apparent to the skilled person.

1. A method of determining the location of a mobile device using multiple wireless access points, each wireless access point comprising multiple antennas, said method comprising:
   receiving a communication signal from the mobile device at said multiple antennas of said multiple wireless access points;
   for each wireless access point, determining angle-of-arrival information of the received communication signal at the wireless access point, based on a difference in phase of the received signal between different antennas;
   collecting, from each of the multiple wireless access points, the determined angle-of-arrival information for the received communication signal from the mobile device; and
   estimating the location of the mobile device from the collected angle-of-arrival information.

2. The method of any preceding clause, wherein the wireless access points are for a wireless local area network using radio communications.

3. The method of clause 2, wherein the wireless access points are IEEE 802.11 wireless access points.

4. The method of any preceding clause, wherein the wireless access points use multiple-input multiple-output techniques.

5. The method of any preceding clause, further comprising using circularly polarised antennas at the wireless access points.

6. The method of any preceding clause, wherein the multiple antennas of a wireless access point form a phased array of antennas.

7. The method of any preceding clause, wherein the multiple antennas of a wireless access point form an array of four to sixteen antennas.

8. The method of any preceding clause, wherein the multiple antennas of a wireless access point have a linear arrangement.

9. The method of clause 8, wherein the multiple antennas of a wireless access point have a half-wavelength spacing with respect to the communication signal.

10. The method of clause 8 or 9, wherein a wireless access point comprises said linear arrangement of multiple antennas, plus at least one antenna which lies outside the linear arrangement in order to provide angle-of-arrival information that discriminates between opposing sides of the linear arrangement.

11. The method of any of clauses 1 to 7, wherein the multiple antennas of a wireless access point have an approximately circular arrangement.

12. The method of any preceding clause, wherein the angle-of-arrival information is with respect to a two-dimensional space.

13. The method of any of clauses 1 to 11, wherein at least one wireless access point includes a horizontally oriented array of antennas and a vertically oriented array of antennas to provide angle-of-arrival information with respect to a three-dimensional space.

14. The method of any preceding clause, wherein at least one wireless access point comprises multiple radio receivers, and the method further comprises:
   providing a source radio signal comprising a continuous wave tone directly to each radio receiver of a wireless access point; and
   for each radio receiver, measuring a phase offset directly for that radio receiver, and subtracting the measured phase offset from the communication signal received by that radio receiver.

15. The method of any preceding clause, further comprising, upon detecting receipt of the communication signal, switching between sets of antennas at a wireless access point to synthesize new angle-of-arrival information from each set of antennas.

16. The method of any preceding clause, wherein at least one wireless access point supports performing diversity synthesis by:
   receiving a known symbol into one antenna of a subset of N antennas, wherein each subset of antennas is associated with one radio receiver;
   cycling through each of the N antennas in turn, so as to receive the known symbol in each of the other antennas in succession; and
   treating receipt of the known symbol in the subset of antennas as if N symbols were received simultaneously at different radio receivers at the wireless access point.

17. The method of clause 16, wherein N=2, matching the known symbol occurring twice in a specified portion of the communication signal.

18. The method of any preceding clause, further comprising operating within a physical layer of a wireless access point to support determination of the angle-of-arrival information from the preamble of the communication signal.

19. The method of any preceding clause, wherein the determination of the angle-of-arrival information is performed without decoding the communication signal.

20. The method of any preceding clause, further comprising obtaining multiple samples for the communication signal to estimate a mean phase difference for determining the angle-of-arrival information.

21. The method of clause 20, wherein between 5 and 50 samples of the communication signal are used for determining the angle-of-arrival information.

22. The method of clause 21, wherein approximately 10 samples of the communication signal are used for determining the angle-of-arrival information.

23. The method of any preceding clause, wherein the communication signal comprises at least one known time domain sequence which is used for detecting receipt of the communication signal.

24. The method of clause 23, wherein a moving average filter is used to detect the known time domain sequence in the received communication signal.

25. The method of any preceding clause, further comprising recording at least a portion of the communication signal after detecting that the communication signal has started to be received.

26. The method of clause 25, further comprising:
   using one radio receiver at a wireless access point to detect start of receipt of the communication signal at the wireless access point; and
   then triggering, based on the detection by said one radio receiver, recording of the communication signal by other radio receivers at said wireless access point.

27. The method of any preceding clause, wherein said communication signal is received as one or more packets, wherein a packet may comprise a data packet, a control frame, an acknowledgement, or any other similar signal.

28. The method of clause 27, wherein the angle-of-arrival information is determined from at least part of a preamble of a received packet.

29. The method of clause 28, wherein the packet preamble is transmitted at base rate.

30. The method of clause 28 or 29, further comprising detecting a short training symbol in a packet preamble in order to detect receipt of the communication signal.

31. The method of any of clauses 28 to 30, wherein the detecting receipt of the communication signal using the packet preamble is achieved with a significantly lower signal-to-noise ratio than that required to receive the packet.

32. The method of any of clauses 28 to 31, further comprising recording at least a portion of the communication signal after detecting that the communication signal has started to be received, and wherein said recording comprises recording only a small part of the preamble of each packet to reduce buffering.

33. The method of any preceding clause, wherein determining the angle-of-arrival information for a wireless access point includes determining an angle-of-arrival spectrum, wherein said angle-of-arrival spectrum represents power of the communication signal received by the wireless access point as a function of angle of arrival.

34. The method of clause 33, wherein the angle-of-arrival spectrum for a wireless access point is determined using the MUSIC algorithm.

35. The method of clause 34, wherein the MUSIC algorithm performs an eigenstructure analysis of a correlation matrix formed by sample-wise multiplying the raw communication signal received by the mth antenna of the multiple antennas at the wireless access point with the raw communication signal received by the nth antenna of the multiple antennas at the wireless access point, and then computing the mean result.

36. The method of clause 34 or 35, wherein determining the angle-of-arrival spectrum is performed using the MUSIC algorithm with spatial smoothing, wherein said spatial smoothing averages signals across N groups of antenna arrays.

37. The method of clause 36, wherein said spatial smoothing averages signals across N groups of antenna arrays at a wireless access point, where N=2.

38. The method of any of clauses 33 to 37, wherein the angle-of-arrival spectrum represents at least part of the angle-of-arrival information which is collected to estimate the location of the mobile device.

39. The method of any of clauses 33 to 37, wherein the angle-of-arrival information for a wireless access point which is collected to estimate the location of the mobile device comprises an estimated direction of the mobile device from the wireless access point as determined from the angle-of-arrival spectrum.

40. The method of clause 39, wherein the estimated location is determined according to a maximum of the angle-of-arrival spectrum.

41. The method of any of clauses 33 to 40, further comprising computing multiple angle-of-arrival spectra at a wireless access point with respect to the mobile device, each angle-of-arrival spectra being determined from a different packet in the communication signal from the device.

42. The method of any of clauses 33 to 41, further comprising handling a collision between a first packet from a first mobile device and a second packet from a second mobile device by:
   receiving part of the first packet prior to transmission of the second packet;
   determining the angle-of-arrival spectrum of the first packet from said received part;
   receiving the communication signal representing the first packet overlapped with the second packet; and
   determining an angle-of-arrival spectrum of the second packet by determining the angle-of-arrival spectrum of said received communication signal, and subtracting therefrom the determined angle-of-arrival spectrum of the first packet.

43. The method of any of clauses 33 to 42, further comprising weighting the angle-of-arrival spectrum for a wireless access point using a windowing function.

44. The method of clause 43, wherein the windowing function has a lower value for directions in which the array of antennas at the wireless access point has lower directional sensitivity.

45. The method of clause 44, wherein the windowing function is of the form $W(\theta)=1$ if $15°<|\theta|<165°$, otherwise $W(\theta)=\sin\theta$, where $\theta$ is the angle between the direction in the angle-of-arrival spectrum and a line representing a linear array of antennas.

46. The method of any of clauses 33 to 45, further comprising weighting the angle-of-arrival spectrum in accordance with a statistical accuracy of angle-of-arrival spectrum at that location.

47. The method of clause 46, wherein said statistical accuracy is derived from an analysis used in determining the angle-of-arrival spectrum.

48. The method of clause 46, wherein said statistical accuracy is derived from a comparison of results from multiple angle-of-arrival spectra.

49. The method of any preceding clause, further comprising discriminating against multipath reception of the communication signal at a wireless access point.

50. The method of clause 49, wherein discriminating against multipath reception exploits phase coherence between multipath components.

51. The method of clause 49, wherein at least one wireless access point comprises two sets of antennas for discriminating against multipath reception.

52. The method of clause 51, further comprising discriminating in favour of a direct path over a multipath by using the two sets of antennas at the wireless access point to disambiguate a direct path from the wireless access point to the mobile device from a multipath, based on intra-wireless access point triangulation between the two sets of multiple antennas.

53. The method of clause 52, further comprising discriminating in favour of a direct path over a multipath by:

determining a difference in angle of arrival for each component of the received communication signal at each of said two sets of antennas;
determining a source distance for each component of the received communication signal based on said difference in angle; and
identifying the direct path as corresponding to the component of communication signal having the shortest source distance.

54. The method of clause 51, further comprising discriminating in favour of a direct path over multipath by:
determining an angle of arrival for each component of the communication signal at each of said two sets of antennas; and
identifying the direct path as corresponding to the component which is detected by both sets of antennas with only a small change in angle of arrival.

55. The method of any of clauses 51 to 54, wherein the two sets of multiple antennas of a single access point are separated by approximately 0.75 m.

56. The method of clause 49, wherein discriminating against multipath reception of the communication signal at a wireless access point comprises matching angle-of-arrival spectra by correlating individual lobes from two angle-of-arrival spectra with one another.

57. The method of clause 56, further comprising:
grouping two or more angle-of-arrival spectra for the same mobile device, if available;
arbitrarily choosing one of the angle-of-arrival spectra as the primary, and removing peaks from the primary that are not paired with corresponding peaks on the one or more other angle-of-arrival spectra; and
outputting the primary angle-of-arrival spectrum.

58. The method of clause 56 or 57, wherein the two or more angle-of-arrival spectra for the same mobile device are determined from different times in the received communication signal.

59. The method of any preceding clause, wherein estimating the location of the mobile device from the collected angle-of-arrival information includes making multiple estimates of the location by selecting different subsets of the multiple wireless access points, and for each subset estimating the location using the angle-of-arrival information from that subset.

60. The method of any preceding clause, wherein there are N wireless access points, and estimating the location of the mobile device comprises:
computing an estimated location from the angle-of-arrival information for all subsets of M wireless access points, where M is taken to have all the values from 3, 4 . . . N;
using a Mahalanobis distance to compare all the estimated locations generated by all the subsets of the wireless access points;
applying a threshold based on the Mahalanobis distance to separate the estimated locations into two groups;
rejecting the group greater than the Mahalanobis distance as outliers; and
averaging the remaining group to produce a final estimated location for the mobile device.

61. The method of any preceding clause, wherein the estimated location of the mobile device is determined from the collected angle-of-arrival information as a heat map depicting the probability that the mobile device is positioned at a given location within the map.

62. The method of clause 61, wherein estimating the location of the mobile device comprises performing a hill climbing technique within the heat map.

63. The method of clause 61 or 62, further comprising determining heat maps from angle-of-arrival information from different subsets of the multiple wireless access points.

64. The method of any preceding clause, wherein estimating the location of the mobile device comprises defining a grid, and searching through the grid to determine the most likely location of the mobile device according to the angle-of-arrival spectra from the multiple wireless access points.

65. The method of clause 64, wherein estimating the location of the mobile device includes performing a hill-climbing technique at a finer granularity than that provided by the grid.

66. The method of any preceding clause, wherein the likelihood ($L(x)$) of the mobile device being located at position x is estimated according to $\pi_{i=1 \ to \ N}$ (product) $P_i(\theta)$, where N=number of wireless access points that each generate an angle-of-arrival spectrum $P_i(\theta)$.

67. The method of any preceding clause, wherein estimating the location of the mobile device further comprises weighting the angle-of-arrival information collected for a wireless access point.

68. The method of clause 67, wherein said weighting is provided with or incorporated into the angle-of-arrival information collected for a wireless access point.

69. The method of clause 67 or 68, wherein said weighting takes into consideration one of more of the following factors: received strength of the communication signal at a wireless access point; received signal-to-noise ratio of the communication signal at a wireless access point; number of peaks in the angle-of-arrival spectrum at a wireless access point; statistical uncertainty in locating peaks in the angle-of-arrival spectrum at a wireless access point; angular resolution at a wireless access point, based on the number of antennas at the wireless access point; known configuration of a building or other environment in which the mobile device may be located; and angular resolution at a wireless access point, based on the direction of the mobile device with respect to the configuration of antennas at the wireless access point.

70. The method of any of clauses 67 to 69, wherein said weighting incorporates known information about a previous position of the mobile device.

71. The method of any preceding clause, further comprising recursively tracking the estimated location of the mobile device.

72. The method of any preceding clause, further comprising transferring a sampled version of the received communication signal from each wireless access point to a server, and performing the determination of the angle-of-arrival information and estimation of the location of the mobile device on said server.

73. The method of any preceding clause, wherein each wireless access point includes an antenna array, radio receiver front-end, packet detection functionality, and diversity synthesis, and wherein an array server performs computation of angle-of-arrival information, multipath discrimination, and maximum likelihood position estimation for the location of the mobile device.

74. The method of any preceding clause, where each wireless access point comprises a commodity wireless access point.

75. The method of clause 74, wherein the received communication signal comprises channel state information reading.

76. The method of clause 75, further comprising grouping channel state information that belongs to the same transmission.

77. The method of clause 76, wherein said grouping comprises grouping channel state information readings that were taken at the same time.

78. The method of clause 77, wherein the time used for grouping the channel state information allows for a clock offset between different wireless access points, and determining said offset comprises:
   making an initial estimate of the clock offset for a wireless access point based on packet arrival time; and
   finalizing the estimate of the clock offset for each wireless access point by performing a cross-correlation of signals received from different wireless access points.

79. The method of any of clauses 74 to 78, further comprising determining the phase offset for each antenna of a wireless access point after each reboot.

80. A computer program comprising instructions in machine readable form which, when executed by one or more processors, cause the one or more processors to perform the method of any preceding clause.

81. A computer program product comprising the computer program of clause 80 stored in non-transitory form on a computer readable medium.

82. An apparatus comprising multiple wireless access points and a server communicating therewith, adapted to perform the method any of clauses 1 to 79.

83. Apparatus for determining the location of a mobile device using multiple wireless access points, each wireless access point comprising multiple antennas, said apparatus being configured to perform a method comprising:
   receiving a communication signal from the mobile device at said multiple antennas of said multiple wireless access points;
   for each wireless access point, determining angle-of-arrival information of the received communication signal at the wireless access point, based on a difference in phase of the received signal between different antennas;
   collecting, from each of the multiple wireless access points, the determined angle-of-arrival information for the received communication signal from the mobile device; and
   estimating the location of the mobile device from the collected angle-of-arrival information.

What is claimed is:

1. A method of calibrating a wireless access point comprising an array of multiple (m) antennas denoted $A_i$ (i=1 ... m), each antenna having a respective internal phase offset $\varphi_i$, said method comprising:
   receiving a signal from at least one transmitter located at a substantially known bearing from the wireless access point; and
   determining an estimated value for each internal phase offset $\varphi_i$ such that an angle of arrival (AoA) spectrum calculated for the received signal on the basis of said estimated values matches the known bearing, wherein said AoA spectrum is calculated by treating said multiple antennas as a phased array;
   wherein said method further comprises computing a correlation function for the calculated AoA spectrum against the known bearing to provide a measure of whether or not a match is present, wherein said correlation function is selected to be: (i) higher if the AoA spectrum contains a peak in the direction of the known bearing; (ii) lower if there are peaks in directions other than said known bearing; and (iii) lower if the peak in the direction of the known bearing in is low compared to a noise floor for the AoA spectrum.

2. The method of claim 1, wherein one of said multiple antennas is selected as a reference antenna having an arbitrary known phase, and the internal phase offsets $\varphi_i$ are determined for the remaining m−1 antennas as m−1 respective relative offsets from the arbitrary known phase of said reference antenna.

3. The method of claim 1, wherein said determining comprises iteratively searching for a set of estimated values for the internal phase offsets $\varphi_i$ to match the known bearing.

4. The method of claim 3, wherein said iteratively searching comprises:
   (a) selecting a subset of k antennas (2≤k<M);
   (b) determining one or more estimated values for each internal phase offset $\varphi_i$ with respect to said selected subset of k antennas, such that an angle of arrival (AoA) spectrum calculated for the received signal on the basis of said estimated values matches the known bearing;
   (c) incrementing said subset of antennas to contain an additional j antennas (k+j≤M); and
   (d) using the one or more estimated values as determined for each internal phase offset $\varphi_i$ with respect to said selected subset of k antennas, for determining one or more estimated values for each internal phase offset $\varphi_i$ with respect to said additional j antennas, such that an angle of arrival (AoA) spectrum calculated for the received signal on the basis of said estimated values for the k+j matches the known bearing.

5. The method of claim 4, further comprising iteratively repeating steps (c) and (d) until an estimated value for the internal phase offset $\varphi_i$ of each antenna in the wireless access point has been determined.

6. The method of claim 3, wherein the iterative searching includes increasing the granularity in phase of the search for the internal phase offsets $\varphi_i$ between at least two iterations.

7. The method of claim 1, wherein computing the correlation function includes smoothing the AoA spectrum and/or said known bearing.

8. The method of claim 1, wherein said correlation function measures how much of the AoA spectrum is directed in the direction of the known bearing compared with how much of the AoA spectrum is directed away from the known bearing.

9. The method of claim 1, wherein an AoA spectrum is calculated for an individual packet of the received signal, and said method further comprises utilising AoA spectra calculated for multiple respective packets of the received signal.

10. The method of claim 9, wherein utilising AoA spectra calculated for multiple respective packets of the received signal comprises computing a correlation function for each AoA spectrum and combining said correlation functions from the multiple respective packets to determine an estimated value for each internal phase offset $\varphi_i$ to match the known bearing.

11. The method of claim 9, wherein said multiple packets are received from two or more different transmitters, each transmitter having a known bearing.

12. The method of claim 1, wherein the at least one transmitter is another wireless access point.

13. The method of claim 12, wherein a first wireless access point is calibrated using a second wireless access point as a transmitter, and the second wireless access point is calibrated using the first wireless access point as a transmitter.

14. The method of claim 1, wherein a first wireless access point is calibrated using a client device whose bearing to the first wireless access point has been determined already by using a second wireless access point.

15. An apparatus, comprising:
a wireless access point comprising an array of multiple (m) antennas denoted $A_i$ (i=1 . . . m), each antenna having a respective internal phase offset $\varphi_i$;
a calibration mechanism that,
receives a signal from at least one transmitter located at a substantially known bearing from the wireless access point,
determines an estimated value for each internal phase offset $\varphi_i$ such that an angle of arrival (AoA) spectrum calculated for the received signal on the basis of said estimated values matches the known bearing, wherein said AoA spectrum is calculated by treating said multiple antennas as a phased array, and
computes a correlation function for the calculated AoA spectrum against the known bearing to provide a measure of whether or not a match is present, wherein said correlation function is selected to be: (i) higher if the AoA spectrum contains a peak in the direction of the known bearing; (ii) lower if there are peaks in directions other than said known bearing; and (iii) lower if the peak in the direction of the known bearing in is low compared to a noise floor for the AoA spectrum.

16. A non-transitory computer-readable storage medium storing instructions that when executed by a computer cause the computer to perform a method of calibrating a wireless access point comprising an array of multiple (m) antennas denoted $A_i$ (i=1 . . . m), each antenna having a respective internal phase offset $\varphi_i$, said method comprising:
receiving a signal from at least one transmitter located at a substantially known bearing from the wireless access point; and
determining an estimated value for each internal phase offset $\varphi_i$ such that an angle of arrival (AoA) spectrum calculated for the received signal on the basis of said estimated values matches the known bearing, wherein said AoA spectrum is calculated by treating said multiple antennas as a phased array;
wherein said method further comprises computing a correlation function for the calculated AoA spectrum against the known bearing to provide a measure of whether or not a match is present, wherein said correlation function is selected to be: (i) higher if the AoA spectrum contains a peak in the direction of the known bearing; (ii) lower if there are peaks in directions other than said known bearing; and (iii) lower if the peak in the direction of the known bearing in is low compared to a noise floor for the AoA spectrum.

* * * * *